(12) United States Patent
Yamazaki et al.

(10) Patent No.: US 12,537,039 B2
(45) Date of Patent: Jan. 27, 2026

(54) SEMICONDUCTOR DEVICE

(71) Applicant: SEMICONDUCTOR ENERGY LABORATORY CO., LTD., Atsugi (JP)

(72) Inventors: Shunpei Yamazaki, Tokyo (JP); Tatsuya Onuki, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 149 days.

(21) Appl. No.: 18/035,013

(22) PCT Filed: Nov. 9, 2021

(86) PCT No.: PCT/IB2021/060338
§ 371 (c)(1),
(2) Date: May 2, 2023

(87) PCT Pub. No.: WO2022/106956
PCT Pub. Date: May 27, 2022

(65) Prior Publication Data
US 2024/0013829 A1 Jan. 11, 2024

(30) Foreign Application Priority Data
Nov. 20, 2020 (JP) .................... 2020-193215

(51) Int. Cl.
*G11C 11/22* (2006.01)
*G11C 5/10* (2006.01)
(Continued)

(52) U.S. Cl.
CPC ............ *G11C 11/221* (2013.01); *G11C 5/10* (2013.01); *H10B 51/10* (2023.02); *H10B 51/20* (2023.02);
(Continued)

(58) Field of Classification Search
None
See application file for complete search history.

(56) References Cited

U.S. PATENT DOCUMENTS

| 5,523,964 A * | 6/1996 | McMillan ............... G11C 11/22 |
| | | 257/295 |
| 6,566,698 B2 | 5/2003 | Nishihara et al. |
| (Continued) | | |

FOREIGN PATENT DOCUMENTS

| CN | 001574356 A | 2/2005 |
| EP | 1492124 A | 12/2004 |
| (Continued) | | |

OTHER PUBLICATIONS

International Search Report (Application No. PCT/IB2021/060338) dated Feb. 1, 2022.
(Continued)

*Primary Examiner* — Michael T Tran
(74) *Attorney, Agent, or Firm* — NIXON PEABODY LLP; Jeffrey L. Costellia

(57) ABSTRACT

A semiconductor device with a novel structure is provided. The semiconductor device includes a plurality of memory cells each including a transistor and a capacitor, and capacitors included in adjacent memory cells are provided to overlap with each other. A first capacitor included in a first memory cell is provided so as to partly overlap with a second memory cell adjacent to the first memory cell. A second capacitor included in a second memory cell and the first capacitor are provided over different layers. The second capacitor is provided so as to partly overlap with the first memory cell. The first capacitor and the second capacitor include a region where they overlap with each other. The first and second capacitors include a ferroelectric. The ferroelectric preferably includes hafnium, zirconium, or at least one element selected from Group III-V elements. The
(Continued)

transistor preferably includes an oxide semiconductor in a semiconductor layer where a channel is formed.

16 Claims, 18 Drawing Sheets

(51) Int. Cl.
H10B 51/10 (2023.01)
H10B 51/20 (2023.01)
H10B 53/10 (2023.01)
H10B 53/20 (2023.01)
H10D 30/67 (2025.01)

(52) U.S. Cl.
CPC ............ *H10B 53/10* (2023.02); *H10B 53/20* (2023.02); *H10D 30/6755* (2025.01)

(56) References Cited

U.S. PATENT DOCUMENTS

| | | | |
|---|---|---|---|
| 6,664,118 B2 | 12/2003 | Nishihara et al. | |
| 7,291,878 B2 | 11/2007 | Stipe | |
| 7,463,502 B2 | 12/2008 | Stipe | |
| 8,129,766 B2 * | 3/2012 | Shuto | H10B 53/10 257/532 |
| 8,368,067 B2 | 2/2013 | Uchiyama et al. | |
| 10,229,874 B1 * | 3/2019 | Ramaswamy | G11C 5/02 |
| 10,546,629 B1 * | 1/2020 | Vimercati | G11C 11/2275 |
| 12,154,817 B1 * | 11/2024 | Or-Bach | H10D 88/00 |
| 2002/0041512 A1 * | 4/2002 | Kato | G11C 11/22 365/145 |
| 2002/0079520 A1 * | 6/2002 | Nishihara | H10B 53/30 257/245 |
| 2003/0053351 A1 * | 3/2003 | Oh | H10B 10/12 257/E21.664 |
| 2003/0058683 A1 | 3/2003 | Nishihara | |
| 2003/0119212 A1 | 6/2003 | Nishihara et al. | |
| 2003/0141528 A1 * | 7/2003 | Ito | H10B 53/00 257/295 |
| 2004/0245547 A1 | 12/2004 | Stipe | |
| 2005/0098815 A1 * | 5/2005 | Okita | H10B 53/30 257/532 |
| 2007/0002605 A1 * | 1/2007 | Koide | G11C 11/22 257/E21.664 |
| 2007/0107774 A1 | 5/2007 | Jin et al. | |
| 2007/0228434 A1 * | 10/2007 | Shimojo | H10B 53/30 257/296 |
| 2008/0037349 A1 | 2/2008 | Stipe | |
| 2008/0061335 A1 * | 3/2008 | Kumura | H10D 1/682 257/295 |
| 2008/0186754 A1 * | 8/2008 | Shiratake | G11C 11/22 365/145 |
| 2009/0116273 A1 * | 5/2009 | Shiratake | G11C 11/22 365/72 |
| 2009/0231902 A1 * | 9/2009 | Takashima | G11C 11/22 365/189.011 |
| 2010/0039850 A1 * | 2/2010 | Kitazaki | H10B 53/30 257/E21.001 |
| 2010/0140614 A1 | 6/2010 | Uchiyama et al. | |
| 2011/0062504 A1 * | 3/2011 | Hamamoto | H10B 53/30 257/295 |
| 2012/0182790 A1 | 7/2012 | Yamazaki et al. | |
| 2021/0028176 A1 * | 1/2021 | Derner | H10B 12/50 |
| 2021/0091098 A1 | 3/2021 | Tsukamoto | |
| 2022/0157817 A1 | 5/2022 | Yamazaki et al. | |
| 2022/0157986 A1 | 5/2022 | Yamazaki et al. | |
| 2024/0284710 A1 * | 8/2024 | Zhang | H10D 30/6734 |
| 2024/0371854 A1 * | 11/2024 | Hsu | H10D 89/711 |

FOREIGN PATENT DOCUMENTS

| | | |
|---|---|---|
| JP | 2001-168294 A | 6/2001 |
| JP | 2002-197857 A | 7/2002 |
| JP | 2004-362753 A | 12/2004 |
| JP | 2010-140919 A | 6/2010 |
| KR | 2001-0107777 A | 12/2001 |
| KR | 2004-0104413 A | 12/2004 |
| KR | 10-0803642 | 2/2008 |

OTHER PUBLICATIONS

Written Opinion (Application No. PCT/IB2021/060338) dated Feb. 1, 2022.

Boscke.T et al., "Ferroelectricity in hafnium oxide thin films", Appl. Phys. Lett. (Applied Physics Letters), Sep. 8, 2011, vol. 99, No. 10, pp. 102903-1-102903-3.

Fan.Z et al., "Ferroelectric HfO2—based materials for next-generation ferroelectric memories", Journal of Advanced Dielectrics, May 3, 2016, vol. 6, No. 2, pp. 1630003-1-1630003-11.

Okuno.J et al., "SoC compatible 1T1C FeRAM memory array based on ferroelectric Hf0.5Zr0.5O2", 2020 Symposium on VLSI Technology : Digest of Technical Papers, Jun. 16, 2020, p. 2pages.

Toriumi.A, "Ferroelectric properties of thin HfO2 films", Oyobuturi, Sep. 10, 2019, vol. 88, No. 9, pp. 586-596, JSAP(The Japan Society of Applied Physics).

Francois.T et al., "Demonstration of BEOL-compatible ferroelectric Hf0.5Zr0.5O2 scaled FeRAM co-integrated with 130nm CMOS for embedded NVM applications", IEDM 19: Technical Digest of International Electron Devices Meeting, Dec. 7, 2019, pp. 362-365.

Yu.Y et al., "Energy-Efficient Monolithic 3D on-Chip Memory Architectures", IEEE Transactions on Nanotechnology, Jul. 25, 2017, vol. 17, No. 4, pp. 620-633.

Toyoshima.H et al., "FeRAM device and circuit technologies fully compatible with advanced CMOS", CICC 2001 :IEEE 2001 Custom Integrated Circuits Conference, May 9, 2001, pp. 171-178.

* cited by examiner

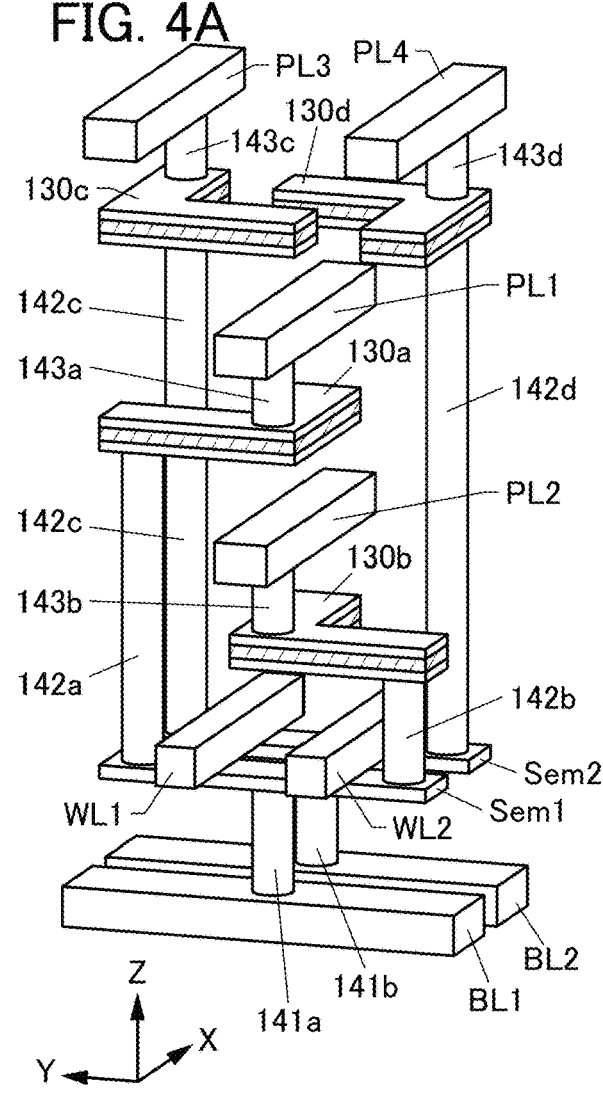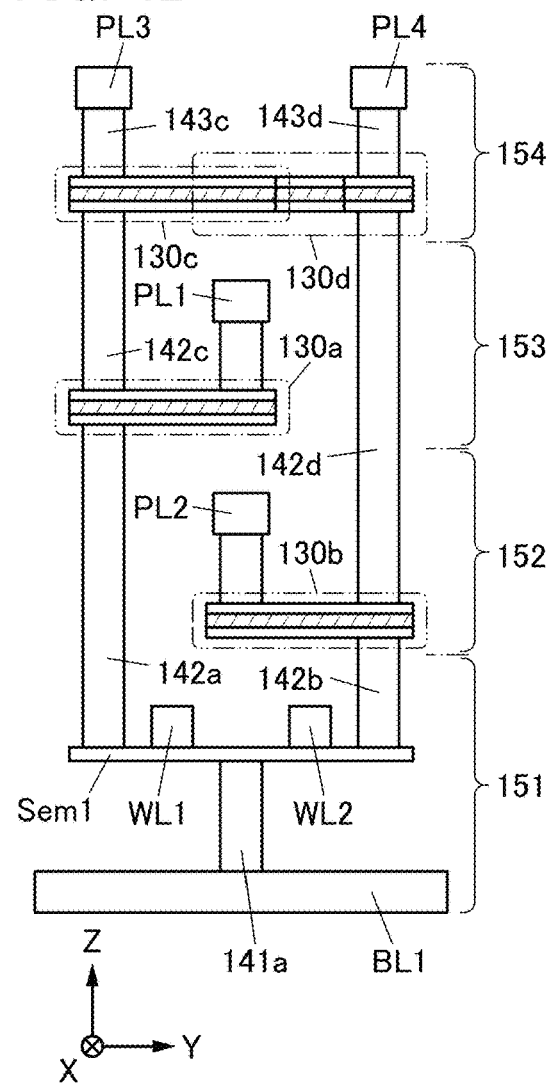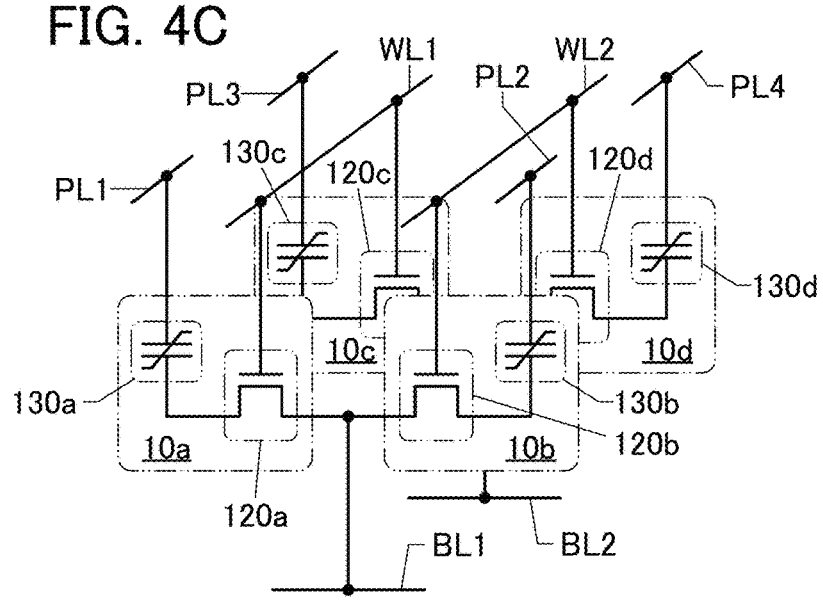

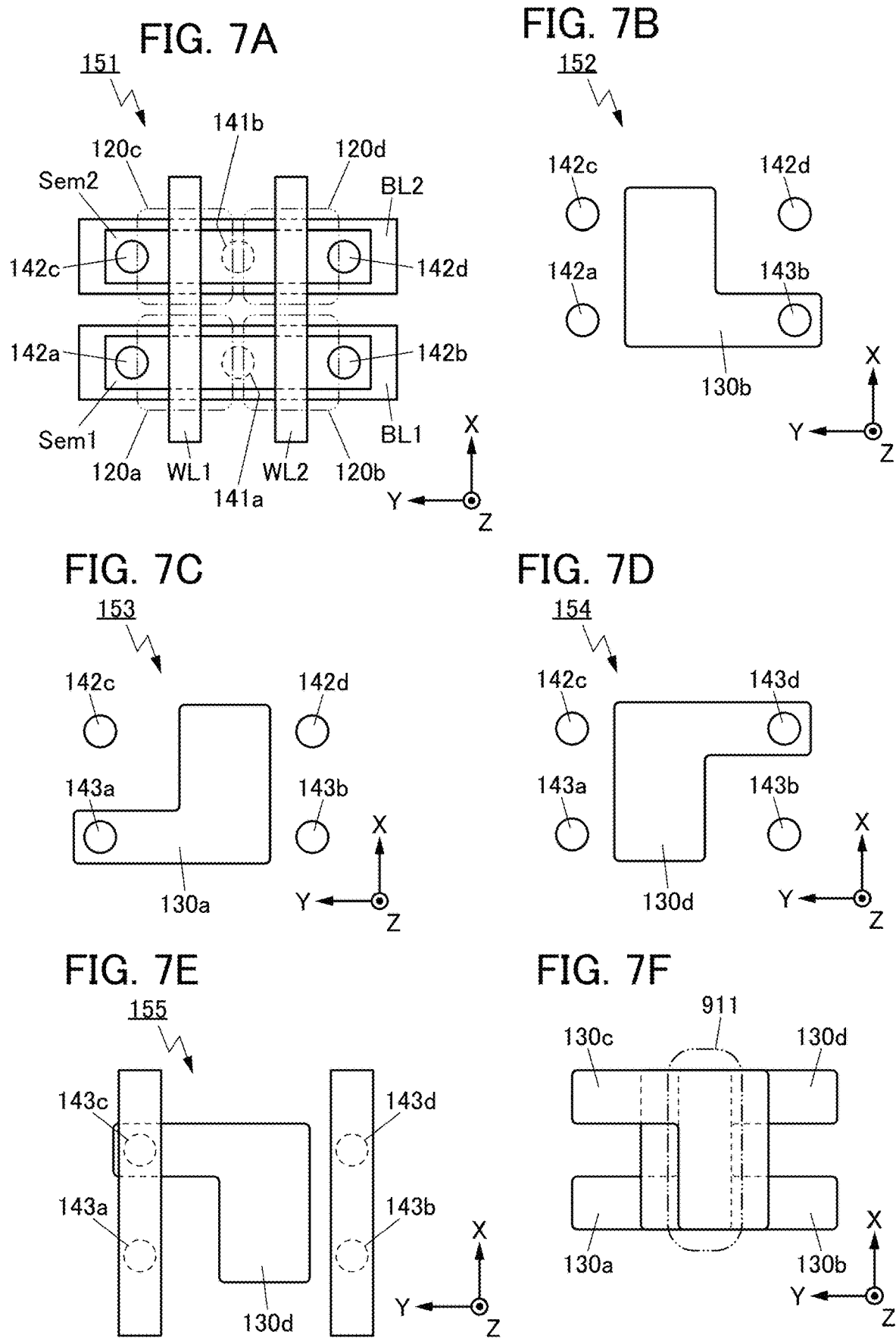

FIG. 11A
Intermediate state
New crystalline phase
| Amorphous | Crystalline | Crystal |
|---|---|---|
| •completely amorphous | •CAAC<br>•nc<br>•CAC<br><br>excluding single crystal and poly crystal | •single crystal<br>•poly crystal |
FIG. 11B
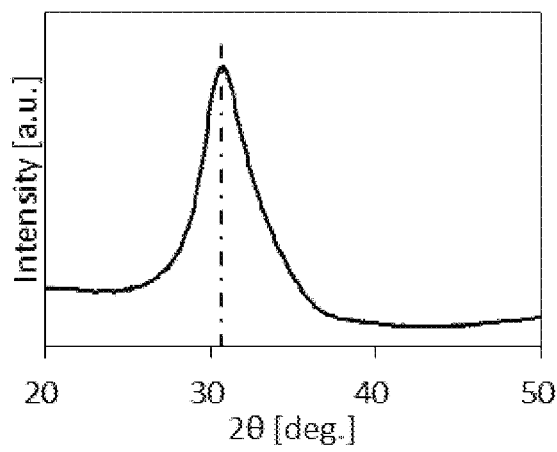
FIG. 11C
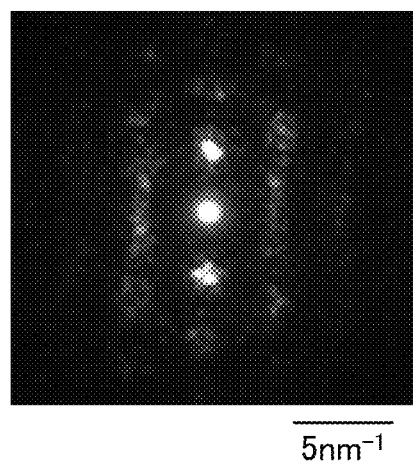

SEMICONDUCTOR DEVICE

TECHNICAL FIELD

One embodiment of the present invention relates to a semiconductor device and an electronic device.

Note that one embodiment of the present invention is not limited to the above technical field. The technical field of the invention disclosed in this specification and the like relates to an object, a method, or a manufacturing method. One embodiment of the present invention relates to a process, a machine, manufacture, or a composition of matter. Thus, specific examples of the technical field of one embodiment of the present invention disclosed in this specification include a semiconductor device, a display device, a liquid crystal display device, a light-emitting device, a power storage device, an imaging device, a memory device, a signal processing device, a processor, an electronic device, a system, a driving method thereof, a manufacturing method thereof, and a testing method thereof.

BACKGROUND ART

In recent years, semiconductor devices such as LSI, CPUs, and memories (memory devices) have been developed. These semiconductor devices have been used in various electronic devices such as computers and portable information terminals. In addition, memories under development employ various memory systems for intended uses such as temporary storage at the time of executing arithmetic processing and long-term storage of data. Examples of memories with typical memory systems include a DRAM, an SRAM, and a flash memory.

Memories using ferroelectrics have been actively researched and developed as disclosed in Non-Patent Document 1. For the next-generation ferroelectric memories, researches on hafnium oxide, such as a research on ferroelectric $HfO_2$-based materials (Non-Patent Document 2); a research on ferroelectricity of a hafnium oxide thin film (Non-Patent Document 3); a research on ferroelectricity of a $HfO_2$ thin film (Non-Patent Document 4); and demonstration of integration of an FeRAM using a ferroelectric $Hf_{0.5}Zr_{0.5}O_2$ and a CMOS (Non-Patent Document 5) have been actively carried out.

REFERENCES

Non-Patent Documents

[Non-Patent Document 1] T. S. Boescke, et al, "Ferroelectricity in hafnium oxide thin films", APL99, 2011

[Non-Patent Document 2] Zhen Fan, et al, "Ferroelectric $HfO_2$-based materials for next-generation ferroelectric memories", JOURNAL OF ADVANCED DIELECTRICS, Vol. 6, No. 2, 2016

[Non-Patent Document 3] Jun Okuno, et al, "SoC compatible 1T1C FeRAM memory array based on ferroelectric $Hf_{0.5}Zr_{0.5}O_2$", VLSI 2020

[Non-Patent Document 4] Akira Toriumi, "Ferroelectric properties of thin $HfO_2$ films", the Japan Society of Applied Physics, Vol. 88, No. 9, 2019

[Non-Patent Document 5] T. Francois, et al, "Demonstration of BEOL-compatible ferroelectric $Hf_{0.5}Zr_{0.5}O_2$ scaled FeRAM co-integrated with 130 nm CMOS for embedded NVM applications", IEDM 2019

SUMMARY OF THE INVENTION

Problems to be Solved by the Invention

In a ferroelectric memory, data writing and reading operations are performed by utilizing polarization reversal of a ferroelectric (a material that can have ferroelectricity). In order that written data can be retained accurately, the remanent polarization of the ferroelectric needs to be increased.

In a ferroelectric memory including a capacitor using a ferroelectric (also referred to as a "ferroelectric capacitor"), a larger capacitance value of the capacitor can increase the reliability in data retention. An increase in the capacitance value can be achieved by a reduction in the thickness of a dielectric and/or an increase in the area of the capacitor. In the former way, however, the increase in the capacitance value is difficult to achieve because the remanent polarization decreases. The latter way has a trade-off relationship with a reduction in the occupied area with an increase in the density of memory elements ("memory cells").

An object of one embodiment of the present invention is to provide a novel memory device. Another object of one embodiment of the present invention is to provide a memory device that occupies a small area. Another object of one embodiment of the present invention is to provide a highly reliable memory device. Another object of one embodiment of the present invention is to provide a memory device with low power consumption. Another object of one embodiment of the present invention is to provide a memory device with high memory capacity. Another object of one embodiment of the present invention is to provide a novel semiconductor device. Another object of one embodiment of the present invention is to provide a semiconductor device that occupies a small area. Another object of one embodiment of the present invention is to provide a highly reliable semiconductor device. Another object of one embodiment of the present invention is to provide a semiconductor device with low power consumption. Another object of one embodiment of the present invention is to provide a semiconductor device with high memory capacity.

Note that the objects of one embodiment of the present invention are not limited to the objects listed above. The objects listed above do not preclude the existence of other objects. The other objects are objects that are not described in this section and will be described below. The objects that are not described in this section will be derived from the description of the specification, the drawings, and the like and can be extracted as appropriate from the description by those skilled in the art. One embodiment of the present invention achieves at least one of the objects listed above and the other objects. One embodiment of the present invention does not have to achieve all of the objects listed above and the other objects.

Means for Solving the Problems (1) One embodiment of the present invention is a semiconductor device including first and second transistors and first and second capacitors; the first transistor is electrically connected to the first capacitor; the second transistor is electrically connected to the second capacitor; the first and second capacitors are provided above the first and second transistors; each of the first and second capacitors includes a ferroelectric; and the first and second capacitors include a region where they overlap with each other.

(2) Another embodiment of the present invention is a semiconductor device including first and second transistors, first and second capacitors, and first to third wirings; a gate of the first transistor is electrically connected to the first wiring; a gate of the second transistor is electrically connected to the second wiring; one of a source and a drain of the first transistor is electrically connected to the first capacitor; one of a source and a drain of the second transistor is electrically connected to the second capacitor; the other of the source and the drain of each of the first and second transistors is electrically connected to the third wiring; each of the first and second capacitors includes a ferroelectric; and the first and second capacitors include a region where they overlap with each other.

In the above (1) or (2), the first and second transistors may be provided over the same layer.

(3) Another embodiment of the present invention is a semiconductor device including first to fourth transistors and first to fourth capacitors; the first transistor is electrically connected to the first capacitor; the second transistor is electrically connected to the second capacitor; the third transistor is electrically connected to the third capacitor; the fourth transistor is electrically connected to the fourth capacitor; the first to fourth capacitors are provided above the first to fourth transistors; each of the first to fourth capacitors includes a ferroelectric; the third capacitor and the fourth capacitor are provided over the same layer; and the first to third capacitors include a region where they overlap with each other.

(4) Another embodiment of the present invention is a semiconductor device including first to fourth transistors, first to fourth capacitors, and first to fourth wirings; a gate of each of the first and third transistors is electrically connected to the first wiring; a gate of each of the second and fourth transistors is electrically connected to the second wiring; one of a source and a drain of the first transistor is electrically connected to the first capacitor; one of a source and a drain of the second transistor is electrically connected to the second capacitor; one of a source and a drain of the third transistor is electrically connected to the third capacitor; one of a source and a drain of the fourth transistor is electrically connected to the fourth capacitor; the other of the source and the drain of each of the first and second transistors is electrically connected to the third wiring; the other of the source and the drain of each of the third and fourth transistors is electrically connected to the second wiring; the third capacitor and the fourth capacitor are provided over the same layer; and the first to third capacitors include a region where they overlap with each other.

(5) Another embodiment of the present invention is a semiconductor device including first to fourth transistors and first to fourth capacitors; the first transistor is electrically connected to the first capacitor; the second transistor is electrically connected to the second capacitor; the third transistor is electrically connected to the third capacitor; the fourth transistor is electrically connected to the fourth capacitor; the first to fourth capacitors are provided above the first to fourth transistors; each of the first to fourth capacitors includes a ferroelectric; and the first to fourth capacitors include a region where they overlap with each other.

(6) Another embodiment of the present invention is a semiconductor device including first to fourth transistors, first to fourth capacitors, and first to fourth wirings; a gate of each of the first and third transistors is electrically connected to the first wiring; a gate of each of the second and fourth transistors is electrically connected to the second wiring; one of a source and a drain of the first transistor is electrically connected to the first capacitor; one of a source and a drain of the second transistor is electrically connected to the second capacitor; one of a source and a drain of the third transistor is electrically connected to the third capacitor; one of a source and a drain of the fourth transistor is electrically connected to the fourth capacitor; the other of the source and the drain of each of the first and second transistors is electrically connected to the third wiring; the other of the source and the drain of each of the third and fourth transistors is electrically connected to the second wiring; each of the first to fourth capacitors includes a ferroelectric; and the first to fourth capacitors include a region where they overlap with each other.

In any one of the above (3) to (6), the first to fourth transistors may be provided over the same layer.

In any one of the above (3) to (6), each of the first to fourth transistors preferably includes an oxide semiconductor in a semiconductor layer where a channel is formed. The oxide semiconductor preferably includes at least one of indium and zinc. A material used as the ferroelectric may include at least one of hafnium and zirconium or include at least one element selected from Group III-V elements.

Effect of the Invention

One embodiment of the present invention can provide a novel memory device. Another embodiment of the present invention can provide a memory device that occupies a small area. Another embodiment of the present invention can provide a highly reliable memory device. Another embodiment of the present invention can provide a memory device with low power consumption. Another embodiment of the present invention can provide a memory device with high memory capacity. Another embodiment of the present invention can provide a novel semiconductor device. Another embodiment of the present invention can provide a semiconductor device that occupies a small area. Another embodiment of the present invention can provide a highly reliable semiconductor device. Another embodiment of the present invention can provide a semiconductor device with low power consumption. Another embodiment of the present invention can provide a semiconductor device with high memory capacity.

Note that the effects of one embodiment of the present invention are not limited to the effects listed above. The effects listed above do not preclude the existence of other effects. Note that the other effects are effects that are not described in this section and will be described below. The effects that are not described in this section are derived from the description of the specification, the drawings, and the like and can be extracted as appropriate from the description by those skilled in the art. Note that one embodiment of the present invention has at least one of the effects listed above and the other effects. Accordingly, depending on the case, one embodiment of the present invention does not have the effects listed above in some cases.

BRIEF DESCRIPTION OF THE DRAWINGS

FIG. 4A is a perspective view illustrating a structure example of two adjacent memory cells. FIG. 4B is a front view of the two adjacent memory cells. FIG. 4C is a diagram illustrating a circuit structure example of the two adjacent memory cells.

FIG. 7A to FIG. 7F are top views each illustrating one embodiment of the present invention.

FIG. 11A is a diagram showing classification of crystal structures. FIG. 11B is a diagram showing an XRD spectrum of a CAAC-IGZO film. FIG. 11C is a diagram showing nanobeam electron diffraction patterns of the CAAC-IGZO film.

MODE FOR CARRYING OUT THE INVENTION

Figure 1A:
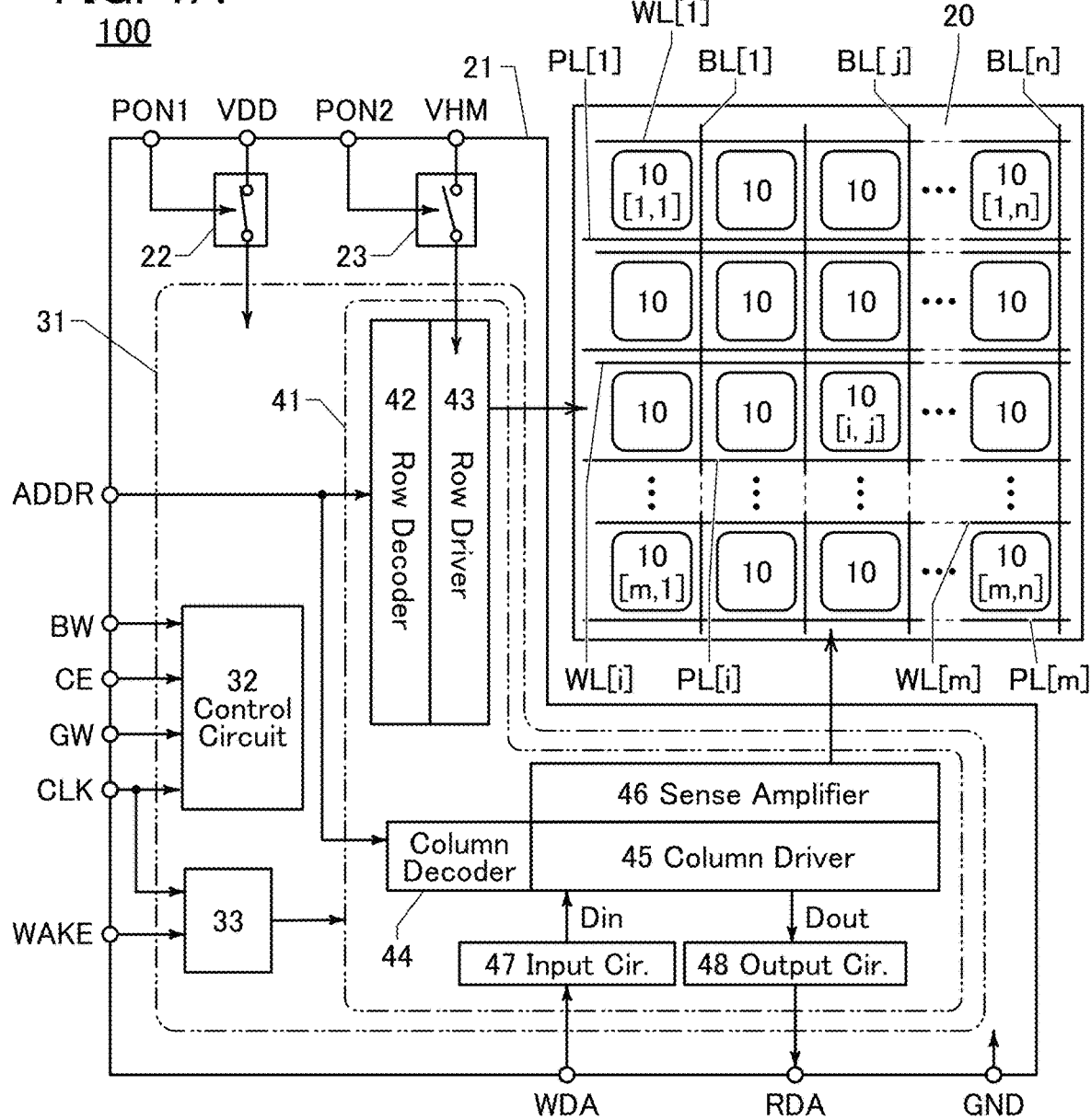
FIG. 1A and FIG. 1B are diagrams illustrating a structure example of a semiconductor device.

In this specification, a semiconductor device refers to a device that utilizes semiconductor characteristics, and means a circuit including a semiconductor element (a transistor, a diode, a photodiode, and the like), a device including the circuit, and the like. The semiconductor device also means all devices that can function by utilizing semiconductor characteristics. For example, an integrated circuit, a chip including an integrated circuit, and an electronic component including a chip in a package are examples of the semiconductor device. Moreover, a memory device, a display device, a light-emitting device, a lighting device, an electronic device, and the like themselves might be semiconductor devices, or might include semiconductor devices.

In the case where there is a description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relation, for example, a connection relation shown in drawings or text, a connection relation other than a connection relation shown in drawings or text is regarded as being disclosed in the drawings or the text. Each of X and Y denotes an object (e.g., a device, an element, a circuit, a wiring, an electrode, a terminal, a conductive film, or a layer).

For example, in the case where X and Y are electrically connected, one or more elements that allow electrical connection between X and Y (e.g., a switch, a transistor, a capacitor, an inductor, a resistor, a diode, a display device, a light-emitting device, and a load) can be connected between X and Y.

For example, in the case where X and Y are functionally connected, one or more circuits that allow functional connection between X and Y (e.g., a logic circuit (an inverter, a NAND circuit, or a NOR circuit); a signal converter circuit (a digital-to-analog converter circuit, an analog-to-digital converter circuit, a gamma correction circuit, or the like); a potential level converter circuit (a power supply circuit (a step-up circuit, a step-down circuit, or the like), a level shifter circuit for changing the potential level of a signal, or the like); a voltage source; a current source; a switching circuit; an amplifier circuit (a circuit that can increase signal amplitude, the amount of current, or the like, an operational amplifier, a differential amplifier circuit, a source follower circuit, a buffer circuit, or the like); a signal generation circuit; a memory circuit; or a control circuit) can be connected between X and Y. For instance, even if another circuit is provided between X and Y, X and Y are regarded as being functionally connected when a signal output from X is transmitted to Y.

Note that an explicit description "X and Y are electrically connected" includes the case where X and Y are electrically connected (i.e., the case where X and Y are connected with another element or another circuit provided therebetween) and the case where X and Y are directly connected (i.e., the case where X and Y are connected without another element or another circuit provided therebetween).

It can be expressed as, for example, "X, Y, and a source (or a first terminal or the like) and a drain (or a second terminal or the like) of a transistor are electrically connected to each other, and X, the source (or the first terminal or the like) of the transistor, the drain (or the second terminal or the like) of the transistor, and Y are electrically connected in this order". Alternatively, it can be expressed as "a source (or a first terminal or the like) of a transistor is electrically connected to X; a drain (or a second terminal or the like) of the transistor is electrically connected to Y; and X, the source (or the first terminal or the like) of the transistor, the drain (or the second terminal or the like) of the transistor, and Y are electrically connected to each other in this order". Alternatively, it can be expressed as "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order". When the connection order in a circuit structure is defined by an expression similar to the above examples, a source (or a first terminal or the like) and a drain (or a second terminal or the like) of a transistor can be distinguished from each other to specify the technical scope. Note that these expressions are examples and the expression is not limited to these expressions. Here, X and Y each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both of the components that are a wiring and an electrode. Thus, electrical connection in this specification includes, in its category, such a case where one conductive film has functions of a plurality of components.

In this specification and the like, a "resistor" can be, for example, a circuit element having a resistance value higher than 0Ω or a wiring having a resistance value higher than 0Ω. Therefore, in this specification and the like, a "resistor" sometimes includes a wiring having a resistance value, a transistor in which current flows between its source and drain, a diode, and a coil. Thus, the term "resistor" can be sometimes replaced with the terms "resistance", "load", "region having a resistance value", and the like; conversely, the terms "resistance", "load", and "region having a resistance value" can be sometimes replaced with the term "resistor" and the like. The resistance value can be, for example, preferably higher than or equal to 1 mΩ and lower than or equal to 10Ω, further preferably higher than or equal to 5 mΩ and lower than or equal to 5Ω, still further preferably higher than or equal to 10 mΩ and lower than or equal to 1Ω. As another example, the resistance value may be higher than or equal to 1Ω and lower than or equal to $1 \times 10^9$ Ω.

In the case where a wiring is used as a resistor, the resistance value is sometimes determined depending on the length of the wiring. Alternatively, a conductor with resistivity different from that of a conductor used as a wiring is sometimes used as a resistor. Alternatively, the resistance value is sometimes determined by doping a semiconductor with an impurity.

In this specification and the like, a "capacitor" can be, for example, a circuit element having an electrostatic capacitance value higher than 0 F, a region of a wiring having an electrostatic capacitance value higher than 0 F, parasitic capacitance, or gate capacitance of a transistor. Therefore, in this specification and the like, a "capacitor" includes not only a circuit element that has a pair of electrodes and a dielectric between the electrodes, but also parasitic capacitance generated between wirings, gate capacitance generated between a gate and one of a source and a drain of a transistor, and the like. The terms "capacitor", "parasitic capacitance", "gate capacitance", and the like can be replaced with the term "capacitance" or the like in some cases; conversely, the term "capacitance" can be replaced with the terms "capacitor", "parasitic capacitance", "gate capacitance", and the like in some cases. The term "pair of electrodes" of "capacitor" can be replaced with "pair of conductors", "pair of conductive regions", "pair of regions", and the like. Note that the electrostatic capacitance value can be higher than or equal to 0.05 fF and lower than or equal to 10 pF, for example. As another example, the electrostatic capacitance value may be higher than or equal to 1 pF and lower than or equal to 10 μF.

In this specification and the like, a transistor includes three terminals called a gate, a source, and a drain. The gate is a control terminal controlling the conducting state of the transistor. Two terminals functioning as the source and the drain are input/output terminals of the transistor. One of the two input/output terminals serves as the source and the other serves as the drain on the basis of the conductivity type (n-channel type or p-channel type) of the transistor and the levels of potentials applied to the three terminals of the transistor. Therefore, the terms "source" and "drain" can be replaced with each other in this specification and the like. In addition, in this specification and the like, expressions "one of a source and a drain" (or a first electrode or a first terminal) and "the other of the source and the drain" (or a second electrode or a second terminal) are used in the description of the connection relation of a transistor. Depending on the structure, a transistor may include a back gate in addition to the above three terminals. In that case, in this specification and the like, one of the gate and the back gate of the transistor may be referred to as a first gate and the other of the gate and the back gate of the transistor may be referred to as a second gate. Moreover, the terms "gate" and "back gate" can be replaced with each other in one transistor in some cases. In the case where a transistor includes three or more gates, the gates may be referred to as a first gate, a second gate, and a third gate, for example, in this specification and the like.

In this specification and the like, a "node" can be referred to as a terminal, a wiring, an electrode, a conductive layer, a conductor, an impurity region, or the like depending on the circuit structure, the device structure, or the like. Furthermore, a terminal, a wiring, or the like can be referred to as a "node".

In this specification and the like, "voltage" and "potential" can be replaced with each other as appropriate. "Voltage" refers to a potential difference from a reference potential, and when the reference potential is a ground potential, for example, "voltage" can be replaced with "potential". Note that the ground potential does not necessarily mean 0 V. Moreover, potentials are relative values, and a potential supplied to a wiring, a potential applied to a circuit and the like, and a potential output from a circuit and the like, for example, change with a change of the reference potential.

In this specification and the like, the terms "high-level potential" (also referred to as "H potential" or "H") and "low-level potential" (also referred to as "L potential" or "L") do not mean a particular potential. For example, in the case where two wirings are both described as "functioning as a wiring for supplying a high-level potential", the levels of the high-level potentials supplied from the wirings are not necessarily equal to each other. Similarly, in the case where two wirings are both described as "functioning as a wiring for supplying a low-level potential", the levels of the low-level potentials supplied from the wirings are not necessarily equal to each other.

"Current" means a charge transfer (electrical conduction); for example, the description "electrical conduction of positively charged particles occurs" can be rephrased as "electrical conduction of negatively charged particles occurs in the opposite direction". Therefore, unless otherwise specified, "current" in this specification and the like refers to a charge transfer (electrical conduction) accompanied by carrier movement. Examples of a carrier here include an electron, a hole, an anion, a cation, and a complex ion, and the type of carrier differs between current flow systems (e.g., a semiconductor, a metal, an electrolyte solution, and a vacuum). The "direction of current" in a wiring or the like refers to the direction in which a positive carrier moves, and the amount of current is expressed as a positive value. In other words, the direction in which a carrier with a negative charge moves is opposite to the direction of current, and the amount of current is expressed as a negative value. Thus, in the case where the polarity of current (or the direction of current) is not specified in this specification and the like, the description "current flows from element A to element B" can be rephrased as "current flows from element B to element A", for example. The description "current is input to element A" can be rephrased as "current is output from element A", for example.

Ordinal numbers such as "first", "second", and "third" in this specification and the like are used to avoid confusion among components. Thus, the terms do not limit the number of components. In addition, the terms do not limit the order of components. In this specification and the like, for example, a "first" component in one embodiment can be referred to as a "second" component in other embodiments or the scope of claims. As another example, a "first" component in one embodiment in this specification and the like can be omitted in other embodiments or the scope of claims.

In this specification and the like, the terms for describing positioning, such as "over", "under" "above", and "below", are sometimes used for convenience to describe the positional relation between components with reference to drawings. The positional relation between components is changed as appropriate in accordance with the direction in which the components are described. Thus, the positional relation is not limited to the terms described in the specification and the like, and can be described with another term as appropriate depending on the situation. For example, the expression "an insulator positioned over (on) a top surface of a conductor" can be replaced with the expression "an insulator positioned under (on) a bottom surface of a conductor" when the direction of a drawing showing these components is rotated by 180°.

Furthermore, the term "over" or "under" does not necessarily mean that a component is placed directly over or directly under and in direct contact with another component. For example, the expression "electrode B over insulating layer A" does not necessarily mean that the electrode B is formed on and in direct contact with the insulating layer A, and does not exclude the case where another component is provided between the insulating layer A and the electrode B.

In this specification and the like, the terms "film", "layer", and the like can be interchanged with each other depending on the situation. For example, the term "conductive layer" can be changed into the term "conductive film" in some cases. As another example, the term "insulating film" can be changed into the term "insulating layer" in some cases. Alternatively, the term "film", "layer", or the like is not used and can be interchanged with another term depending on the case or the situation. For example, the term "conductive layer" or "conductive film" can be changed into the term "conductor" in some cases. As another example, the term "insulating layer" or "insulating film" can be changed into the term "insulator" in some cases.

In this specification and the like, the term "electrode", "wiring", "terminal", or the like does not limit the function of a component. For example, an "electrode" is used as part of a "wiring" in some cases, and vice versa. Furthermore, the term "electrode" or "wiring" can also mean, for example, the case where a plurality of "electrodes" and "wirings" are formed in an integrated manner. For example, a "terminal" is used as part of a "wiring" or an "electrode" in some cases, and vice versa. Furthermore, the term "terminal" also includes the case where a plurality of "electrodes", "wirings", "terminals", or the like are formed in an integrated manner, for example. Therefore, for example, an "electrode" can be part of a "wiring" or a "terminal", and a "terminal" can be part of a "wiring" or an "electrode". Moreover, the terms "electrode", "wiring", "terminal", and the like are sometimes replaced with the term "region" or the like depending on the case.

In this specification and the like, the terms "wiring", "signal line", "power supply line", and the like can be interchanged with each other depending on the case or the situation. For example, the term "wiring" can be changed into the term "signal line" in some cases. As another example, the term "wiring" can be changed into the term "power supply line" or the like in some cases. Conversely, the term "signal line", "power supply line", or the like can be changed into the term "wiring" in some cases. The term "power supply line" or the like can be changed into the term "signal line" or the like in some cases. Conversely, the term "signal line" or the like can be changed into the term "power supply line" or the like in some cases. The term "potential" that is applied to a wiring can be changed into the term "signal" or the like depending on the case or the situation. Conversely, the term "signal" or the like can be changed into the term "potential" in some cases.

In this specification and the like, an impurity in a semiconductor refers to, for example, an element other than a main component of a semiconductor layer. For example, an element with a concentration of lower than 0.1 atomic % is an impurity. When an impurity is contained, for example, the density of defect states in a semiconductor is increased, carrier mobility is decreased, or crystallinity is decreased in some cases. In the case where the semiconductor is an oxide semiconductor, examples of an impurity that changes characteristics of the semiconductor include Group 1 elements, Group 2 elements, Group 13 elements, Group 14 elements, Group 15 elements, and transition metals other than the main components; specific examples are hydrogen (contained also in water), lithium, sodium, silicon, boron, phosphorus, carbon, and nitrogen. Specifically, in the case where the semiconductor is a silicon layer, examples of an impurity that changes characteristics of the semiconductor include Group 1 elements, Group 2 elements, Group 13 elements, and Group 15 elements (except oxygen and hydrogen).

In this specification and the like, a switch has a function of being in a conduction state (on state) or a non-conduction state (off state) to determine whether current flows or not. Alternatively, a switch has a function of selecting and changing a current path. For example, an electrical switch or a mechanical switch can be used. That is, a switch can be any element capable of controlling current, and is not limited to a particular element.

Examples of an electrical switch include a transistor (e.g., a bipolar transistor and a MOS transistor), a diode (e.g., a PN diode, a PIN diode, a Schottky diode, a MIM (Metal Insulator Metal) diode, a MIS (Metal Insulator Semiconductor) diode, and a diode-connected transistor), and a logic circuit in which such elements are combined. Note that in the case of using a transistor as a switch, a "conduction state" of the transistor refers to a state where a source electrode and a drain electrode of the transistor can be regarded as being electrically short-circuited. Furthermore, a "non-conduction state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch formed using a MEMS (micro electro mechanical systems) technology. Such a switch includes an electrode that can be moved mechanically, and operates by controlling conduction and non-conduction with movement of the electrode.

In this specification, "parallel" indicates a state where two straight lines are placed at an angle greater than or equal to −10° and less than or equal to 10°. Thus, the case where the angle is greater than or equal to −5° and less than or equal to 5° is also included. In addition, "approximately parallel" or "substantially parallel" indicates a state where two straight lines are placed at an angle greater than or equal to −30° and less than or equal to 30°. Moreover, "perpendicular" indicates a state where two straight lines are placed at an angle greater than or equal to 80° and less than or equal to 100°. Thus, the case where the angle is greater than or equal to 850 and less than or equal to 950 is also included. Furthermore, "approximately perpendicular" or "substantially perpendicular" indicates a state where two straight lines are placed at an angle greater than or equal to 60° and less than or equal to 120°.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor. In the case where an "OS transistor" is mentioned, the OS transistor can also be referred to as a transistor including a metal oxide or an oxide semiconductor.

In this specification and the like, a metal oxide containing nitrogen is also collectively referred to as a metal oxide in some cases. A metal oxide containing nitrogen may be called a metal oxynitride.

In this specification and the like, one embodiment of the present invention can be constituted by appropriately combining a structure described in an embodiment with any of the structures described in the other embodiments. In addition, in the case where a plurality of structure examples are described in one embodiment, the structure examples can be combined as appropriate.

Embodiments described in this specification are described with reference to the drawings. Note that the embodiments can be implemented in many different modes, and it will be readily appreciated by those skilled in the art that modes and details can be changed in various ways without departing from the spirit and scope thereof. Therefore, the present invention should not be interpreted as being limited to the description in the embodiments. Note that in the structures of the invention in the embodiments, the same portions or portions having similar functions are denoted by the same reference numerals in different drawings, and repeated description thereof is omitted in some cases. In perspective views, top views, and the like, some components might not be illustrated for clarity of the drawings.

In the drawings in this specification, the size, the layer thickness, or the region is exaggerated for clarity in some cases. Therefore, embodiments of the present invention are not limited to the size, aspect ratio, or the like shown in the drawings. The drawings are schematic views showing ideal examples, and embodiments of the present invention are not limited to shapes, values, or the like shown in the drawings. For example, variations in signal, voltage, or current due to noise, variations in signal, voltage, or current due to difference in timing, or the like can be included.

In this specification and the like, when a plurality of components are denoted with the same reference numeral, and in particular need to be distinguished from each other, an identification sign such as "A", "a", "_1", "[i]", or "[m,n]" is sometimes added to the end of the reference numeral. For example, one of two wirings A is referred to as a wiring A[1] and the other is referred to as a wiring A[2] in some cases.

Embodiment 1

First, a structure example of a semiconductor device 100 including a memory cell 10 (also referred to as a "memory element") will be described.

FIG. 1A is a block diagram illustrating a structure example of the semiconductor device 100 of one embodiment of the present invention. The semiconductor device 100 illustrated in FIG. 1A includes a driver circuit 21 and a memory array 20. The memory array 20 includes a plurality of memory cells 10. FIG. 1A illustrates an example in which the memory array 20 includes the plurality of memory cells 10 arranged in a matrix of m rows and n columns (each of m and n is an integer greater than or equal to 2).

Note that the rows and the columns extend in directions orthogonal to each other. In this embodiment, the X direction (direction along the X-axis) is referred to as a "row" and the Y direction (direction along the Y-axis) is referred to as a "column", but the X direction may be referred to as a "column" and the Y direction may be referred to as a "row".

In FIG. 1A, the memory cell 10 in the first row and the first column is referred to as a memory cell 10[1,1], and the memory cell 10 in the m-th row and the n-th column is referred to as a memory cell 10[m,n]. In this embodiment and the like, a given row is denoted as an i-th row in some cases. A given column is denoted as a j-th column in some cases. Thus, i is an integer greater than or equal to 1 and less than or equal to m, and j is an integer greater than or equal to 1 and less than or equal to n. In this embodiment and the like, the memory cell 10 in the i-th row and the j-th column is referred to as a memory cell 10[i,j]. Note that in this embodiment and the like, "i+α" (α is a positive or negative integer) is not below 1 and does not exceed m. Similarly, "j+α" is not below 1 and does not exceed n.

The memory array 20 includes m wirings WL extending in the row direction, m wirings PL extending in the row direction, and n wirings BL extending in the column direction. In this embodiment and the like, a first (first row) wiring WL is referred to as a wiring WL[1] and an m-th (m-th row) wiring WL is referred to as a wiring WL[m]. Similarly, a first (first row) wiring PL is referred to as a wiring PL[1] and an m-th (m-th row) wiring PL is referred to as a wiring PL[m]. Similarly, a first (first column) wiring BL is referred to as a wiring BL[1] and an n-th (n-th column) wiring BL is referred to as a wiring BL[n].

The plurality of memory cells 10 provided in the i-th row are electrically connected to the wiring WL in the i-th row (wiring WL[i]) and the wiring PL in the i-th row (wiring PL[i]). The plurality of memory cells 10 provided in the j-th column are electrically connected to the wiring BL in the j-th column (wiring BL[j]).

The driver circuit 21 includes a PSW 22 (power switch), a PSW 23, and a peripheral circuit 31. The peripheral circuit 31 includes a peripheral circuit 41, a control circuit 32, and a voltage generation circuit 33.

In the semiconductor device 100, each circuit, each signal, and each voltage can be appropriately selected as needed. Alternatively, another circuit or another signal may be added. A signal BW, a signal CE, a signal GW, a signal CLK, a signal WAKE, a signal ADDR, a signal WDA, a signal PON1, and a signal PON2 are signals input from the outside, and a signal RDA is a signal output to the outside. The signal CLK is a clock signal.

The signal BW, the signal CE, and the signal GW are control signals. The signal CE is a chip enable signal, the signal GW is a global write enable signal, and the signal BW is a byte write enable signal. The signal ADDR is an address signal. The signal WDA is write data, and the signal RDA is read data. The signal PON1 and the signal PON2 are power gating control signals. Note that the signal PON1 and the signal PON2 may be generated in the control circuit 32.

The control circuit 32 is a logic circuit having a function of controlling the entire operation of the semiconductor device 100. For example, the control circuit performs a logical operation on the signal CE, the signal GW, and the signal BW to determine an operation mode (e.g., a writing operation or a reading operation) of the semiconductor device 100. Alternatively, the control circuit 32 generates a control signal for the peripheral circuit 41 so that the operation mode is executed.

The voltage generation circuit 33 has a function of generating a negative voltage. The signal WAKE has a function of controlling the input of the signal CLK to the voltage generation circuit 33. For example, when an H-level signal is supplied as the signal WAKE, the signal CLK is input to the voltage generation circuit 33, and the voltage generation circuit 33 generates a negative voltage.

The peripheral circuit 41 is a circuit for writing and reading data to/from the memory cells 10. The peripheral circuit 41 includes a row decoder 42, a column decoder 44, a row driver 43, a column driver 45, an input circuit 47 (Input Cir.), an output circuit 48 (Output Cir.), and a sense amplifier 46.

The row decoder 42 and the column decoder 44 have a function of decoding the signal ADDR. The row decoder 42 is a circuit for specifying a row to be accessed, and the column decoder 44 is a circuit for specifying a column to be accessed. The row driver 43 has a function of selecting the wiring WL specified by the row decoder 42. The column driver 45 has a function of writing data to the memory cells 10, a function of reading data from the memory cells 10, a function of retaining the read data, and the like.

The input circuit 47 has a function of retaining the signal WDA. Data retained by the input circuit 47 is output to the column driver 45. Data output from the input circuit 47 is data (Din) to be written to the memory cells 10. Data (Dout) read from the memory cells 10 by the column driver 45 is output to the output circuit 48. The output circuit 48 has a function of retaining Dout. In addition, the output circuit 48 has a function of outputting Dout to the outside of the semiconductor device 100. Data output from the output circuit 48 is the signal RDA.

The PSW 22 has a function of controlling supply of VDD to the peripheral circuit 31. The PSW 23 has a function of controlling supply of VHM to the row driver 43. Here, in the semiconductor device 100, a high power supply voltage is VDD and a low power supply voltage is GND (aground potential). In addition, VHM is a high power supply voltage used to set a word line at a high level and is higher than VDD. The on/off of the PSW 22 is controlled by the signal PON1, and the on/off of the PSW 23 is controlled by the signal PON2. The number of power domains to which VDD is supplied is one in the peripheral circuit 31 in FIG. 1A but can be more than one. In this case, a power switch is provided for each power domain.

Figure 1B:
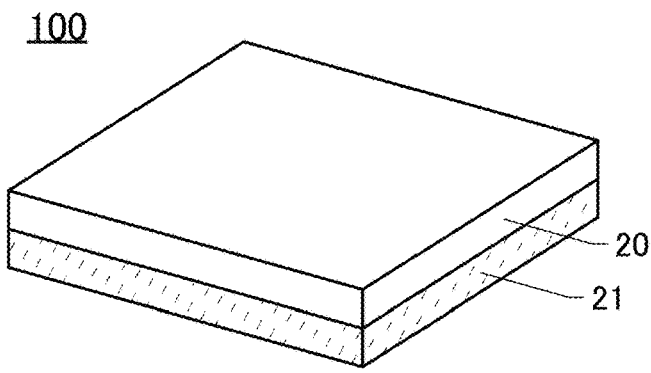

The driver circuit 21 and the memory array 20 may be provided on the same plane. As illustrated in FIG. 1B, the driver circuit 21 and the memory array 20 may be provided to overlap with each other. When the driver circuit 21 and the memory array 20 are provided to overlap with each other, the signal transmission distance can be shortened. In addition, the semiconductor device 100 can be downsized.

Structure Example 1 of Memory Cell

Figure 2A:
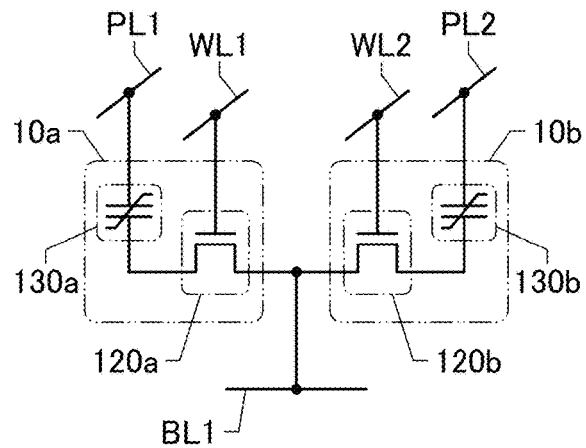
FIG. 2A is a diagram illustrating a circuit structure example of two adjacent memory cells.

Next, a structure example of the memory cells 10 is described. FIG. 2 illustrates a structure example of two adjacent memory cells 10 (a memory cell 10a and a memory cell 10b). FIG. 2A is a diagram illustrating a circuit structure example of the two adjacent memory cells 10.

The memory cell 10a includes a transistor 120a and a capacitor 130a. The memory cell 10b includes a transistor 120b and a capacitor 130b. One of a source and a drain of the transistor 120a is electrically connected to a wiring BL1, and the other is electrically connected to one electrode of the capacitor 130a. A gate of the transistor 120a is electrically connected to a wiring WL1, and the other electrode of the capacitor 130a is electrically connected to a wiring PL1. One of a source and a drain of the transistor 120b is electrically connected to a wiring BL1, and the other is electrically connected to one electrode of the capacitor 130b. A gate of the transistor 120b is electrically connected to a wiring WL2, and the other electrode of the capacitor 130b is electrically connected to a wiring PL2.

For example, when the memory cell 10a is the memory cell 10[i,j], the memory cell 10b can be denoted as a memory cell 10[i+1,j]. When the wiring WL1 is the wiring WL[i], the wiring WL2 can be denoted as a wiring WL[i+1]. The wiring BL1 can be denoted as the wiring BL[j].

When the wiring PL1 is the wiring PL[i], the wiring PL2 can be denoted as a wiring PL[i+1]. Note that a fixed potential is preferably supplied to the wiring PL. Although the wiring PL extends along the X-axis in this embodiment and the like, one embodiment of the present invention is not limited thereto. For example, the wiring PL may extend along the Y-axis. The wiring PL1 and the wiring PL2 may be electrically connected to each other.

A material that can have ferroelectricity is used for a dielectric included in the capacitor 130 (the capacitor 130a, the capacitor 130b, and the like). The capacitor 130 functions as a ferroelectric capacitor.

The material that can have ferroelectricity is preferably hafnium oxide, for example. Alternatively, as the material that can have ferroelectricity, metal oxides such as zirconium oxide and $HfZrO_X$ (X is a real number greater than 0, hereinafter simply referred to as $HfZrO_X$) can be used. Alternatively, as the material that can have ferroelectricity, a material in which an element J1 (the element J1 here is one or more selected from zirconium (Zr), silicon (Si), aluminum (Al), gadolinium (Gd), yttrium (Y), lanthanum (La), strontium (Sr), and the like) is added to hafnium oxide can be used. Here, the atomic ratio of hafnium to the element J1 can be set as appropriate; the atomic ratio of hafnium to the element J1 is, for example, 1:1 or the neighborhood thereof. Alternatively, as the material that can have ferroelectricity, a material in which an element J2 (the element J2 here is one or more selected from hafnium (Hf), silicon (Si), aluminum (Al), gadolinium (Gd), yttrium (Y), lanthanum (La), strontium (Sr), and the like) is added to zirconium oxide, or the like can be used. The atomic ratio of zirconium to the element J2 can be set as appropriate; the atomic ratio of zirconium to the element J2 is, for example, 1:1 or the neighborhood thereof. As the material that can have ferroelectricity, a piezoelectric ceramic having a perovskite structure, such as lead titanate ($PbTiO_X$), barium strontium titanate (BST), strontium titanate, lead zirconate titanate (PZT), strontium bismuth tantalate (SBT), bismuth ferrite (BFO), or barium titanate, may be used.

As the material that can have ferroelectricity, scandium aluminum nitride ($Al_{1-a}Sc_aN_b$ (a is a real number greater than 0 and less than 0.5, and b is 1 or an approximate value thereof), hereinafter simply referred to as AlScN), an Al—Ga—Sc nitride, a Ga—Sc nitride, or the like can be used. As the material that can have ferroelectricity, a metal nitride containing an element M1, an element M2, and nitrogen can also be used. Here, the element M1 is one or more selected from aluminum (Al), gallium (Ga), indium (In), and the like. The element M2 is one or more selected from boron (B), scandium (Sc), yttrium (Y), lanthanoids (lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu)), actinoids (15 elements from actinium (Ac) to lawrencium (Lr)), titanium (Ti), zirconium (Zr), hafnium (Hf), vanadium (V), niobium (Nb), tantalum (Ta), chromium (Cr), and the like. Note that the atomic ratio of the element M1 to the element M2 can be set as appropriate. A metal oxide containing the element M1 and nitrogen has ferroelectricity in some cases even though the metal oxide does not contain the element M2. As the material that can have ferroelectricity, a material in which an element M3 is added to the above metal nitride can be used. Note that the element M3 is one or more selected from magnesium (Mg), calcium (Ca), strontium (Sr), zinc (Zn), cadmium (Cd), and the like. Here, the atomic ratio of the element M1 to the element M2 and the element M3 can be set as appropriate. Since the above metal nitride contains at least a Group 13 element and nitrogen, which is a Group 15 element, the metal nitride is referred to as a ferroelectric of Group III-V, a ferroelectric of a Group III nitride, or the like in some cases.

As the material that can have ferroelectricity, a perovskite-type oxynitride such as $SrTaO_2N$ or $BaTaO_2N$, $GaFeO_3$ with a κ-alumina-type structure, or the like can be used.

The material that can have ferroelectricity can be, for example, a mixture or a compound formed of a plurality of materials selected from the above-listed materials. Alternatively, the material that can have ferroelectricity can have a stacked-layer structure of a plurality of materials selected from the above-listed materials. Since the above-listed materials may change their crystal structures or characteristics according to a variety of processes and the like as well as deposition conditions, a material that exhibits ferroelectricity is referred to not only as a ferroelectric but also as a material that can have ferroelectricity or a material that has ferroelectricity in this specification and the like.

Among the materials that can have ferroelectricity, a material containing hafnium oxide or hafnium oxide and zirconium oxide (typically, $HfZrO_X$) is preferable because the material can have ferroelectricity even when being processed into a thin film of several nanometers.

Alternatively, scandium aluminum nitride (AlScN), which can be formed by a sputtering method, is preferable as the material that can have ferroelectricity because the impurity concentration in the film can be reduced or a dense film can be formed. In the case where scandium aluminum nitride (AlScN) is used as the material that can have ferroelectricity, a film can be expected to have high reliability.

The thickness of the material that can have ferroelectricity can be less than or equal to 100 nm, preferably less than or equal to 50 nm, further preferably less than or equal to 20 nm, still further preferably less than or equal to 10 nm (typically, greater than or equal to 2 nm and less than or equal to 9 nm). The thickness is preferably greater than or equal to 8 nm and less than or equal to 12 nm, for example. When the material that can have ferroelectricity has a thickness in the above range, ferroelectricity can be exhibited with a thin film. When the ferroelectric layer can have a small thickness, the ferroelectric layer can be interposed between a pair of electrodes of a capacitor, and the capacitor can be combined with a semiconductor element such as a miniaturized transistor to fabricate a semiconductor device. That is, a semiconductor device that occupies a small area can be easily obtained. Note that in this specification and the like, the material that can have ferroelectricity processed into a layered shape is referred to as a ferroelectric layer, a metal oxide film, or a metal nitride film in some cases. Furthermore, a device including such a ferroelectric layer, metal oxide film, or metal nitride film is sometimes referred to as a ferroelectric device in this specification and the like.

In the case where $HfZrO_X$ is used as the material that can have ferroelectricity, deposition is preferably performed by an atomic layer deposition (ALD) method, particularly a thermal ALD method. In the case where deposition of the material that can have ferroelectricity is performed by a thermal ALD method, it is suitable to use a material that does not contain a hydrocarbon (also referred to as Hydro Carbon or HC) for a precursor. When the material that can have ferroelectricity contains one or both of hydrogen and carbon, crystallization of the material that can have ferroelectricity might be hindered. Thus, the precursor that does not contain a hydrocarbon is preferably used as described above to reduce the concentration(s) of one or both of hydrogen and carbon in the material that can have ferroelectricity. Examples of the precursor that does not contain a hydrocarbon include a chlorine-based material. In the case where a material containing hafnium oxide and zirconium oxide ($HfZrO_X$) is used as the material that can have ferroelectricity, $HfCl_4$ and/or $ZrCl_4$ are/is used as the precursor. On the other hand, a dopant (typically, silicon, carbon, or the like) for controlling the polarization state may be added to the material that can have ferroelectricity. In that case, a formation method using a material containing hydrocarbon as a precursor may be used as a way of adding carbon as a dopant.

In the case of depositing a film of the material that can have ferroelectricity, impurities in the film, at least one or more of hydrogen, a hydrocarbon, and carbon here, are thoroughly removed, whereby a highly purified intrinsic film having ferroelectricity can be formed. Note that the highly purified intrinsic film having ferroelectricity and a highly purified intrinsic oxide semiconductor described in a later embodiment are highly compatible with each other in the manufacturing process. Thus, a method for manufacturing a semiconductor device with high productivity can be provided.

The material that can have ferroelectricity preferably has a low impurity concentration. In particular, the concentrations of hydrogen (H) and carbon (C) are preferably as low as possible. Specifically, the hydrogen concentration of the material that can have ferroelectricity is preferably lower than or equal to $5 \times 10^{20}$ atoms/cm$^3$, further preferably lower than or equal to $1\times10^{20}$ atoms/cm$^3$. The carbon concentration of the material that can have ferroelectricity is preferably lower than or equal to $5\times10^{19}$ atoms/cm$^3$, further preferably lower than or equal to $1\times10^{19}$ atoms/cm$^3$.

In the case where HfZrO$_X$ is used as the material that can have ferroelectricity, hafnium oxide and zirconium oxide are preferably deposited alternately by a thermal ALD method to have a composition of 1:1.

In the case where deposition of the material that can have ferroelectricity is performed by a thermal ALD method, H$_2$O or O$_3$ can be used as an oxidizer. However, the oxidizer in the thermal ALD method is not limited thereto. For example, the oxidizer in the thermal ALD method may contain any one or more selected from O$_2$, O$_3$, N$_2$O, NO$_2$, H$_2$O, and H$_2$O$_2$.

There is no particular limitation on the crystal structure of the material that can have ferroelectricity. For example, the material that can have ferroelectricity may have any one or more selected from cubic, tetragonal, orthorhombic, and monoclinic crystal structures. The material that can have ferroelectricity especially preferably has an orthorhombic crystal structure to exhibit ferroelectricity. Note that a layer that increases the crystallinity may be formed before forming the material that can have ferroelectricity. For example, in the case where HfZrO$_X$ is used as the material that can have ferroelectricity, a metal oxide such as hafnium oxide or zirconium oxide, hafnium, or zirconium can be used for the layer that increases the crystallinity. In the case where AlScN is used as the material that can have ferroelectricity, a metal nitride such as aluminum nitride or scandium nitride, aluminum, or scandium is preferably used for the layer that increases the crystallinity. Note that the layer that increases the crystallinity may be formed after formation of the material that can have ferroelectricity. Alternatively, the material that can have ferroelectricity may have a composite structure of an amorphous structure and a crystal structure.

Figure 8:
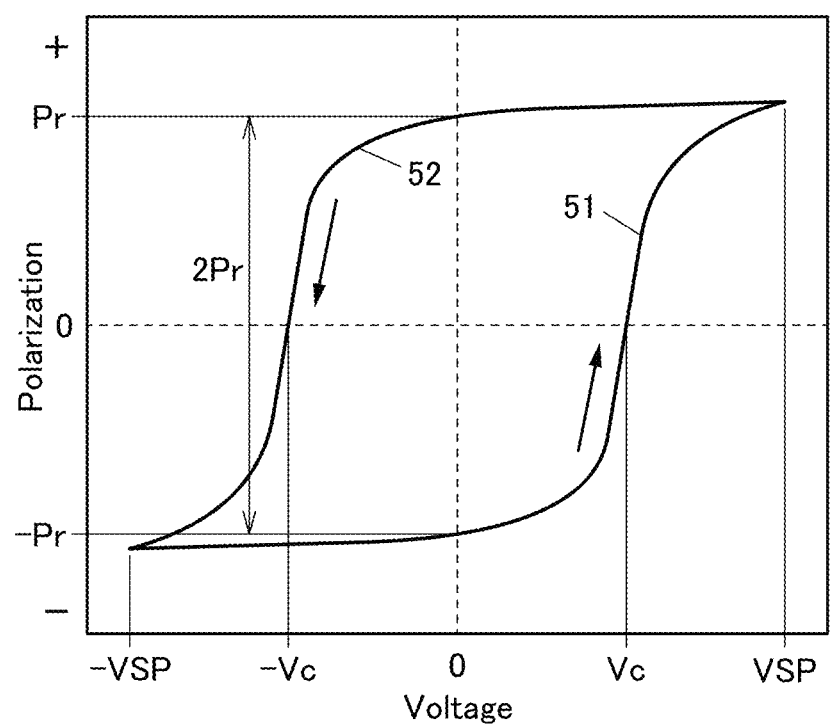
FIG. 8 is diagram showing an example of hysteresis characteristics.

The ferroelectric exhibits hysteresis characteristics in some cases. FIG. 8 is a diagram showing an example of hysteresis characteristics. The hysteresis characteristics can be measured using a capacitor including a ferroelectric layer as a dielectric layer (a ferroelectric capacitor). In FIG. 8, the horizontal axis represents voltage (electric field) applied to the ferroelectric layer. This voltage is a potential difference between one electrode and the other electrode of the capacitor including the ferroelectric layer as the dielectric layer. The electric field strength can be obtained by dividing the potential difference by the thickness of the ferroelectric layer.

In FIG. 8, the vertical axis represents polarization of the ferroelectric layer. Positive polarization indicates that positive charge in the ferroelectric layer is biased toward one electrode side of the capacitor and negative charge is biased toward the other electrode side of the capacitor. By contrast, negative polarization indicates that negative charge in the ferroelectric layer is biased toward one electrode side of the capacitor and positive charge is biased toward the other electrode side of the capacitor.

The polarization represented by the vertical axis of the graph in FIG. 8 may be positive when negative charge is biased toward one electrode side of the capacitor and positive charge is biased toward the other electrode side of the capacitor, and may be negative when positive charge is biased toward one electrode side of the capacitor and negative charge is biased toward the other electrode side of the capacitor.

As shown in FIG. 8, the hysteresis characteristics of the ferroelectric layer can be represented by a curve 51 and a curve 52. Voltages at intersection points of the curve 51 and the curve 52 are referred to as a saturation polarization voltage VSP and a saturation polarization voltage −VSP. VSP and −VSP can be regarded as having different polarities.

When a voltage lower than or equal to −VSP is applied to the ferroelectric layer and then the voltage applied to the ferroelectric layer increases, the polarization of the ferroelectric layer increases along the curve 51. Meanwhile, when a voltage higher than or equal to VSP is applied to the ferroelectric layer and then the voltage applied to the ferroelectric layer decreases, the polarization of the ferroelectric layer decreases along the curve 52. Note that in some cases, VSP is referred to as a "positive saturation polarization voltage" or a "first saturation polarization voltage", and −VSP is referred to as a "negative saturation polarization voltage" or a "second saturation polarization voltage". The absolute value of the first saturation polarization voltage may be the same as or different from the absolute value of the second saturation polarization voltage.

Here, the voltage at the time when the polarization of the ferroelectric layer changes along the curve 51 to reach 0 is referred to as a coercive voltage Vc. The voltage at the time when the polarization of the ferroelectric layer changes along the curve 52 to reach 0 is referred to as a coercive voltage −Vc. The value of Vc and the value of −Vc are each a value between −VSP and VSP. In some cases, Vc is referred to as a "positive coercive voltage" or a "first coercive voltage", and −Vc is referred to as a "negative coercive voltage" or a "second coercive voltage". The absolute value of the first coercive voltage may be the same as or different from the absolute value of the second coercive voltage.

The maximum value and the minimum value of polarization when voltage is not applied to the ferroelectric layer (when the voltage is 0 V) are referred to as "remanent polarization Pr" and "remanent polarization −Pr", respectively. The difference between the absolute values of the remanent polarization Pr and the remanent polarization −Pr is referred to as "remanent polarization 2Pr". A larger remanent polarization 2Pr increases the range of a change in the capacitance value of the ferroelectric capacitor due to polarization reversal. The remanent polarization 2Pr is preferably as large as possible.

The memory cells 10 each include the capacitor 130 that is a ferroelectric capacitor and the transistor 120 and has a function of storing information using a change in a capacitance value due to polarization reversal in the capacitor 130. The memory cells 10 each function as a ferroelectric memory. A memory cell composed of one transistor and one ferroelectric capacitor is also referred to as a 1T1F memory cell.

As the semiconductor layer in which the channel of the transistor 120 (a transistor 120*a*, a transistor 120*b*, and the like) is formed, a single crystal semiconductor, a polycrystalline semiconductor, a microcrystalline semiconductor, an amorphous semiconductor, or the like can be used alone or in combination. As a semiconductor material, silicon, germanium, or the like can be used, for example. Alternatively, a compound semiconductor such as silicon germanium, silicon carbide, gallium arsenide, an oxide semiconductor, or a nitride semiconductor may be used.

Note that the transistor 120 is preferably a transistor using an oxide semiconductor, which is a kind of metal oxide, in its semiconductor layer in which a channel is formed (such a transistor is also referred to as an "OS transistor"). An oxide semiconductor has a band gap greater than or equal to 2 eV, and thus has an extremely low off-state current. Thus, the power consumption of the memory cells 10 can be reduced. Accordingly, the power consumption of the semiconductor device 100 including the memory cells 10 can be reduced.

A memory cell including an OS transistor can be referred to as an "OS memory". The semiconductor device 100 including the memory cell can also be referred to as an "OS memory".

The OS transistor operates stably even in a high-temperature environment and has small fluctuation in characteristics. For example, the off-state current hardly increases even in the high-temperature environment. Specifically, the off-state current hardly increases even at an environmental temperature higher than or equal to room temperature and lower than or equal to 200° C. Furthermore, the on-state current is unlikely to decrease even in the high-temperature environment. Thus, the OS memory can operate stably and have high reliability even in the high-temperature environment.

Moreover, the OS transistor has a high breakdown voltage between its source and drain. Even when the channel length of the transistor 120 is reduced, the use of the OS transistor as the transistor 120 allows voltage required for polarization reversal to be supplied to the capacitor 130. This can reduce the area occupied by the memory cell 10. Accordingly, the memory capacity and/or memory density of the semiconductor device can be increased.

Figure 2B:
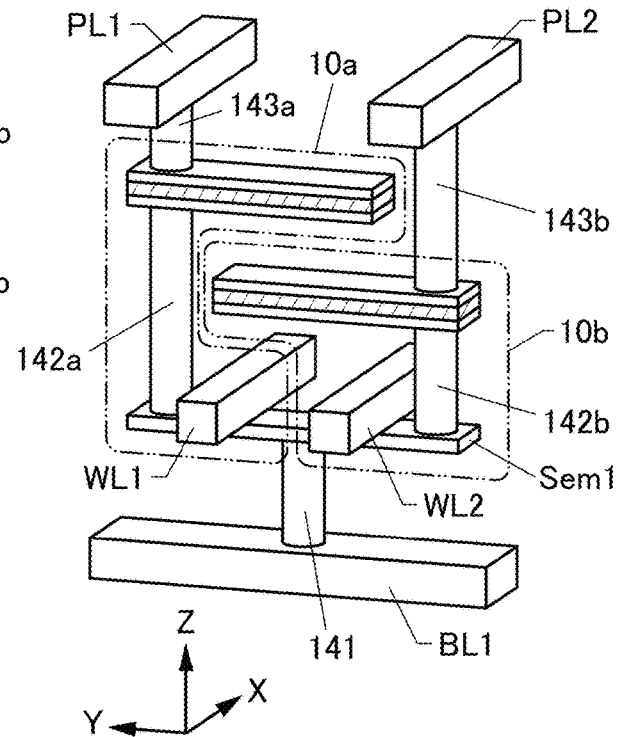
FIG. 2B is a perspective view illustrating a structure example of the two adjacent memory cells.

FIG. 2B is a perspective view illustrating a structure example of the two adjacent memory cells 10. Note that arrows indicating the X direction (direction along the X-axis), the Y direction (direction along the Y-axis), and the Z direction (direction along the Z-axis) are sometimes illustrated in the drawings and the like. In this specification and the like, the "X direction" is a direction along the X-axis, and the forward direction and the reverse direction are not distinguished in some cases. The same applies to the "Y direction" and the "Z direction". The X direction, the Y direction, and the Z direction are directions intersecting with each other. More specifically, the X direction, the Y direction, and the Z direction are directions orthogonal to each other. In this specification and the like, one of the X direction, the Y direction, and the Z direction is referred to as a "first direction" in some cases. Another one of the directions is referred to as a "second direction" in some cases. The remaining one of the directions is referred to as a "third direction" in some cases. In FIG. 2 and the like, the direction where the wiring WL extends is the X direction and the direction where the wiring BL extends is the Y direction.

Figure 2C:
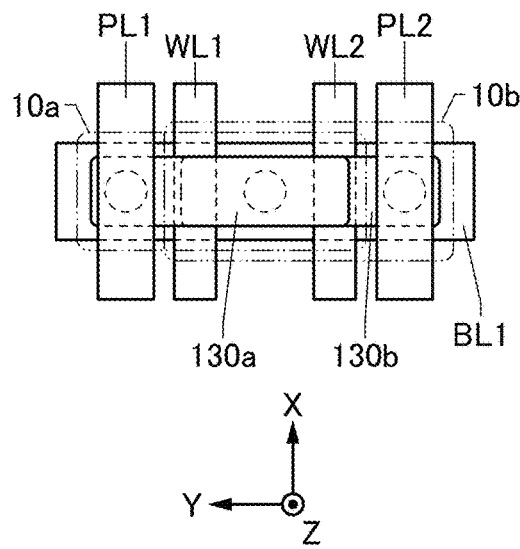
FIG. 2C is a top view of the two adjacent memory cells.
Figure 2D:
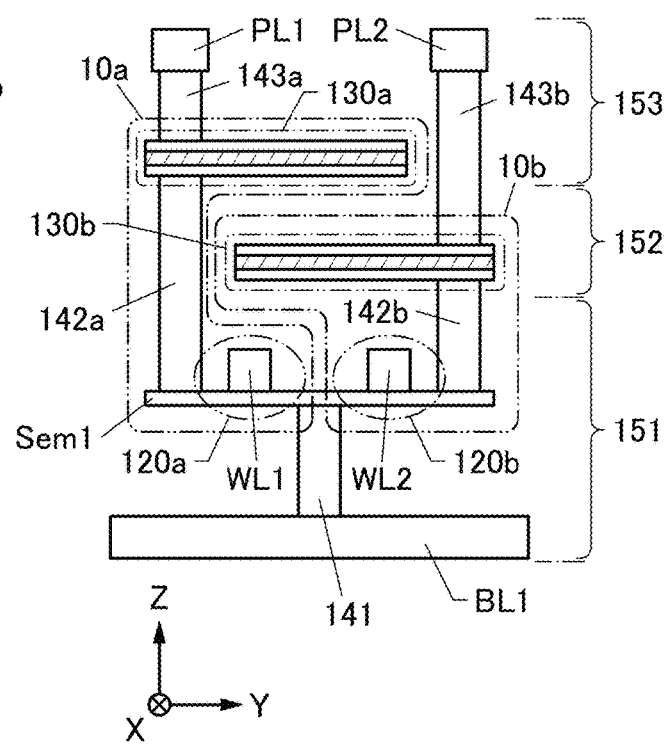
FIG. 2D is a front view of the two adjacent memory cells.

FIG. 2C is a top view of the structure example illustrated in FIG. 2B. FIG. 2D is a view (front view) of the structure example illustrated in FIG. 2B seen in the X direction. In the structure example illustrated in FIG. 2, the two memory cells 10 are provided in a transistor layer 151, a first capacitor layer 152, and a second capacitor layer 153. The first capacitor layer 152 is provided over the transistor layer 151, and the second capacitor layer 153 is provided over the first capacitor layer 152.

The transistor 120a and the transistor 120b are provided in the transistor layer 151. The capacitor 130b is provided in the first capacitor layer 152. The capacitor 130a is provided in the second capacitor layer 153.

Figure 3A:
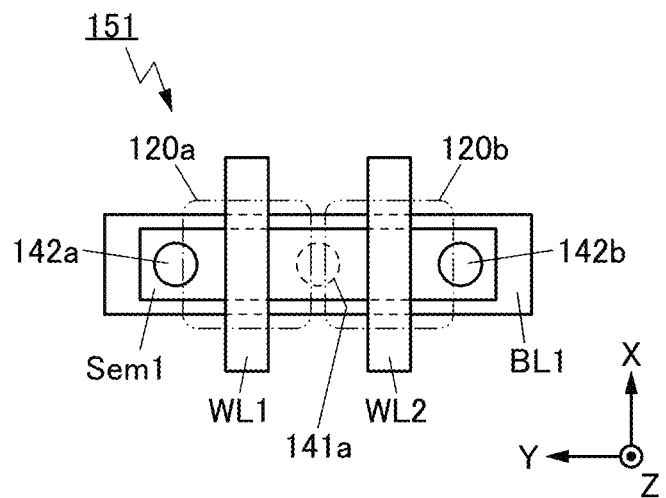
FIG. 3A to FIG. 3C are top views each illustrating one embodiment of the present invention.
Figure 3B:
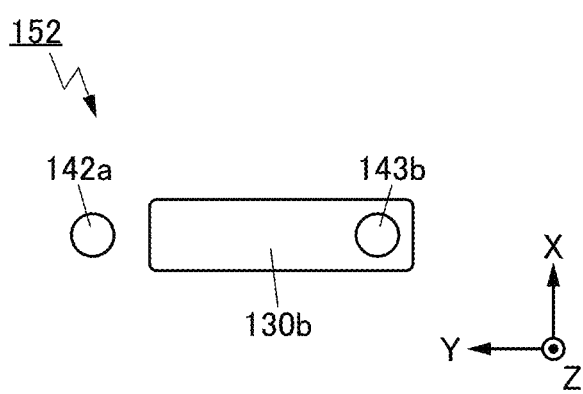
Figure 3C:
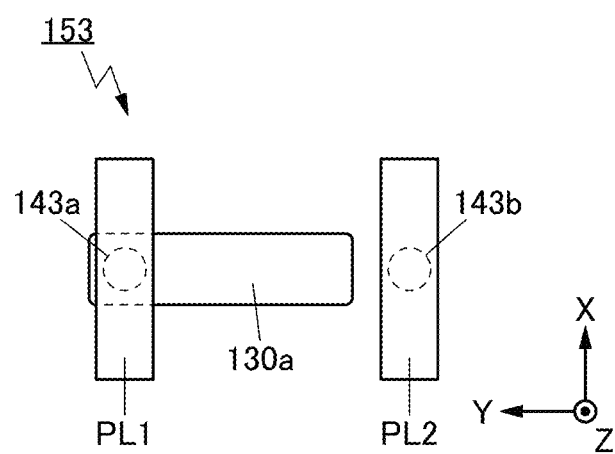

FIG. 3A is a top view of the transistor layer 151 seen in the Z direction. FIG. 3B is a top view of the first capacitor layer 152 seen in the Z direction. FIG. 3C is a top view of the second capacitor layer 153 seen in the Z direction.

A region where a semiconductor Sem1 and the wiring WL1 overlap with each other functions as a channel formation region of the transistor 120a. A region where the semiconductor Sem1 and the wiring WL2 overlap with each other functions as a channel formation region of the transistor 120b. A region of the semiconductor Sem1 that overlaps with neither the wiring WL1 nor the wiring WL2 functions as a source or a drain. Thus, the wiring WL1 functions as the gate of the transistor 120a. The wiring WL2 functions as the gate of the transistor 120b.

One of the source and the drain of each of the transistor 120a and the transistor 120b is electrically connected to the wiring BL1 through a conductor 141. The other of the source and the drain of the transistor 120a is electrically connected to the capacitor 130a through a conductor 142a. The other of the source and the drain of the transistor 120b is electrically connected to the capacitor 130b through a conductor 142b.

The capacitor 130a is electrically connected to the wiring PL1 through a conductor 143a. The capacitor 130b is electrically connected to the wiring PL2 through a conductor 143b.

As illustrated in FIG. 2B to FIG. 2D, the capacitor 130a and the capacitor 130b are provided in different layers so as to overlap with each other. That is, the capacitor 130a and the capacitor 130b have a region where they overlap with each other when seen in the Z direction. The capacitor 130a and the capacitor 130b are provided above the transistor 120a and the transistor 120b so as to overlap with each other, whereby the area of the capacitors 130 can be increased without an increase in the area occupied by the memory cells 10.

For example, in the structure example illustrated in FIG. 2, the memory cell 10a and the memory cell 10b are adjacent to each other in the Y direction; thus, the capacitor 130a and the capacitor 130b can extend in the Y direction. Accordingly, the reliability of the memory cells 10 can be increased without a decrease in the degree of integration of the memory cells 10. This can increase the reliability of a memory device including the memory cells 10.

The remanent polarization of the capacitor 130a is preferably equal to the remanent polarization of the capacitor 130b. The same remanent polarization reduces variations in writing characteristics and reading characteristics among memory cells, achieving a reduction in power consumption and an improvement in reliability, for example.

The capacitance value of the capacitor 130a is preferably equal to the capacitance value of the capacitor 130b. The same capacitance value reduces variations in characteristics among memory cells, achieving a reduction in power consumption and an improvement in reliability, for example.

Structure Example 2 of Memory Cell

Structure example 1 of memory cell illustrates, but one embodiment of the present invention is not limited to, the structure in which the capacitors 130 are stacked in two layers. FIG. 4 and FIG. 5 illustrate structure examples in which the capacitors 130 of four adjacent memory cells 10 are stacked in three layers.

FIG. 4 illustrates a structure example of four adjacent memory cells 10 (the memory cell 10a, the memory cell 10b, a memory cell 10c, and a memory cell 10d). FIG. 4A is a perspective view illustrating a structure example of the four adjacent memory cells 10. FIG. 4B is a view (front view) of the structure example illustrated in FIG. 4A seen in the X direction. FIG. 4C is a diagram illustrating a circuit structure example of the four adjacent memory cells 10.

The circuit structure of the memory cell 10a and the memory cell 10b in FIG. 4C is the same as that illustrated in FIG. 2A. The memory cell 10c includes a transistor 120c and a capacitor 130c. The memory cell 10d includes a transistor 120d and a capacitor 130d. One of a source and a drain of the transistor 120c is electrically connected to a wiring BL2, and the other is electrically connected to one electrode of the capacitor 130c. A gate of the transistor 120c is electrically connected to the wiring WL1, and the other electrode of the capacitor 130c is electrically connected to a wiring PL3. One of a source and a drain of the transistor 120d is electrically connected to a wiring BL2, and the other is electrically connected to one electrode of the capacitor 130d. A gate of the transistor 120d is electrically connected to the wiring WL2, and the other electrode of the capacitor 130d is electrically connected to a wiring PL4.

For example, when the memory cell 10a is a memory cell 10[i,j], the memory cell 10b can be denoted as a memory cell 10[i+1,j]. The memory cell 10c can be denoted as a memory cell 10[i,j+1]. The memory cell 10d can be denoted as a memory cell 10[i+1,j+1]. When the wiring WL1 is a wiring WL[i], the wiring WL2 can be denoted as a wiring WL[i+1]. When the wiring BL1 is a wiring BL[j], the wiring BL2 can be denoted as a wiring BL[j+1]. The wiring PL1, the wiring PL2, the wiring PL3, and the wiring PL4 may be electrically connected to each other.

In the structure example illustrated in FIG. 4A and FIG. 4B, the transistors 120 included in the four memory cells 10 are provided in the transistor layer 151, and the capacitor 130 is provided in any of the first capacitor layer 152, the second capacitor layer 153, and a third capacitor layer 154. The first capacitor layer 152 is provided over the transistor layer 151, the second capacitor layer 153 is provided over the first capacitor layer 152, and the third capacitor layer 154 is provided over the second capacitor layer 153.

More specifically, the transistor 120a, the transistor 120b, the transistor 120c, and the transistor 120d are provided in the transistor layer 151. The capacitor 130b is provided in the first capacitor layer 152. The capacitor 130a is provided in the second capacitor layer 153. The capacitor 130c and the capacitor 130d are provided in the third capacitor layer 154.

Although not illustrated in FIG. 4, the capacitor 130a to the capacitor 130d are provided over insulators (insulating layers). The capacitor 130c and the capacitor 130d are provided over the same insulating layer, and the capacitor 130a and the capacitor 130b are provided over different insulating layers.

Figure 5A:
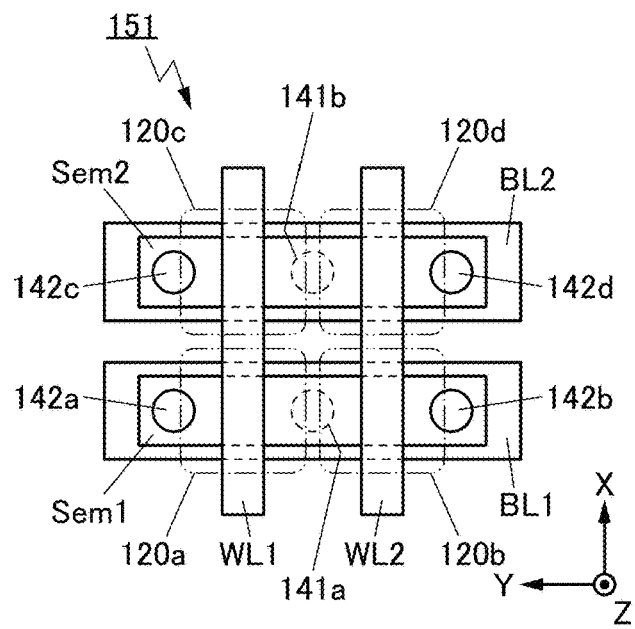
FIG. 5A to FIG. 5E are top views each illustrating one embodiment of the present invention.
Figure 5B:
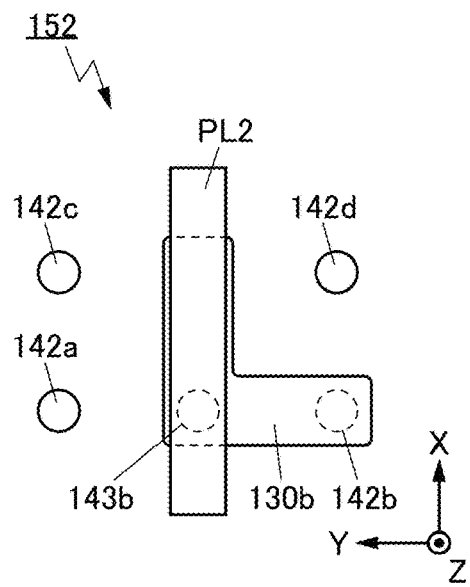
Figure 5C:
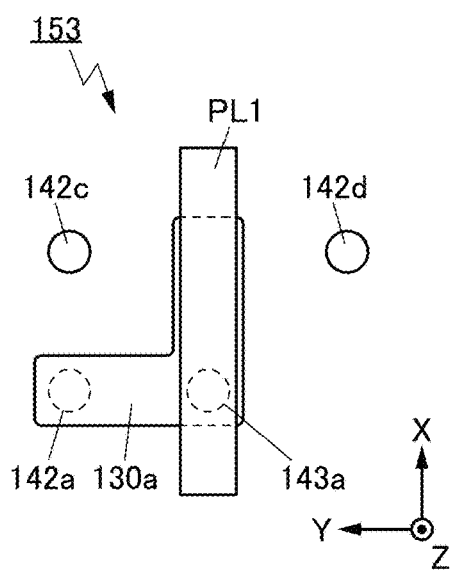
Figure 5D:
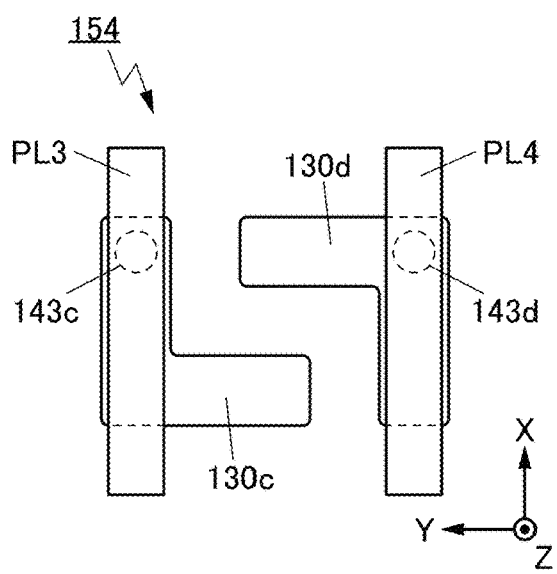

FIG. 5A is a top view of the transistor layer 151 seen in the Z direction. FIG. 5B is a top view of the first capacitor layer 152 seen in the Z direction. FIG. 5C is a top view of the second capacitor layer 153 seen in the Z direction. FIG. 5D is a top view of the third capacitor layer 154 seen in the Z direction.

A region where the semiconductor Sem1 and the wiring WL1 overlap with each other functions as a channel formation region of the transistor 120a. A region where the semiconductor Sem1 and the wiring WL2 overlap with each other functions as a channel formation region of the transistor 120b. A region of the semiconductor Sem1 that overlaps with neither the wiring WL1 nor the wiring WL2 functions as a source or a drain. Thus, the wiring WL1 functions as the gate of the transistor 120a. The wiring WL2 functions as the gate of the transistor 120b.

A region where a semiconductor Sem2 and the wiring WL1 overlap with each other functions as a channel formation region of the transistor 120c. A region where the semiconductor Sem2 and the wiring WL2 overlap with each other functions as a channel formation region of the transistor 120d. A region of the semiconductor Sem2 that overlaps with neither the wiring WL1 nor the wiring WL2 functions as a source or a drain. Thus, the wiring WL1 functions as the gate of the transistor 120c. The wiring WL2 functions as the gate of the transistor 120d.

One of the source and the drain of each of the transistor 120a and the transistor 120b is electrically connected to the wiring BL1 through a conductor 141a. The other of the source and the drain of the transistor 120a is electrically connected to the capacitor 130a through the conductor 142a. The other of the source and the drain of the transistor 120b is electrically connected to the capacitor 130b through the conductor 142b.

The capacitor 130a is electrically connected to the wiring PL1 through the conductor 143a. The capacitor 130b is electrically connected to the wiring PL2 through the conductor 143b.

One of the source and the drain of each of the transistor 120c and the transistor 120d is electrically connected to the wiring BL2 through a conductor 141b. The other of the source and the drain of the transistor 120a is electrically connected to the capacitor 130c through a conductor 142c. The other of the source and the drain of the transistor 120d is electrically connected to the capacitor 130d through a conductor 142d.

The capacitor 130c is electrically connected to the wiring PL3 through a conductor 143c. The capacitor 130d is electrically connected to the wiring PL4 through a conductor 143d.

When the capacitors in the memory cell 10a, the memory cell 10b, the memory cell 10c, and the memory cell 10d are stacked as illustrated in FIG. 4 and FIG. 5, the area of the capacitors can be increased. The capacitors 130, which can extend in the Y direction in Structure example 1 of memory cell, can extend in the X direction as well as the Y direction in the structure disclosed in Structure example 2 of memory cell. Thus, the area of the capacitors 130 can be further increased in the structure disclosed in Structure example 2 of memory cell than in the structure disclosed in Structure example 1 of memory cell.

In Structure example 2 of memory cell, the four capacitors 130 are provided in the first to third capacitor layers. Accordingly, two of the four capacitors 130 (the capacitor 130c and the capacitor 130d) are provided in the same capacitor layer.

Figure 5E:
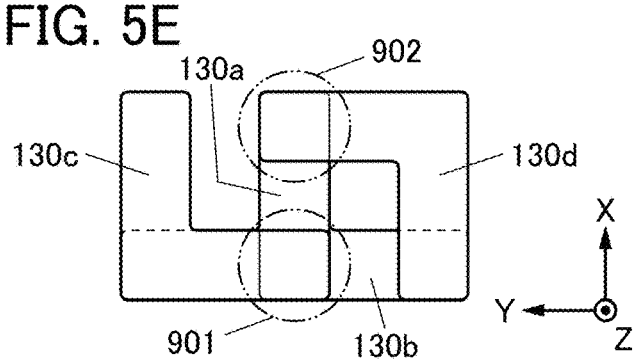

Thus, in Structure example 2 of memory cell, three of the four capacitors 130 have a region where they overlap with each other when seen in the Z direction. FIG. 5E is a diagram illustrating the four capacitors 130 seen in the Z direction from the third capacitor layer 154 side. In a region 901, parts of the capacitor 130a, the capacitor 130b, and the capacitor 130c overlap with each other. In a region 902, parts of the capacitor 130a, the capacitor 130b, and the capacitor 130d overlap with each other.

The area of the capacitors 130 can be further increased in the structure disclosed in Structure example 2 of memory cell than in the structure disclosed in Structure example 1 of memory cell. This can further increase the reliability of the memory device.

Structure Example 3 of Memory Cell

FIG. 6 and FIG. 7 illustrate structure examples in which the capacitors 130 of four adjacent memory cells 10 are stacked in four layers. Difference from the aforementioned structure examples is described to avoid repetitive description.

Figure 6A:
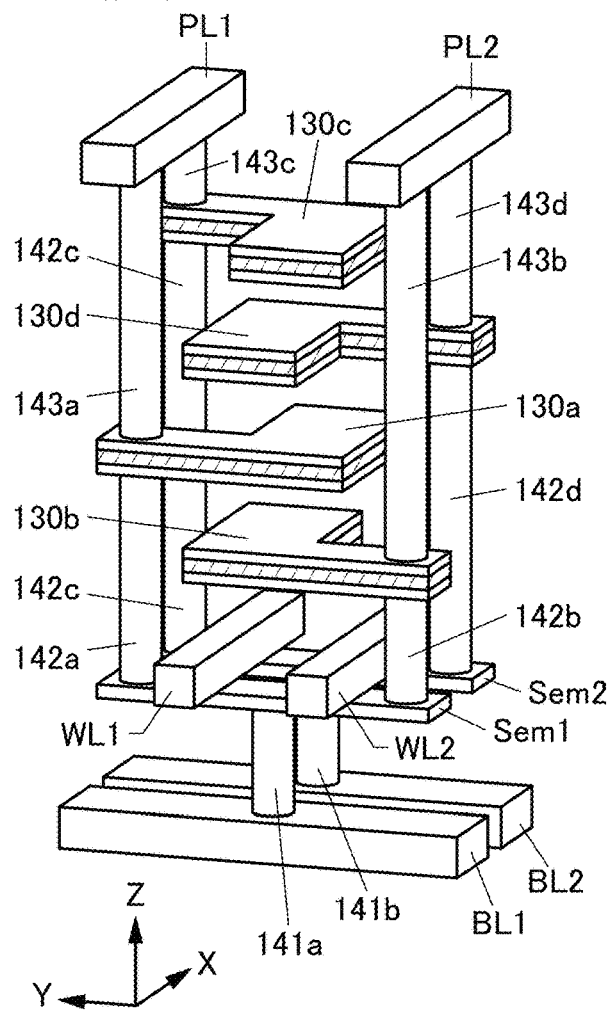
FIG. 6A is a perspective view illustrating a structure example of two adjacent memory cells.
Figure 6B:
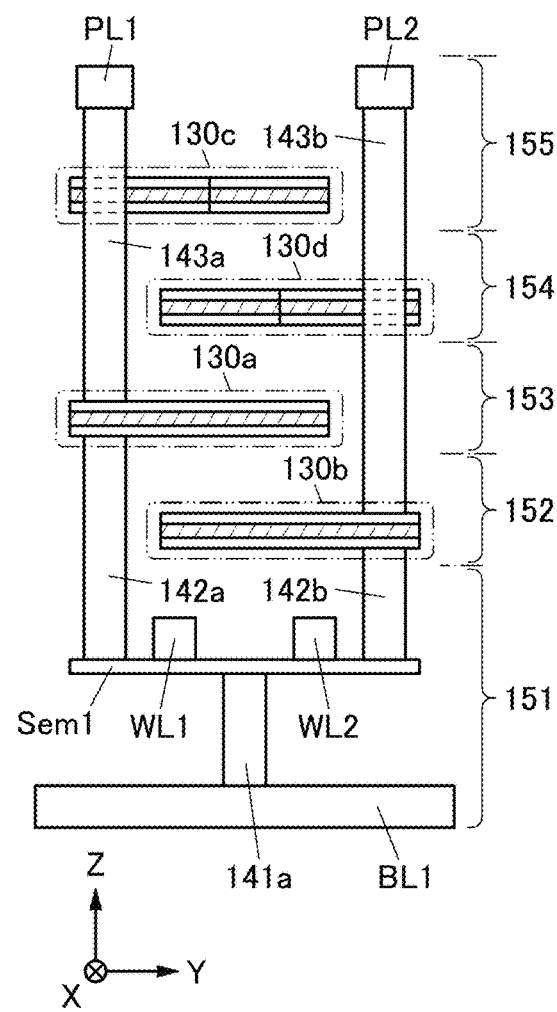
FIG. 6B is a front view of the two adjacent memory cells.
Figure 6C:
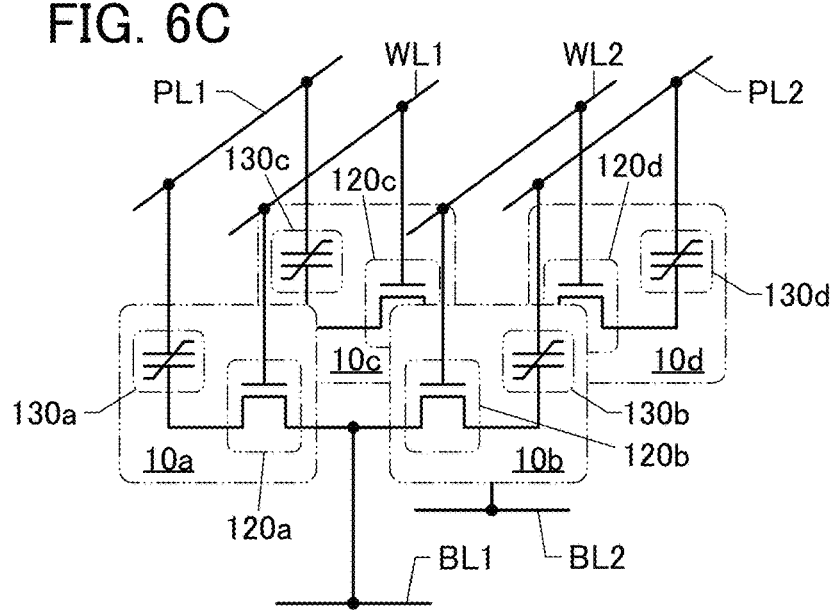
FIG. 6C is a diagram illustrating a circuit structure example of the two adjacent memory cells.

FIG. 6 illustrates a structure example of the four adjacent memory cells 10 (the memory cell 10a, the memory cell 10b, the memory cell 10c, and the memory cell 10d). FIG. 6A is a perspective view illustrating a structure example of the four adjacent memory cells 10. FIG. 6B is a view (front view) of the structure example illustrated in FIG. 6A seen in the X direction. FIG. 6C is a diagram illustrating a circuit structure example of the four adjacent memory cells 10.

The circuit structure example illustrated in FIG. 6C is substantially the same as that illustrated in FIG. 4C except that the other electrode of the capacitor 130c is electrically connected to the wiring PL1 and the other electrode of the capacitor 130d is electrically connected to the wiring PL2.

In the structure example illustrated in FIG. 6A and FIG. 6B, the transistors 120 included in the four memory cells 10 are provided in the transistor layer 151, and the capacitor 130 is provided in any of the first capacitor layer 152, the second capacitor layer 153, the third capacitor layer 154, and a fourth capacitor layer 155. The first capacitor layer 152 is provided over the transistor layer 151, the second capacitor layer 153 is provided over the first capacitor layer 152, the third capacitor layer 154 is provided over the second capacitor layer 153, and the fourth capacitor layer 155 is provided over the third capacitor layer 154.

More specifically, the transistor 120a, the transistor 120b, the transistor 120c, and the transistor 120d are provided in the transistor layer 151. The capacitor 130b is provided in the first capacitor layer 152. The capacitor 130a is provided in the second capacitor layer 153. The capacitor 130d is provided in the third capacitor layer 154. The capacitor 130c is provided in the fourth capacitor layer 155.

Although not illustrated in FIG. 6, the capacitor 130a to the capacitor 130d are provided over different insulators (insulating layers).

FIG. 7A is a top view of the transistor layer 151 seen in the Z direction. FIG. 7B is a top view of the first capacitor layer 152 seen in the Z direction. FIG. 7C is a top view of the second capacitor layer 153 seen in the Z direction. FIG. 7D is a top view of the third capacitor layer 154 seen in the Z direction. FIG. 7E is a top view of the fourth capacitor layer 155 seen in the Z direction.

The connection structures of the transistors 120, the capacitors 130, the conductors 142, and the conductors 143 are substantially the same as those shown in Structure example 2 except that the wiring PL3 and the wiring PL4 are not provided and the conductor 143a and the conductor 143b are arranged in a different way when seen in the Z direction, for example. Since the wiring PL3 and the wiring PL4 are not provided, the capacitor 130c is electrically connected to the wiring PL1 through the conductor 143c. The capacitor 130d is electrically connected to the wiring PL2 through the conductor 143d. The wiring PL1 and the wiring PL2 are provided above the capacitor 130c.

When the capacitors in the memory cell 10a, the memory cell 10b, the memory cell 10c, and the memory cell 10d are stacked as illustrated in FIG. 6 and FIG. 7, the area of the capacitors can be increased. The number of wirings in Structure example 3 of memory cell can be smaller than that in the structure disclosed in Structure example 2 of memory cell. In Structure example 3 of memory cell, the capacitors 130 can further extend in the Y direction than in the structure disclosed in Structure example 2 of memory cell. Thus, the area of the capacitors 130 can be further increased in the structure disclosed in Structure example 3 of memory cell than in the structure disclosed in Structure example 2 of memory cell.

In Structure example 3 of memory cell, the four capacitors 130 have a region where they overlap with each other when seen in the Z direction. FIG. 7F is a diagram illustrating the four capacitors 130 seen in the Z direction from the fourth capacitor layer 155 side. In a region 911, parts of the capacitor 130a, the capacitor 130b, the capacitor 130c, and the capacitor 130d overlap with each other.

The area of the capacitors 130 can be increased when the number of adjacent memory cells 10 is increased and the respective capacitors 130 are provided so as to overlap with each other. This can further increase the reliability of the memory device.

This embodiment can be combined as appropriate with any of the other embodiments and the like described in this specification.

Embodiment 2

In this embodiment, structure examples of a transistor are described as an example of a semiconductor device.

Structure Example of Semiconductor Device

Figure 9A:
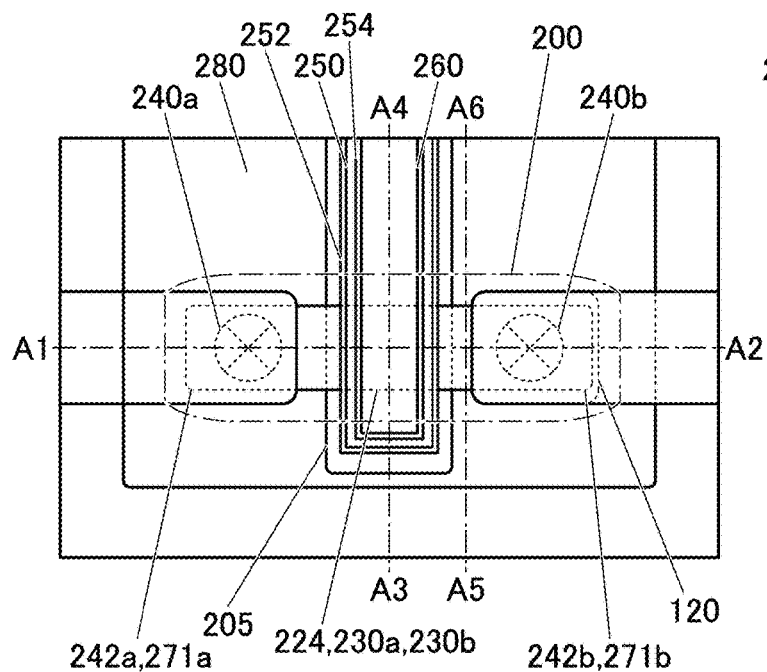
FIG. 9A is a top view illustrating a structure example of a transistor.
Figure 9C:
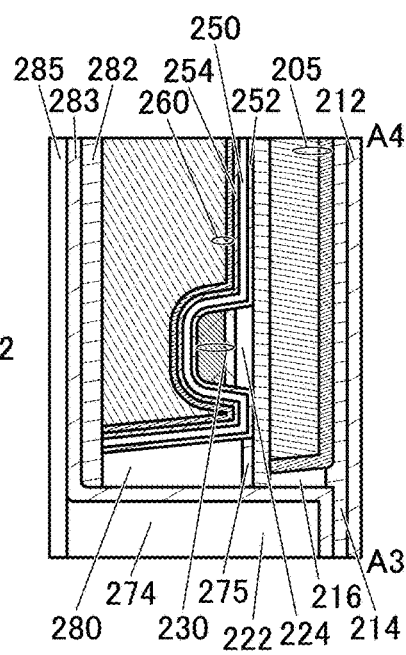
FIG. 9B to FIG. 9D are cross-sectional views illustrating a structure example of a transistor.
Figure 9B:
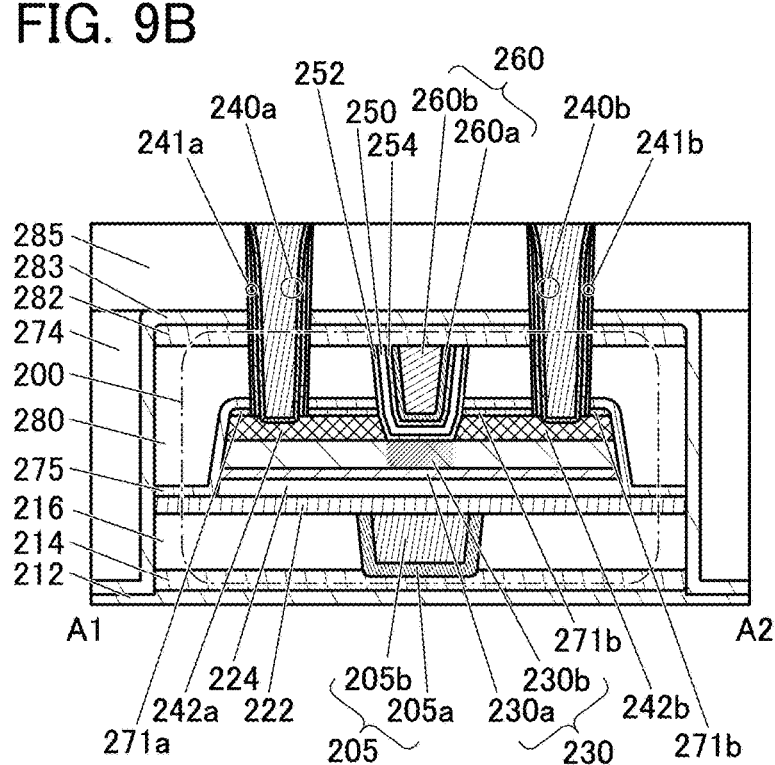
Figure 9D:
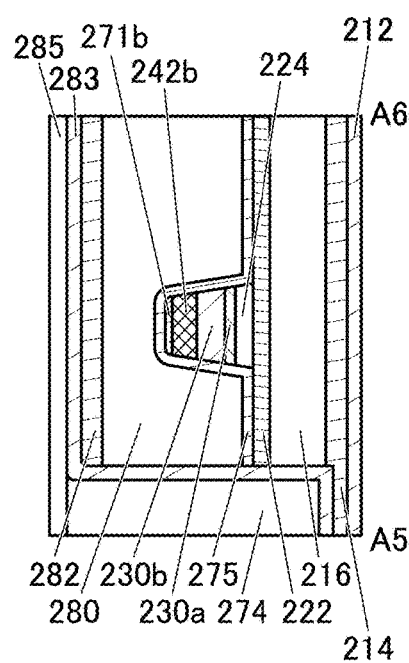

FIG. 9A is a top view of a transistor 200 that can be used as the transistor 120a, the transistor 120b, and the like. FIG. 9B to FIG. 9D are cross-sectional views of the transistor. Here, FIG. 9B is a cross-sectional view of a portion indicated by dashed-dotted line A1-A2 in FIG. 9A, and is a cross-sectional view of the transistor 200 in the channel length direction. FIG. 9C is a cross-sectional view of a portion indicated by dashed-dotted line A3-A4 in FIG. 9A, and is a cross-sectional view of the transistor 200 in the channel width direction. FIG. 9D is a cross-sectional view of a portion indicated by dashed-dotted line A5-A6 in FIG. 9A. Note that for clarity of the drawing, some components are omitted in the top view of FIG. 9A.

The transistor 200 includes an insulator 212 over a substrate (not illustrated), an insulator 214 over the insulator 212, the transistor 200 over the insulator 214, an insulator 280 over an insulator 275 provided in the transistor 200, an insulator 282 over the insulator 280, an insulator 283 over the insulator 282, an insulator 274 over the insulator 283, and an insulator 285 over the insulator 283 and the insulator 274. The insulator 212, the insulator 214, an insulator 216, the insulator 275, the insulator 280, the insulator 282, the insulator 283, the insulator 285, and the insulator 274 each function as an interlayer film. The insulator 283 is in contact with side surfaces of the insulator 214, side surfaces of the insulator 216, side surfaces of the insulator 222, side surfaces of the insulator 275, side surfaces of the insulator 280, and side surfaces and a top surface of the insulator 282.

The transistor 200 includes the insulator 216 over the insulator 214, a conductor 205 (a conductor 205a and a conductor 205b) placed to be embedded in the insulator 214 and/or the insulator 216, an insulator 222 over the insulator 216 and the conductor 205, an insulator 224 over the insulator 222, an oxide 230a over the insulator 224, an oxide 230b over the oxide 230a, a conductor 242a over the oxide 230b, an insulator 271a over the conductor 242a, a conductor 242b over the oxide 230b, an insulator 271b over the conductor 242b, an insulator 252 over the oxide 230b, an insulator 250 over the insulator 252, an insulator 254 over the insulator 250, a conductor 260 (a conductor 260a and a conductor 260b) over the insulator 254 and overlapping with part of the oxide 230*b*, and the insulator 275 placed over the insulator 222, the insulator 224, the oxide 230*a*, the oxide 230*b*, the conductor 242*a*, the conductor 242*b*, the insulator 271*a*, and the insulator 271*b*. Here, as illustrated in FIG. 9B and FIG. 9C, the insulator 252 is in contact with a top surface of the insulator 222, side surfaces of the insulator 224, side surfaces of the oxide 230*a*, side surfaces and a top surface of the oxide 230*b*, side surfaces of the conductor 242, side surfaces of the insulator 271, side surfaces of the insulator 275, side surfaces of the insulator 280, and a bottom surface of the insulator 250. A top surface of the conductor 260 is placed to be substantially level with the uppermost portion of the insulator 254, the uppermost portion of the insulator 250, the uppermost portion of the insulator 252, and a top surface of the insulator 280. The insulator 282 is in contact with at least parts of the top surfaces of the conductor 260, the insulator 252, the insulator 250, the insulator 254, and the insulator 280.

Hereinafter, the oxide 230*a* and the oxide 230*b* are collectively referred to as the oxide 230 in some cases. The conductor 242*a* and the conductor 242*b* are collectively referred to as the conductor 242 in some cases. The insulator 271*a* and the insulator 271*b* are collectively referred to as the insulator 271 in some cases.

An opening reaching the oxide 230*b* is provided in the insulator 280 and the insulator 275. The insulator 252, the insulator 250, the insulator 254, and the conductor 260 are placed in the opening. The conductor 260, the insulator 252, the insulator 250, and the insulator 254 are provided between the insulator 271*a* and the conductor 242*a*, and the insulator 271*b* and the conductor 242*b* in the channel length direction of the transistor 200. The insulator 254 includes a region in contact with side surfaces of the conductor 260 and a region in contact with a bottom surface of the conductor 260.

The oxide 230 preferably includes the oxide 230*a* placed over the insulator 224 and the oxide 230*b* placed over the oxide 230*a*. Including the oxide 230*a* under the oxide 230*b* makes it possible to inhibit diffusion of impurities into the oxide 230*b* from components formed below the oxide 230*a*.

Although a structure in which two layers, the oxide 230*a* and the oxide 230*b*, are stacked as the oxide 230 in the transistor 200 is described, the present invention is not limited thereto. For example, the oxide 230 may be provided as a single layer of the oxide 230*b* or to have a stacked-layer structure of three or more layers, or the oxide 230*a* and the oxide 230*b* may each have a stacked-layer structure.

The conductor 260 functions as a first gate (also referred to as a top gate) electrode, and the conductor 205 functions as a second gate (also referred to as a back gate) electrode. The insulator 252, the insulator 250, and the insulator 254 function as a first gate insulator, and the insulator 222 and the insulator 224 function as a second gate insulator. Note that the gate insulator is also referred to as a gate insulating layer or a gate insulating film in some cases. The conductor 242*a* functions as one of a source and a drain, and the conductor 242*b* functions as the other of the source and the drain. At least part of a region of the oxide 230 overlapping with the conductor 260 functions as a channel formation region.

Figure 10A:
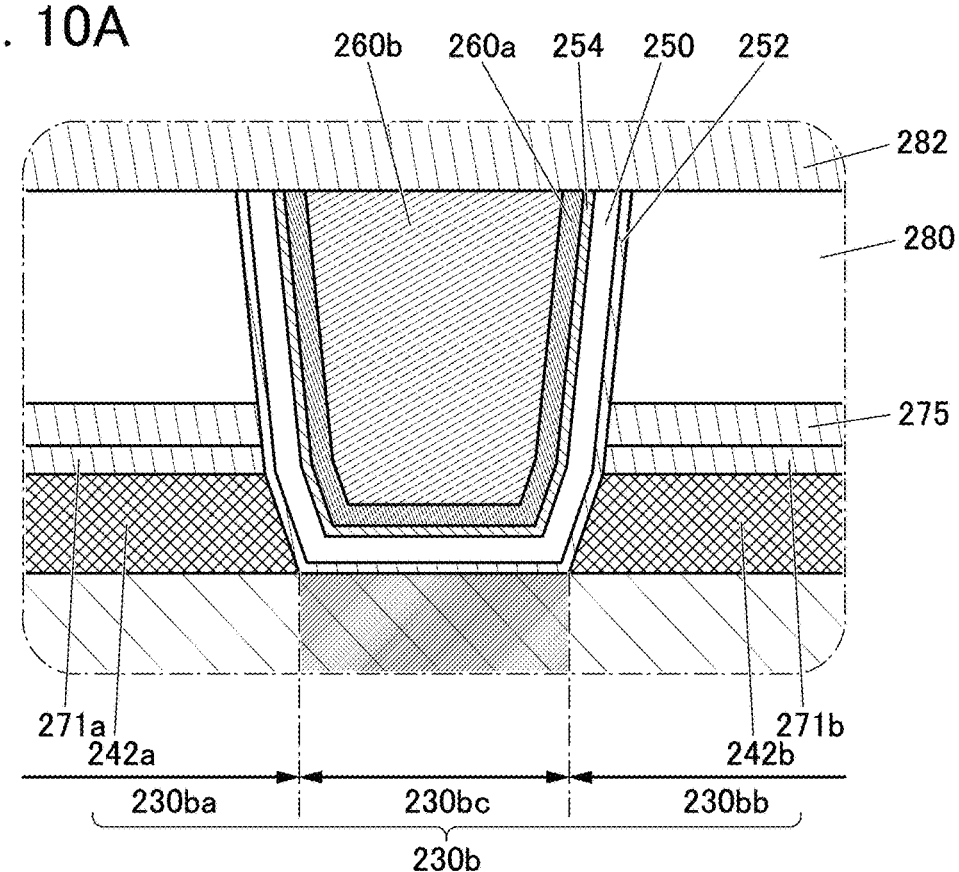
FIG. 10A and FIG. 10B are each a cross-sectional view of a semiconductor device of one embodiment of the present invention.

FIG. 10A is an enlarged view of the vicinity of the channel formation region in FIG. 9B. Supply of oxygen to the oxide 230*b* forms the channel formation region in a region between the conductor 242*a* and the conductor 242*b*. Thus, as illustrated in FIG. 10A, the oxide 230*b* includes a region 230*bc* functioning as the channel formation region of the transistor 200 and a region 230*ba* and a region 230*bb* that are provided to sandwich the region 230*bc* and function as a source region and a drain region. At least part of the region 230*bc* overlaps with the conductor 260. In other words, the region 230*bc* is provided in a region between the conductor 242*a* and the conductor 242*b*. The region 230*ba* is provided to overlap with the conductor 242*a*, and the region 230*bb* is provided to overlap with the conductor 242*b*.

The region 230*bc* functioning as the channel formation region has a smaller amount of oxygen vacancies or a lower impurity concentration than the region 230*ba* and the region 230*bb*, and thus is a high-resistance region with a low carrier concentration. Thus, the region 230*bc* can be regarded as being i-type (intrinsic) or substantially i-type. Performing microwave treatment in an atmosphere containing oxygen facilitates formation of the region 230*bc*, for example. Here, the microwave treatment refers to, for example, treatment using an apparatus including a power source that generates high-density plasma with the use of a microwave. In this specification and the like, a microwave refers to an electromagnetic wave having a frequency greater than or equal to 300 MHz and less than or equal to 300 GHz.

The region 230*ba* and the region 230*bb* functioning as the source region and the drain region include a large amount of oxygen vacancies or have a high concentration of an impurity such as hydrogen, nitrogen, or a metal element, and thus are each a low-resistance region with an increased carrier concentration. In other words, the region 230*ba* and the region 230*bb* are each an n-type region having a higher carrier concentration and a lower resistance than the region 230*bc*.

The carrier concentration in the region 230*bc* functioning as the channel formation region is preferably lower than or equal to $1\times10^{18}$ cm$^{-3}$, further preferably lower than $1\times10^{17}$ cm$^{-3}$, still further preferably lower than $1\times10^{16}$ cm$^{-3}$, yet further preferably lower than $1\times10^{13}$ cm$^{-3}$, and yet still further preferably lower than $1\times10^{12}$ cm$^{-3}$. Note that the lower limit of the carrier concentration in the region 230*bc* functioning as the channel formation region is not particularly limited and can be, for example, $1\times10^{-9}$ cm$^{-3}$.

Between the region 230*bc* and the region 230*ba* or the region 230*bb*, a region having a carrier concentration that is lower than or substantially equal to the carrier concentrations in the region 230*ba* and the region 230*bb* and higher than or substantially equal to the carrier concentration in the region 230*bc* may be formed. That is, the region functions as a junction region between the region 230*bc* and the region 230*ba* or the region 230*bb*. The hydrogen concentration in the junction region is lower than or substantially equal to the hydrogen concentrations in the region 230*ba* and the region 230*bb* and higher than or substantially equal to the hydrogen concentration in the region 230*bc* in some cases. The amount of oxygen vacancies in the junction region is smaller than or substantially equal to the amounts of oxygen vacancies in the region 230*ba* and the region 230*bb* and larger than or substantially equal to the amount of oxygen vacancies in the region 230*bc* in some cases.

Although FIG. 10A illustrates an example where the region 230*ba*, the region 230*bb*, and the region 230*bc* are formed in the oxide 230*b*, the present invention is not limited thereto. For example, the above regions may be formed not only in the oxide 230*b* but also in the oxide 230*a*.

In the oxide 230, the boundaries between the regions are difficult to detect clearly in some cases. The concentration of a metal element and an impurity element such as hydrogen or nitrogen, which is detected in each region, may be gradually changed not only between the regions but also in each region. That is, the region closer to the channel formation region preferably has a lower concentration of a metal element and an impurity element such as hydrogen or nitrogen.

In the transistor 200, a metal oxide functioning as a semiconductor (such a metal oxide is hereinafter also referred to as an oxide semiconductor) is preferably used for the oxide 230 (the oxide 230a and the oxide 230b) including the channel formation region.

The metal oxide functioning as a semiconductor preferably has a band gap of 2 eV or more, further preferably 2.5 eV or more. With the use of such a metal oxide having a large band gap, the off-state current of the transistor can be reduced.

As the oxide 230, it is preferable to use, for example, a metal oxide such as an In-M-Zn oxide containing indium, an element M, and zinc (the element M is one or more kinds selected from aluminum, gallium, yttrium, tin, copper, vanadium, beryllium, boron, titanium, iron, nickel, germanium, zirconium, molybdenum, lanthanum, cerium, neodymium, hafnium, tantalum, tungsten, magnesium, and the like). Alternatively, an In—Ga oxide, an In—Zn oxide, or an indium oxide may be used as the oxide 230.

The atomic ratio of In to the element M in the metal oxide used as the oxide 230b is preferably greater than the atomic ratio of In to the element M in the metal oxide used as the oxide 230a.

The oxide 230a is placed under the oxide 230b in this manner, whereby impurities and oxygen can be inhibited from diffusing into the oxide 230b from components formed below the oxide 230a.

When the oxide 230a and the oxide 230b contain a common element (as the main component) besides oxygen, the density of defect states at an interface between the oxide 230a and the oxide 230b can be made low. Since the density of defect states at the interface between the oxide 230a and the oxide 230b can be made low, the influence of interface scattering on carrier conduction is small, and a high on-state current can be obtained.

The oxide 230b preferably has crystallinity. It is particularly preferable to use a CAAC-OS (c-axis aligned crystalline oxide semiconductor) as the oxide 230b.

The CAAC-OS is a metal oxide having a dense structure with high crystallinity and a small amount of impurities and defects (e.g., oxygen vacancies (like $V_O$)). In particular, after the formation of a metal oxide, heat treatment is performed at a temperature at which the metal oxide does not become a polycrystal (e.g., higher than or equal to 400° C. and lower than or equal to 600° C.), whereby a CAAC-OS having a dense structure with higher crystallinity can be obtained. When the density of the CAAC-OS is increased in such a manner, diffusion of impurities or oxygen in the CAAC-OS can be further reduced.

On the other hand, a clear crystal grain boundary is difficult to observe in the CAAC-OS; thus, it can be said that a reduction in electron mobility due to the crystal grain boundary is less likely to occur. Thus, a metal oxide including a CAAC-OS is physically stable. Therefore, the metal oxide including a CAAC-OS is resistant to heat and has high reliability.

If impurities and oxygen vacancies exist in a region of an oxide semiconductor where a channel is formed, a transistor using the oxide semiconductor might have variable electrical characteristics and poor reliability. In some cases, hydrogen in the vicinity of an oxygen vacancy forms a defect that is the oxygen vacancy into which hydrogen enters (hereinafter sometimes referred to as $V_OH$), which generates an electron serving as a carrier. Therefore, when the region of the oxide semiconductor where a channel is formed includes oxygen vacancies, the transistor tends to have normally-on characteristics (even when no voltage is applied to the gate electrode, the channel exists and current flows through the transistor). Thus, impurities, oxygen vacancies, and $V_OH$ are preferably reduced as much as possible in the region of the oxide semiconductor where a channel is formed. In other words, it is preferable that the region of the oxide semiconductor where a channel is formed have a reduced carrier concentration and be of an i-type (intrinsic) or substantially i-type.

As a countermeasure to the above, an insulator containing oxygen that is released by heating (hereinafter, sometimes referred to as excess oxygen) is provided in the vicinity of the oxide semiconductor and heat treatment is performed, so that oxygen can be supplied from the insulator to the oxide semiconductor to reduce oxygen vacancies and $V_OH$. However, supply of an excess amount of oxygen to the source region or the drain region might cause a decrease in the on-state current or field-effect mobility of the transistor 200. Furthermore, a variation of the amount of oxygen supplied to the source region or the drain region in the substrate plane leads to a variation in characteristics of the semiconductor device including the transistor.

Therefore, the region 230bc functioning as the channel formation region in the oxide semiconductor is preferably an i-type or substantially i-type region with reduced carrier concentration, whereas the region 230ba and the region 230bb functioning as the source region and the drain region are preferably n-type regions with high carrier concentrations. That is, it is preferable that oxygen vacancies and $V_OH$ in the region 230bc of the oxide semiconductor be reduced and the region 230ba and the region 230bb not be supplied with an excess amount of oxygen.

Thus, in this embodiment, microwave treatment is performed in an oxygen-containing atmosphere in a state where the conductor 242a and the conductor 242b are provided over the oxide 230b so that oxygen vacancies and $V_OH$ in the region 230bc can be reduced.

The microwave treatment in an oxygen-containing atmosphere converts an oxygen gas into plasma using a high-frequency wave such as a microwave or RF and activates the oxygen plasma. At this time, the region 230bc can be irradiated with the high-frequency wave such as a microwave or RF. By the effect of the plasma, a microwave, or the like, $V_OH$ in the region 230bc can be cut; thus, hydrogen H can be removed from the region 230bc and an oxygen vacancy $V_O$ can be filled with oxygen. That is, the reaction "$V_OH \rightarrow H + V_O$" occurs in the region 230bc, so that the hydrogen concentration in the region 230bc can be reduced. As a result, oxygen vacancies and $V_OH$ in the region 230bc can be reduced to lower the carrier concentration.

In the microwave treatment in an oxygen-containing atmosphere, the high-frequency wave such as the microwave or RF, the oxygen plasma, or the like is blocked by the conductor 242a and the conductor 242b and does not affect the region 230ba nor the region 230bb. In addition, the effect of the oxygen plasma can be reduced by the insulator 271 and the insulator 280 that are provided to cover the oxide 230b and the conductor 242. Hence, a reduction in $V_OH$ and supply of an excess amount of oxygen do not occur in the region 230ba nor the region 230bb in the microwave treatment, preventing a decrease in carrier concentration.

Microwave treatment is preferably performed in an oxygen-containing atmosphere after formation of an insulating film to be the insulator 252 or after formation of an insulating film to be the insulator 250. By performing the microwave treatment in an oxygen-containing atmosphere through the insulator 252 or the insulator 250 in such a manner, oxygen can be efficiently supplied into the region 230bc. In addition, the insulator 252 is placed to be in contact with the side surfaces of the conductor 242 and the surface of the region 230bc, thereby inhibiting oxygen more than necessary from being supplied to the region 230bc and inhibiting the side surfaces of the conductor 242 from being oxidized. Furthermore, the side surfaces of the conductor 242 can be inhibited from being oxidized when the insulating film to be the insulator 250 is formed.

The oxygen supplied into the region 230bc has any of a variety of forms such as an oxygen atom, an oxygen molecule, an oxygen radical (an O radical, an atom or a molecule having an unpaired electron, or anion). Note that the oxygen supplied into the region 230bc has any one or more of the above forms, particularly preferably an oxygen radical. Furthermore, the film quality of the insulator 252 and the insulator 250 can be improved, leading to higher reliability of the transistor 200.

In the above manner, oxygen vacancies and $V_OH$ can be selectively removed from the region 230bc of the oxide semiconductor, whereby the region 230bc can be an i-type or substantially i-type region. Furthermore, supply of an excess amount of oxygen to the region 230ba and the region 230bb functioning as the source region and the drain region can be inhibited and the n-type conductivity can be maintained. As a result, a change in the electrical characteristics of the transistor 200 can be inhibited, and thus a variation in the electrical characteristics of the transistors 200 in the substrate plane can be inhibited.

As illustrated in FIG. 9C, a curved surface may be provided between the side surface of the oxide 230b and the top surface of the oxide 230b in a cross-sectional view of the transistor 200 in the channel width direction. In other words, an end portion of the side surface and an end portion of the top surface may be curved (hereinafter referred to as rounded).

The radius of curvature of the curved surface is preferably greater than 0 nm and less than the thickness of the oxide 230b in a region overlapping with the conductor 242, or less than half of the length of a region that does not have the curved surface. Specifically, the radius of curvature of the curved surface is greater than 0 nm and less than or equal to 20 nm, preferably greater than or equal to 1 nm and less than or equal to 15 nm, and further preferably greater than or equal to 2 nm and less than or equal to 10 nm. Such a shape can improve the coverage of the oxide 230b with the insulator 252, the insulator 250, the insulator 254, and the conductor 260.

The oxide 230 preferably has a stacked-layer structure of a plurality of oxide layers with different chemical compositions. Specifically, the atomic ratio of the element M to a metal element that is a main component of the metal oxide used as the oxide 230a is preferably greater than the atomic ratio of the element M to a metal element that is a main component of the metal oxide used as the oxide 230b. Moreover, the atomic ratio of the element M to In in the metal oxide used as the oxide 230a is preferably greater than the atomic ratio of the element M to In in the metal oxide used as the oxide 230b. Furthermore, the atomic ratio of In to the element M in the metal oxide used as the oxide 230b is preferably greater than the atomic ratio of In to the element M in the metal oxide used as the oxide 230a.

The oxide 230b is preferably an oxide having crystallinity, such as a CAAC-OS. An oxide having crystallinity, such as a CAAC-OS, has a dense structure with small amounts of impurities and defects (e.g., oxygen vacancies) and high crystallinity. This can inhibit oxygen extraction from the oxide 230b by the source electrode or the drain electrode. This can reduce oxygen extraction from the oxide 230b even when heat treatment is performed; thus, the transistor 200 is stable with respect to high temperatures in a manufacturing process (what is called thermal budget).

Here, the conduction band minimum gradually changes at a junction portion of the oxide 230a and the oxide 230b. In other words, the conduction band minimum at the junction portion of the oxide 230a and the oxide 230b continuously changes or is continuously connected. To achieve this, the density of defect states in a mixed layer formed at the interface between the oxide 230a and the oxide 230b is preferably made low.

Specifically, when the oxide 230a and the oxide 230b contain a common element as a main component besides oxygen, a mixed layer with a low density of defect states can be formed. For example, in the case where the oxide 230b is an In-M-Zn oxide, an In-M-Zn oxide, an M-Zn oxide, an oxide of the element M, an In—Zn oxide, indium oxide, or the like may be used as the oxide 230a.

Specifically, as the oxide 230a, a metal oxide with a composition of In:M:Zn=1:3:4 [atomic ratio] or in the neighborhood thereof, or a composition of In:M:Zn=1:1:0.5 [atomic ratio] or in the neighborhood thereof is used. As the oxide 230b, a metal oxide with a composition of In:M:Zn=1:1:1 [atomic ratio] or in the neighborhood thereof, a composition of In:M:Zn=1:1:2 [atomic ratio] or in the neighborhood thereof, or a composition of In:M:Zn=4:2:3 [atomic ratio] or in the neighborhood thereof can be used. Note that a composition in the neighborhood includes the range of ±30% of an intended atomic ratio. Gallium is preferably used as the element M.

Here, the oxide 230a and the oxide 230b are preferably formed by a sputtering method. Oxygen or a mixed gas of oxygen and a rare gas is used as the sputtering gas. Increasing the proportion of oxygen contained in the sputtering gas can increase the amount of oxygen in the formed films. The deposition method of the oxide 230a and the oxide 230b is not limited to a sputtering method, and a CVD method, an MBE method, a PLD method, an ALD method, or the like can be used as appropriate.

When the metal oxide is deposited by a sputtering method, the above atomic ratio is not limited to the atomic ratio of the deposited metal oxide and may be the atomic ratio of a sputtering target used for depositing the metal oxide.

As illustrated in FIG. 9C or the like, the insulator 252 formed using aluminum oxide or the like is provided in contact with a top surface and side surfaces of the oxide 230, whereby indium contained in the oxide 230 is unevenly distributed, in some cases, at the interface between the oxide 230 and the insulator 252 and in its vicinity. Accordingly, the vicinity of the surface of the oxide 230 comes to have an atomic ratio close to that of an indium oxide or that of an In—Zn oxide. Such an increase in the atomic ratio of indium in the vicinity of the surface of the oxide 230, especially the vicinity of a surface of the oxide 230b, can increase the field-effect mobility of the transistor 200.

When the oxide 230a and the oxide 230b have the above structure, the density of defect states at the interface between the oxide 230a and the oxide 230b can be made low. Thus, the influence of interface scattering on carrier conduction is small, and the transistor 200 can have a high on-state current and high frequency characteristics.

At least one of the insulator 212, the insulator 214, the insulator 271, the insulator 275, the insulator 282, the insulator 283, and the insulator 285 preferably functions as a barrier insulating film, which inhibits diffusion of impurities such as water and hydrogen from the substrate side or above the transistor 200 into the transistor 200. Thus, at least one of the insulator 212, the insulator 214, the insulator 271, the insulator 275, the insulator 282, the insulator 283, and the insulator 285 is preferably formed using an insulating material having a function of inhibiting diffusion of impurities such as hydrogen atoms, hydrogen molecules, water molecules, nitrogen atoms, nitrogen molecules, nitrogen oxide molecules (e.g., $N_2O$, NO, or $NO_2$), or copper atoms (an insulating material through which the impurities are less likely to pass). Alternatively, it is preferable to use an insulating material having a function of inhibiting diffusion of oxygen (e.g., at least one of oxygen atoms, oxygen molecules, and the like) (an insulating material through which the oxygen is less likely to pass).

Note that in this specification, a barrier insulating film refers to an insulating film having a barrier property. A barrier property in this specification means a function of inhibiting diffusion of a targeted substance (also referred to as having low permeability). In addition, a barrier property in this specification means a function of capturing and fixing (also referred to as gettering) a targeted substance.

An insulator having a function of inhibiting diffusion of oxygen and impurities such as water and hydrogen is preferably used as the insulator 212, the insulator 214, the insulator 271, the insulator 275, the insulator 282, the insulator 283, and the insulator 285; for example, aluminum oxide, magnesium oxide, hafnium oxide, gallium oxide, indium gallium zinc oxide, silicon nitride, or silicon nitride oxide can be used. For example, silicon nitride, which has a higher hydrogen barrier property, is preferably used for the insulator 212, the insulator 275, and the insulator 283. For example, aluminum oxide or magnesium oxide, which has a function of capturing or fixing hydrogen well, is preferably used for the insulator 214, the insulator 271, the insulator 282, and the insulator 285. In this case, impurities such as water and hydrogen can be inhibited from diffusing to the transistor 200 side from the substrate side through the insulator 212 and the insulator 214. Impurities such as water and hydrogen can be inhibited from diffusing to the transistor 200 side from an interlayer insulating film and the like which are provided outside the insulator 285. Alternatively, oxygen contained in the insulator 224 and the like can be inhibited from diffusing to the substrate side through the insulator 212 and the insulator 214. Alternatively, oxygen contained in the insulator 280 and the like can be inhibited from diffusing to above the transistor 200 through the insulator 282 and the like. In this manner, it is preferable that the transistor 200 be surrounded by the insulator 212, the insulator 214, the insulator 271, the insulator 275, the insulator 282, the insulator 283, and the insulator 285, which have a function of inhibiting diffusion of oxygen and impurities such as water and hydrogen.

Note that in this specification and the like, "oxynitride" refers to a material that contains more oxygen than nitrogen as its main component. For example, "silicon oxynitride" refers to a material that contains silicon, nitrogen, and oxygen and contains more oxygen than nitrogen. In this specification and the like, "nitride oxide" refers to a material that contains more nitrogen than oxygen as its main component. For example, "aluminum nitride oxide" refers to a material that contains aluminum, nitrogen, and oxygen and contains more nitrogen than oxygen.

Here, an oxide having an amorphous structure is preferably used for the insulator 212, the insulator 214, the insulator 271, the insulator 275, the insulator 282, the insulator 283, and the insulator 285. For example, a metal oxide such as $AlO_x$ (x is a given number greater than 0) or $MgO_y$ (y is a given number greater than 0) is preferably used. In such a metal oxide having an amorphous structure, an oxygen atom has a dangling bond and sometimes has a property of capturing or fixing hydrogen with the dangling bond. When such a metal oxide having an amorphous structure is used as the component of the transistor 200 or provided around the transistor 200, hydrogen contained in the transistor 200 or hydrogen present around the transistor 200 can be captured or fixed. In particular, hydrogen contained in the channel formation region of the transistor 200 is preferably captured or fixed. The metal oxide having an amorphous structure is used as the component of the transistor 200 or provided around the transistor 200, whereby the transistor 200 and a semiconductor device which have favorable characteristics and high reliability can be manufactured.

Although each of the insulator 212, the insulator 214, the insulator 271, the insulator 275, the insulator 282, the insulator 283, and the insulator 285 preferably has an amorphous structure, a region having a polycrystalline structure may be partly formed. Each of the insulator 212, the insulator 214, the insulator 271, the insulator 275, the insulator 282, the insulator 283, and the insulator 285 may have a multilayer structure in which a layer having an amorphous structure and a layer having a polycrystalline structure are stacked. For example, a stacked-layer structure in which a layer having a polycrystalline structure is formed over a layer having an amorphous structure may be employed.

The insulator 212, the insulator 214, the insulator 271, the insulator 275, the insulator 282, the insulator 283, and the insulator 285 can be formed by a sputtering method, for example. Since a sputtering method does not need to use a molecule containing hydrogen as a deposition gas, the hydrogen concentrations in the insulator 212, the insulator 214, the insulator 271, the insulator 275, the insulator 282, the insulator 283, and the insulator 285 can be reduced. Note that the deposition method is not limited to a sputtering method, and a chemical vapor deposition (CVD) method, a molecular beam epitaxy (MBE) method, a pulsed laser deposition (PLD) method, an ALD method, or the like can be used as appropriate.

The resistivities of the insulator 212, the insulator 275, and the insulator 283 are preferably made low in some cases. For example, by setting the resistivities of the insulator 212, the insulator 275, and the insulator 283 to approximately $1 \times 10^{13}$ Ωcm, the insulator 212, the insulator 275, and the insulator 283 can sometimes reduce charge up of the conductor 205, the conductor 242, or the conductor 260 in treatment using plasma or the like in the manufacturing process of a semiconductor device. The resistivities of the insulator 212, the insulator 275, and the insulator 283 are preferably higher than or equal to $1 \times 10^{10}$ Ωcm and lower than or equal to $1 \times 10^{15}$ Ωcm.

The insulator 216, the insulator 274, the insulator 280, and the insulator 285 each preferably have a lower permittivity than the insulator 214. When a material with a low permittivity is used for an interlayer film, parasitic capacitance generated between wirings can be reduced. For the insulator 216, the insulator 274, the insulator 280, and the insulator 285, silicon oxide, silicon oxynitride, silicon oxide to which fluorine is added, silicon oxide to which carbon is added, silicon oxide to which carbon and nitrogen are added, porous silicon oxide, or the like is used as appropriate, for example.

The conductor 205 is placed to overlap with the oxide 230 and the conductor 260. Here, the conductor 205 is preferably provided to be embedded in an opening formed in the insulator 216. Part of the conductor 205 is embedded in the insulator 214 in some cases.

The conductor 205 includes the conductor 205a and the conductor 205b. The conductor 205a is provided in contact with a bottom surface and a sidewall of the opening. The conductor 205b is provided to be embedded in a depressed portion formed in the conductor 205a. Here, a top surface of the conductor 205b is substantially level with top surfaces of the conductor 205a and the insulator 216.

Here, the conductor 205a is preferably formed using a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, or the like), and a copper atom. Alternatively, it is preferable to use a conductive material having a function of inhibiting diffusion of oxygen (e.g., at least one of an oxygen atom, an oxygen molecule, and the like).

When the conductor 205a is formed using a conductive material having a function of inhibiting diffusion of hydrogen, impurities such as hydrogen contained in the conductor 205b can be prevented from diffusing into the oxide 230 through the insulator 224 and the like. When the conductor 205a is formed using a conductive material having a function of inhibiting diffusion of oxygen, the conductivity of the conductor 205b can be inhibited from being lowered because of oxidation. As the conductive material having a function of inhibiting diffusion of oxygen, for example, titanium, titanium nitride, tantalum, tantalum nitride, ruthenium, or ruthenium oxide is preferably used. Thus, the conductor 205a may be a single layer or a stacked layer of the above conductive materials. For example, titanium nitride is used for the conductor 205a.

Moreover, the conductor 205b is preferably formed using a conductive material containing tungsten, copper, or aluminum as its main component. For example, tungsten is used for the conductor 205b.

The conductor 205 sometimes functions as a second gate electrode. In that case, by changing a potential applied to the conductor 205 not in conjunction with but independently of a potential applied to the conductor 260, the threshold voltage (Vth) of the transistor 200 can be controlled. In particular, Vth of the transistor 200 can be made higher when a negative potential is applied to the conductor 205, and the off-state current can be reduced. Thus, a drain current at the time when a potential applied to the conductor 260 is 0 V can be made lower in the case where a negative potential is applied to the conductor 205 than in the case where the negative potential is not applied to the conductor 205.

The electric resistivity of the conductor 205 is designed in consideration of the potential applied to the conductor 205, and the thickness of the conductor 205 is determined in accordance with the electric resistivity. The thickness of the insulator 216 is substantially equal to that of the conductor 205. The conductor 205 and the insulator 216 are preferably as thin as possible in the allowable range of the design of the conductor 205. When the thickness of the insulator 216 is reduced, the absolute amount of impurities such as hydrogen contained in the insulator 216 can be reduced, which makes it possible to reduce the amount of the impurities to be diffused into the oxide 230.

As illustrated in FIG. 9A, the conductor 205 is preferably provided so as to be larger than a region of the oxide 230 that does not overlap with the conductor 242a or the conductor 242b. As illustrated in FIG. 9C, it is particularly preferable that the conductor 205 extend to a region outside end portions of the oxide 230a and the oxide 230b in the channel width direction. That is, the conductor 205 and the conductor 260 preferably overlap with each other with the insulators therebetween on the outer side of the side surface of the oxide 230 in the channel width direction. With this structure, the channel formation region of the oxide 230 can be electrically surrounded by the electric field of the conductor 260 functioning as a first gate electrode and the electric field of the conductor 205 functioning as the second gate electrode. In this specification, a transistor structure in which a channel formation region is electrically surrounded by the electric fields of a first gate and a second gate is referred to as a surrounded channel (S-channel) structure.

In this specification and the like, a transistor having the S-channel structure refers to a transistor having a structure in which a channel formation region is electrically surrounded by the electric fields of a pair of gate electrodes. The S-channel structure disclosed in this specification and the like is different from a Fin-type structure and a planar structure. With the S-channel structure, resistance to a short-channel effect can be enhanced, that is, a transistor in which a short-channel effect is less likely to occur can be provided.

Furthermore, as illustrated in FIG. 9C, the conductor 205 is extended to function as a wiring as well. However, without limitation to this structure, a structure in which a conductor functioning as a wiring is provided below the conductor 205 may be employed. In addition, the conductor 205 is not necessarily provided in each transistor. For example, the conductor 205 may be shared by a plurality of transistors.

Although the transistor 200 having a structure in which the conductor 205 is a stack of the conductor 205a and the conductor 205b is illustrated, the present invention is not limited thereto. For example, the conductor 205 may be provided to have a single-layer structure or a stacked-layer structure of three or more layers.

The insulator 222 and the insulator 224 function as a gate insulator.

It is preferable that the insulator 222 have a function of inhibiting diffusion of hydrogen (e.g., at least one of a hydrogen atom, a hydrogen molecule, and the like). In addition, it is preferable that the insulator 222 have a function of inhibiting diffusion of oxygen (e.g., at least one of an oxygen atom, an oxygen molecule, and the like). For example, the insulator 222 preferably has a function of inhibiting diffusion of one or both of hydrogen and oxygen more than the insulator 224.

As the insulator 222, an insulator containing an oxide of one or both of aluminum and hafnium, which is an insulating material, is preferably used. For the insulator, aluminum oxide, hafnium oxide, an oxide containing aluminum and hafnium (hafnium aluminate), or the like is preferably used. Alternatively, an oxide containing hafnium and zirconium, e.g., a hafnium-zirconium oxide is preferably used. In the case where the insulator 222 is formed using such a material, the insulator 222 functions as a layer that inhibits release of oxygen from the oxide 230 to the substrate side and diffusion of impurities such as hydrogen from the periphery of the transistor 200 into the oxide 230. Thus, providing the insulator 222 can inhibit diffusion of impurities such as hydrogen into the transistor 200 and inhibit generation of oxygen vacancies in the oxide 230. Moreover, the conductor 205 can be inhibited from reacting with oxygen contained in the insulator 224 and the oxide 230.

Alternatively, aluminum oxide, bismuth oxide, germanium oxide, niobium oxide, silicon oxide, titanium oxide, tungsten oxide, yttrium oxide, or zirconium oxide may be added to the above insulator, for example. Alternatively, the insulator may be subjected to nitriding treatment. A stack of silicon oxide, silicon oxynitride, or silicon nitride over these insulators may be used for the insulator 222.

For example, a single layer or stacked layers of an insulator(s) containing what is called a high-k material such as aluminum oxide, hafnium oxide, tantalum oxide, zirconium oxide, or hafnium-zirconium oxide may be used for the insulator 222. As miniaturization and high integration of transistors progress, a problem such as a leakage current may arise because of a thinner gate insulator. When a high-k material is used for an insulator functioning as the gate insulator, a gate potential at the time when the transistor operates can be reduced while the physical thickness is maintained. Furthermore, a substance with a high permittivity such as lead zirconate titanate (PZT), strontium titanate ($SrTiO_3$), or $(Ba,Sr)TiO_3$ (BST) may be used for the insulator 222.

Silicon oxide or silicon oxynitride, for example, can be used as appropriate for the insulator 224 that is in contact with the oxide 230.

In a manufacturing process of the transistor 200, heat treatment is preferably performed with a surface of the oxide 230 exposed. For example, the heat treatment is performed at higher than or equal to 100° C. and lower than or equal to 600° C., preferably higher than or equal to 350° C. and lower than or equal to 550° C. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. This can supply oxygen to the oxide 230 to reduce oxygen vacancies ($V_O$). The heat treatment may be performed under reduced pressure. Alternatively, after heat treatment is performed in a nitrogen gas or inert gas atmosphere, another heat treatment may be performed in an atmosphere containing an oxidizing gas at 10 ppm or more, 1% or more, or 10% or more in order to compensate for released oxygen. Alternatively, after heat treatment is performed in an atmosphere containing an oxidizing gas at 10 ppm or more, 1% or more, or 10% or more, another heat treatment may be successively performed in a nitrogen gas or inert gas atmosphere.

Note that oxygen adding treatment performed on the oxide 230 can promote a reaction in which oxygen vacancies in the oxide 230 are repaired with supplied oxygen, i.e., a reaction of "$V_O+O \rightarrow null$". Furthermore, hydrogen remaining in the oxide 230 reacts with supplied oxygen, so that the hydrogen can be removed as $H_2O$ (dehydration). This can inhibit recombination of hydrogen remaining in the oxide 230 with oxygen vacancies and formation of $V_OH$.

Note that the insulator 222 and the insulator 224 may each have a stacked-layer structure of two or more layers. In that case, without limitation to a stacked-layer structure formed of the same material, a stacked-layer structure formed of different materials may be employed. The insulator 224 may be formed into an island shape so as to overlap with the oxide 230a. In this case, the insulator 275 is in contact with the side surfaces of the insulator 224 and the top surface of the insulator 222.

The conductor 242a and the conductor 242b are provided in contact with the top surface of the oxide 230b. Each of the conductor 242a and the conductor 242b functions as a source electrode or a drain electrode of the transistor 200.

For the conductor 242 (the conductor 242a and the conductor 242b), for example, a nitride containing tantalum, a nitride containing titanium, a nitride containing molybdenum, a nitride containing tungsten, a nitride containing tantalum and aluminum, a nitride containing titanium and aluminum, or the like is preferably used. In one embodiment of the present invention, a nitride containing tantalum is particularly preferable. As another example, ruthenium oxide, ruthenium nitride, an oxide containing strontium and ruthenium, or an oxide containing lanthanum and nickel may be used. These materials are preferable because they are each a conductive material that is not easily oxidized or a material that maintains the conductivity even after absorbing oxygen.

Note that hydrogen contained in the oxide 230b or the like diffuses into the conductor 242a or the conductor 242b in some cases. In particular, when a nitride containing tantalum is used for the conductor 242a and the conductor 242b, hydrogen contained in the oxide 230b or the like is likely to diffuse into the conductor 242a or the conductor 242b, and the diffused hydrogen is bonded to nitrogen contained in the conductor 242a or the conductor 242b in some cases. That is, hydrogen contained in the oxide 230b or the like is absorbed by the conductor 242a or the conductor 242b in some cases.

No curved surface is preferably formed between the side surface of the conductor 242 and the top surface of the conductor 242. When no curved surface is formed in the conductor 242, the conductor 242 can have a large cross-sectional area in the channel width direction as illustrated in FIG. 9D. Accordingly, the conductivity of the conductor 242 is increased, so that the on-state current of the transistor 200 can be increased.

The insulator 271a is provided in contact with a top surface of the conductor 242a, and the insulator 271b is provided in contact with a top surface of the conductor 242b. The insulator 271 preferably functions as at least a barrier insulating film against oxygen. Thus, the insulator 271 preferably has a function of inhibiting oxygen diffusion. For example, the insulator 271 preferably has a function of inhibiting diffusion of oxygen more than the insulator 280. As the insulator 271, an insulator such as aluminum oxide or magnesium oxide is used, for example.

The insulator 275 is provided to cover the insulator 224, the oxide 230a, the oxide 230b, the conductor 242, and the insulator 271. The insulator 275 preferably has a function of capturing and fixing hydrogen. In that case, the insulator 275 preferably includes silicon nitride, or a metal oxide having an amorphous structure, for example, an insulator such as aluminum oxide or magnesium oxide. Alternatively, for example, a stacked-layer film of aluminum oxide and silicon nitride over the aluminum oxide may be used as the insulator 275.

When the insulator 271 and the insulator 275 are provided as described above, the conductor 242 can be surrounded by the insulators having a barrier property against oxygen. That is, oxygen contained in the insulator 224 and the insulator 280 can be prevented from diffusing into the conductor 242. As a result, the conductor 242 can be inhibited from being directly oxidized by oxygen contained in the insulator 224 and the insulator 280, so that an increase in resistivity and a reduction in on-state current can be inhibited.

The insulator 252 functions as part of the gate insulator. As the insulator 252, a barrier insulating film against oxygen is preferably used. As the insulator 252, an insulator that can be used as the insulator 282 described above may be used. An insulator containing an oxide of one or both of aluminum and hafnium may be used as the insulator 252. As the insulator, aluminum oxide, hafnium oxide, an oxide containing aluminum and hafnium (hafnium aluminate), an oxide containing hafnium and silicon (hafnium silicate), or the like can be used. In this embodiment, aluminum oxide is used for the insulator 252. In this case, the insulator 252 is an insulator containing at least oxygen and aluminum.

As illustrated in FIG. 9C, the insulator 252 is provided in contact with the top surface and the side surfaces of the oxide 230b, the side surfaces of the oxide 230a, the side surfaces of the insulator 224, and the top surface of the insulator 222. That is, the regions of the oxide 230a, the oxide 230b, and the insulator 224 that overlap with the conductor 260 are covered with the insulator 252 in the cross section in the channel width direction. With this structure, the insulator 252 having a barrier property against oxygen can prevent release of oxygen from the oxide 230a and the oxide 230b at the time of heat treatment or the like. This can inhibit formation of oxygen vacancies ($V_O$) in the oxide 230a and the oxide 230b. Therefore, oxygen vacancies ($V_O$) and $V_OH$ formed in the region 230bc can be reduced. Thus, the transistor 200 can have favorable electrical characteristics and higher reliability.

Even when an excess amount of oxygen is contained in the insulator 280, the insulator 250, and the like, in contrast, oxygen can be inhibited from being excessively supplied to the oxide 230a and the oxide 230b. Thus, the region 230ba and the region 230bb are inhibited from being excessively oxidized by oxygen through the region 230bc; a reduction in on-state current or field-effect mobility of the transistor 200 can be inhibited.

As illustrated in FIG. 9B, the insulator 252 is provided in contact with the side surfaces of the conductor 242, the insulator 271, the insulator 275, and the insulator 280. This can inhibit formation of an oxide film on the side surfaces of the conductor 242 by oxidization of the side surfaces. Accordingly, a reduction in on-state current or field-effect mobility of the transistor 200 can be inhibited.

The insulator 252 needs to be provided in an opening formed in the insulator 280 and the like, together with the insulator 254, the insulator 250, and the conductor 260. The thickness of the insulator 252 is preferably thin for miniaturization of the transistor 200. The thickness of the insulator 252 is greater than or equal to 0.1 nm and less than or equal to 5.0 nm, preferably greater than or equal to 0.5 nm and less than or equal to 3.0 nm, further preferably greater than or equal to 1.0 nm and less than or equal to 3.0 nm. In this case, at least part of the insulator 252 preferably includes a region having the above-described thickness. The thickness of the insulator 252 is preferably smaller than that of the insulator 250. In this case, at least part of the insulator 252 preferably includes a region having a thickness smaller than that of the insulator 250.

To form the insulator 252 having a small thickness like the above-described thickness, an ALD method is preferably used for deposition. Examples of an ALD method include a thermal ALD method, in which a precursor and a reactant react with each other only by a thermal energy, and a PEALD (Plasma Enhanced ALD) method, in which a reactant excited by plasma is used. The use of plasma in a PEALD method is sometimes preferable because deposition at a lower temperature is possible.

An ALD method, which enables an atomic layer to be deposited one by one using self-limiting characteristics by atoms, has advantages such as deposition of an extremely thin film, deposition on a component with a high aspect ratio, deposition of a film with a small number of defects such as pinholes, deposition with excellent coverage, and low-temperature deposition. Therefore, the insulator 252 can be formed on the side surface of the opening formed in the insulator 280 and the like to have a small thickness like the above-described thickness and to have favorable coverage.

Note that some of precursors used in an ALD method contain carbon or the like. Thus, in some cases, a film provided by an ALD method contains impurities such as carbon in a larger amount than a film provided by another deposition method. Note that impurities can be quantified by secondary ion mass spectrometry (SIMS), X-ray photoelectron spectroscopy (XPS), or Auger electron spectroscopy (AES).

The insulator 250 functions as part of the gate insulator. The insulator 250 is preferably in contact with a top surface of the insulator 252. The insulator 250 can be formed using silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like. In particular, silicon oxide and silicon oxynitride, which have thermal stability, are preferable. The insulator 250 in this case is an insulator containing at least oxygen and silicon.

As in the insulator 224, the concentration of impurities such as water and hydrogen in the insulator 250 is preferably reduced. The thickness of the insulator 250 is preferably greater than or equal to 1 nm and less than or equal to 20 nm, further preferably greater than or equal to 0.5 nm and less than or equal to 15.0 nm. In this case, it is acceptable that at least part of the insulator 250 has a region with the above-described thickness.

Although FIG. 9A to FIG. 9D and the like illustrate a single-layer structure of the insulator 250, the present invention is not limited to this structure, and a stacked-layer structure of two or more layers may be employed. For example, as illustrated in FIG. 10B, the insulator 250 may have a stacked-layer structure including two layers of an insulator 250a and an insulator 250b over the insulator 250a.

Figure 10B:
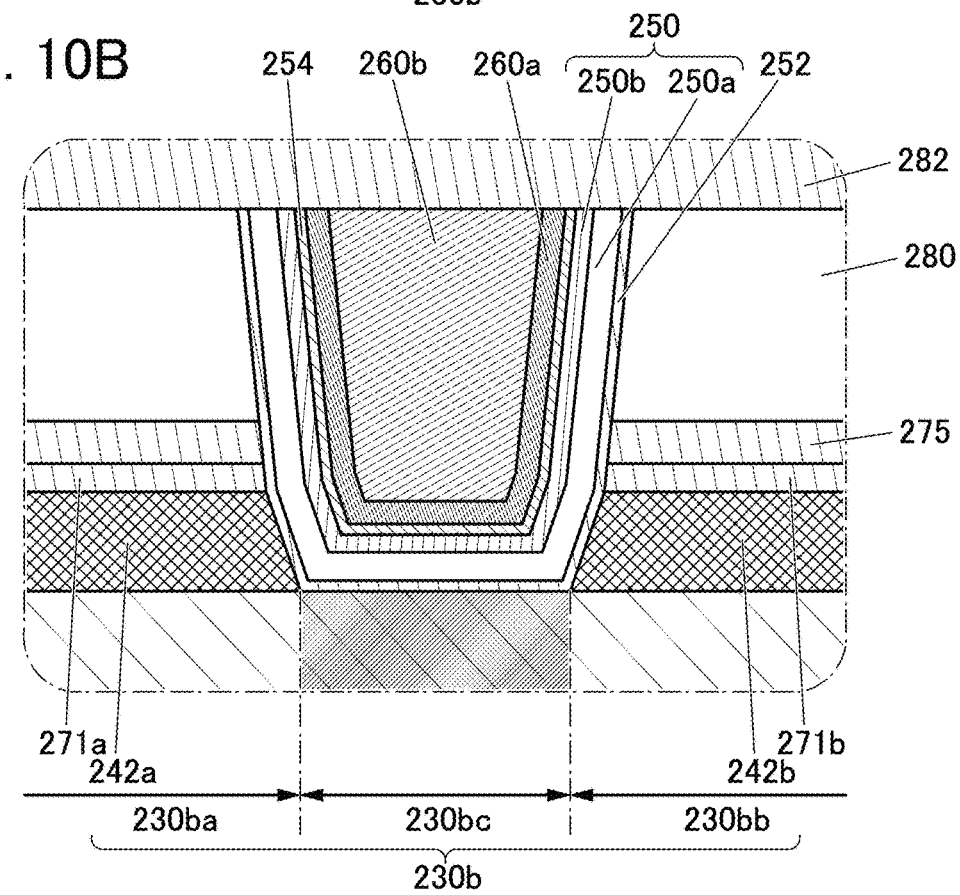

In the case where the insulator 250 has a stacked-layer structure of two layers as illustrated in FIG. 10B, it is preferable that the insulator 250a in a lower layer be formed using an insulator that is likely to transmit oxygen and the insulator 250b in an upper layer be formed using an insulator having a function of inhibiting oxygen diffusion. With such a structure, oxygen contained in the insulator 250a can be inhibited from diffusing into the conductor 260. That is, a reduction in the amount of oxygen supplied to the oxide 230 can be inhibited. In addition, oxidation of the conductor 260 due to oxygen contained in the insulator 250a can be inhibited. For example, it is preferable that the insulator 250a be provided using any of the above-described materials that can be used for the insulator 250 and the insulator 250b be provided using an insulator containing an oxide of one or both of aluminum and hafnium. As the insulator, aluminum oxide, hafnium oxide, an oxide containing aluminum and hafnium (hafnium aluminate), an oxide containing hafnium and silicon (hafnium silicate), or the like can be used. In this embodiment, hafnium oxide is used as the insulator 250b. In this case, the insulator 250b is an insulator containing at least oxygen and hafnium. The thickness of the insulator 250b is greater than or equal to 0.5 nm and less than or equal to 5.0 nm, preferably greater than or equal to 1.0 nm and less than or equal to 5.0 nm, further preferably greater than or equal to 1.0 nm and less than or equal to 3.0 nm. In that case, at least part of the insulator 250b may include a region with the above-described thickness.

In the case where silicon oxide, silicon oxynitride, or the like is used for the insulator 250a, the insulator 250b may be formed using an insulating material that is a high-k material having a high relative dielectric constant. The gate insulator having a stacked-layer structure of the insulator 250a and the insulator 250b can be thermally stable and can have a high relative dielectric constant. Thus, a gate potential that is applied during operation of the transistor can be reduced while the physical thickness of the gate insulator is maintained. In addition, the equivalent oxide thickness (EOT) of the insulator functioning as the gate insulator can be reduced. Therefore, the withstand voltage of the insulator 250 can be increased.

The insulator 254 functions as part of a gate insulator. As the insulator 254, a barrier insulating film against hydrogen is preferably used. This can prevent diffusion of impurities such as hydrogen contained in the conductor 260 into the insulator 250 and the oxide 230b. As the insulator 254, an insulator that can be used as the insulator 283 described above may be used. For example, silicon nitride deposited by a PEALD method may be used as the insulator 254. In this case, the insulator 254 is an insulator containing at least nitrogen and silicon.

Furthermore, the insulator 254 may have a barrier property against oxygen. Thus, diffusion of oxygen contained in the insulator 250 into the conductor 260 can be inhibited.

The insulator 254 needs to be provided in an opening formed in the insulator 280 and the like, together with the insulator 252, the insulator 250, and the conductor 260. The thickness of the insulator 254 is preferably thin for miniaturization of the transistor 200. The thickness of the insulator 254 is greater than or equal to 0.1 nm and less than or equal to 5.0 nm, preferably greater than or equal to 0.5 nm and less than or equal to 3.0 nm, further preferably greater than or equal to 1.0 nm and less than or equal to 3.0 nm. In this case, at least part of the insulator 254 preferably includes a region with the above-described thickness. The thickness of the insulator 254 is preferably smaller than that of the insulator 250. In this case, at least part of the insulator 254 may include a region having a thickness that is smaller than that of the insulator 250.

The conductor 260 functions as the first gate electrode of the transistor 200. The conductor 260 preferably includes the conductor 260a and the conductor 260b placed over the conductor 260a. For example, the conductor 260a is preferably placed to cover a bottom surface and side surfaces of the conductor 260b. Moreover, as illustrated in FIG. 9B and FIG. 9C, the top surface of the conductor 260 is substantially level with the top surface of the insulator 250. Although the conductor 260 is illustrated to have a two-layer structure of the conductor 260a and the conductor 260b in FIG. 9B and FIG. 9C, the conductor 260 may have a single-layer structure or a stacked-layer structure of three or more layers.

For the conductor 260a, a conductive material having a function of inhibiting diffusion of impurities such as a hydrogen atom, a hydrogen molecule, a water molecule, a nitrogen atom, a nitrogen molecule, a nitrogen oxide molecule, and a copper atom is preferably used. Alternatively, it is preferable to use a conductive material having a function of inhibiting diffusion of oxygen (e.g., at least one of an oxygen atom, an oxygen molecule, and the like).

When the conductor 260a has a function of inhibiting diffusion of oxygen, the conductivity of the conductor 260b can be inhibited from being lowered because of oxidation due to oxygen contained in the insulator 250. As the conductive material having a function of inhibiting diffusion of oxygen, for example, titanium, titanium nitride, tantalum, tantalum nitride, ruthenium, or ruthenium oxide is preferably used.

The conductor 260 also functions as a wiring and thus is preferably formed using a conductor having high conductivity. For example, a conductive material containing tungsten, copper, or aluminum as its main component can be used for the conductor 260b. The conductor 260b may have a stacked-layer structure; for example, a stacked-layer structure of the conductive material and titanium or titanium nitride may be employed.

In the transistor 200, the conductor 260 is formed in a self-aligned manner to fill the opening formed in the insulator 280 and the like. The formation of the conductor 260 in this manner allows the conductor 260 to be placed properly in a region between the conductor 242a and the conductor 242b without alignment.

As illustrated in FIG. 9C, in the channel width direction of the transistor 200, with reference to a bottom surface of the insulator 222, the level of the bottom surface of the conductor 260 in a region where the conductor 260 and the oxide 230b do not overlap is preferably lower than the level of a bottom surface of the oxide 230b. When the conductor 260 functioning as the gate electrode covers side surfaces and a top surface of the channel formation region of the oxide 230b with the insulator 250 and the like therebetween, the electric field of the conductor 260 can easily act on the entire channel formation region of the oxide 230b. Thus, the on-state current of the transistor 200 can be increased and the frequency characteristics of the transistor 200 can be improved. With reference to the bottom surface of the insulator 222, the difference between the level of the bottom surface of the conductor 260 in a region where the conductor 260 does not overlap with the oxide 230a or the oxide 230b and the level of the bottom surface of the oxide 230b is greater than or equal to 0 nm and less than or equal to 100 nm, preferably greater than or equal to 3 nm and less than or equal to 50 nm, further preferably greater than or equal to 5 nm and less than or equal to 20 nm.

The insulator 280 is provided over the insulator 275, and the opening is formed in a region where the insulator 250 and the conductor 260 are to be provided. In addition, the top surface of the insulator 280 may be planarized.

The insulator 280 functioning as an interlayer film preferably has a low permittivity. When a material with a low permittivity is used for an interlayer film, parasitic capacitance generated between wirings can be reduced. The insulator 280 is preferably provided using a material similar to that for the insulator 216, for example. In particular, silicon oxide and silicon oxynitride, which have thermal stability, are preferable. Materials such as silicon oxide, silicon oxynitride, and porous silicon oxide are particularly preferable because a region containing oxygen to be released by heating can be easily formed.

The insulator 280 preferably includes an excess-oxygen region or excess oxygen. The concentration of impurities such as water and hydrogen in the insulator 280 is preferably reduced. Silicon oxide, silicon oxynitride, or the like may be used as appropriate for the insulator 280, for example. When an insulator containing excess oxygen is provided in contact with the oxide 230, oxygen vacancies in the oxide 230 can be reduced and the reliability of the transistor 200 can be improved. When the insulator 280 is deposited by a sputtering method in an oxygen-containing atmosphere, the insulator 280 containing excess oxygen can be formed. By a sputtering method that does not need to use hydrogen as a deposition gas, the concentration of hydrogen in the insulator 280 can be reduced. The insulator 282 in contact with the top surface of the insulator 280 may be deposited by a sputtering method in an atmosphere containing oxygen so that oxygen can be supplied to the insulator 280. When oxygen is added to the insulator 280 by the deposition of the insulator 282, the deposition method of the insulator 280 is not limited to a sputtering method, and a CVD method, an MBE method, a PLD method, an ALD method, or the like may be used as appropriate. For example, the insulator 280 may have a stacked-layer structure of silicon oxide deposited by a sputtering method and silicon oxynitride deposited thereover by a CVD method. Furthermore, silicon nitride may be stacked thereover.

The insulator 282 preferably functions as a barrier insulating film that inhibits impurities such as water and hydrogen from diffusing into the insulator 280 from above and preferably has a function of capturing impurities such as hydrogen. The insulator 282 preferably functions as a barrier insulating film that inhibits passage of oxygen. For the insulator 282, a metal oxide having an amorphous structure, for example, an insulator such as aluminum oxide can be used. In this case, the insulator 282 is an insulator containing at least oxygen and aluminum. The insulator 282, which has a function of capturing impurities such as hydrogen, is provided in contact with the insulator 280 in a region interposed between the insulator 212 and the insulator 283, whereby impurities such as hydrogen contained in the insulator 280 and the like can be captured and the amount of hydrogen in the region can be constant. It is preferable to use, in particular, aluminum oxide having an amorphous structure for the insulator 282, because hydrogen can be captured or fixed more effectively in some cases. Accordingly, the transistor 200 and a semiconductor device which have favorable characteristics and high reliability can be manufactured.

The insulator 282 is preferably formed by a sputtering method. When the insulator 282 is deposited by a sputtering method, oxygen can be added to the insulator 280. The deposition method of the insulator 282 is not limited to a sputtering method; a CVD method, an MBE method, a PLD method, an ALD method, or the like may be used as appropriate.

The insulator 283 functions as a barrier insulating film that inhibits impurities such as water and hydrogen from diffusing into the insulator 280 from above. The insulator 283 is placed over the insulator 282. The insulator 283 is preferably formed using a nitride containing silicon such as silicon nitride or silicon nitride oxide. For example, silicon nitride deposited by a sputtering method may be used for the insulator 283. When the insulator 283 is deposited by a sputtering method, a high-density silicon nitride film can be formed. To obtain the insulator 283, silicon nitride deposited by a PEALD method or a CVD method may be stacked over silicon nitride deposited by a sputtering method.

FIG. 9 illustrates a conductor 240 (a conductor 240a and a conductor 240b) connected to the transistor 200. The conductor 240 is provided to be embedded in an opening formed in the insulator 271, the insulator 275, the insulator 280, the insulator 282, the insulator 283, and the insulator 285. A bottom surface of the conductor 240a is in contact with the top surface of the conductor 242a. A bottom surface of the conductor 240b is in contact with the top surface of the conductor 242b. For the conductor 240, a conductive material containing tungsten, copper, or aluminum as its main component is preferably used. The conductor 240 may have a stacked-layer structure of a thin first conductor provided along side surfaces and a bottom surface of the opening and a second conductor over the first conductor.

In the case where the conductor 240 has a stacked-layer structure, a conductive material having a function of inhibiting passage of impurities such as water and hydrogen is preferably used for a first conductor placed in the vicinity of the insulator 285 and the insulator 280. For example, tantalum, tantalum nitride, titanium, titanium nitride, ruthenium, ruthenium oxide, or the like is preferably used. The conductive material having a function of inhibiting passage of impurities such as water and hydrogen may be used as a single layer or stacked layers. Moreover, impurities such as water and hydrogen contained in a layer above the insulator 283 can be inhibited from entering the oxide 230 through the conductor 240. As the second conductor, the above-described conductive material containing tungsten, copper, or aluminum as its main component may be used, for example.

Although the conductor 240 illustrated in FIG. 9B is a stack of the first conductor and the second conductor, the present invention is not limited thereto. For example, the conductor 240 may be provided to have a single-layer structure or a stacked-layer structure of three or more layers.

An insulator 241a functioning as a barrier insulating film is preferably provided between the conductor 240a and the insulator 280. An insulator 241b functioning as a barrier insulating film is preferably provided between the conductor 240b and the insulator 280. The insulator 241 (the insulator 241a and the insulator 241b) is preferably placed in contact with side surfaces of an opening that is formed in the insulator 271, the insulator 275, the insulator 280, the insulator 282, the insulator 283, and the insulator 285.

<Component Materials of Semiconductor Device>

Component materials that can be used for the semiconductor device are described below.

<<Substrate>>

As a substrate where the transistor 200 is formed, an insulator substrate, a semiconductor substrate, or a conductor substrate is used, for example. Examples of the insulator substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate using silicon or germanium as a material and a compound semiconductor substrate including silicon carbide, silicon germanium, gallium arsenide, indium phosphide, zinc oxide, or gallium oxide. Another example is a semiconductor substrate having an insulator region in the semiconductor substrate described above, e.g., an SOI (Silicon On Insulator) substrate. Examples of the conductor substrate include a graphite substrate, a metal substrate, an alloy substrate, and a conductive resin substrate. Other examples include a substrate including a metal nitride and a substrate including a metal oxide. Other examples include an insulator substrate provided with a conductor or a semiconductor, a semiconductor substrate provided with a conductor or an insulator, and a conductor substrate provided with a semiconductor or an insulator. Alternatively, these substrates provided with elements may be used. Examples of the element provided for the substrate include a capacitor, a resistor, a switching element, a light-emitting element, and a storage element.

<<Insulator>>

Examples of the insulator include an insulating oxide, an insulating nitride, an insulating oxynitride, an insulating nitride oxide, an insulating metal oxide, an insulating metal oxynitride, and an insulating metal nitride oxide.

As miniaturization and high integration of transistors progress, for example, a problem such as a leakage current may arise because of a thinner gate insulator. When a high-k material is used for the insulator functioning as a gate insulator, the voltage during operation of the transistor can be lowered while the physical thickness of the gate insulator is maintained. In contrast, when a material with a low relative dielectric constant is used for the insulator functioning as an interlayer film, parasitic capacitance generated between wirings can be reduced. Thus, a material is preferably selected depending on the function of an insulator.

Examples of the insulator with a high relative dielectric constant include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator with a low relative dielectric constant include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor including a metal oxide is surrounded by an insulator having a function of inhibiting passage of oxygen and impurities such as hydrogen, the transistor can have stable electrical characteristics. As the insulator having a function of inhibiting passage of oxygen and impurities such as hydrogen, a single layer or stacked layers of an insulator containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum are used. Specifically, as the insulator having a function of inhibiting passage of oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide; or a metal nitride such as aluminum nitride, silicon nitride oxide, or silicon nitride can be used.

The insulator functioning as the gate insulator is preferably an insulator including a region containing oxygen to be released by heating. For example, when a structure is employed in which silicon oxide or silicon oxynitride including a region containing oxygen to be released by heating is in contact with the oxide 230, oxygen vacancies included in the oxide 230 can be compensated for.

<<Conductor>>

As a conductor, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. In addition, tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. A semiconductor having high electrical conductivity, typified by polycrystalline silicon containing an impurity element such as phosphorus, or silicide such as nickel silicide may be used.

A stack of a plurality of conductive layers formed of the above materials may be used. For example, a stacked-layer structure combining a material containing the above metal element and a conductive material containing oxygen may be employed. Alternatively, a stacked-layer structure combining a material containing the above metal element and a conductive material containing nitrogen may be employed. Alternatively, a stacked-layer structure combining a material containing the above metal element, a conductive material containing oxygen, and a conductive material containing nitrogen may be employed.

In the case where an oxide is used for the channel formation region of the transistor, the conductor functioning as the gate electrode preferably employs a stacked-layer structure combining a material containing the above metal element and a conductive material containing oxygen. In this case, the conductive material containing oxygen is preferably provided on the channel formation region side. When the conductive material containing oxygen is provided on the channel formation region side, oxygen released from the conductive material is easily supplied to the channel formation region.

In particular, the conductor functioning as the gate electrode is preferably formed using a conductive material containing oxygen and a metal element contained in the metal oxide where the channel is formed. Alternatively, a conductive material containing the above metal element and nitrogen may be used. For example, a conductive material containing nitrogen, such as titanium nitride or tantalum nitride, may be used. Indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Indium gallium zinc oxide containing nitrogen may be used. With the use of such a material, hydrogen contained in the metal oxide where the channel is formed can be captured in some cases. Alternatively, hydrogen entering from an external insulator or the like can be captured in some cases.

<<Metal Oxide>>

The oxide 230 is preferably formed using a metal oxide functioning as a semiconductor (an oxide semiconductor). A metal oxide that can be used as the oxide 230 according to the present invention is described below.

The metal oxide preferably contains at least indium or zinc. In particular, indium and zinc are preferably contained. Furthermore, aluminum, gallium, yttrium, tin, or the like is preferably contained in addition to them. Furthermore, one or more kinds selected from boron, titanium, iron, nickel, germanium, zirconium, molybdenum, lanthanum, cerium, neodymium, hafnium, tantalum, tungsten, magnesium, cobalt, and the like may be contained.

Here, the case where the metal oxide is an In-M-Zn oxide containing indium, the element M, and zinc is considered. The element M is aluminum, gallium, yttrium, or tin. Examples of other elements that can be used as the element M include boron, titanium, iron, nickel, germanium, zirconium, molybdenum, lanthanum, cerium, neodymium, hafnium, tantalum, tungsten, magnesium, and cobalt. Note that a combination of two or more of the above elements may be used as the element M.

Note that in this specification and the like, a metal oxide containing nitrogen is also collectively referred to as a metal oxide in some cases. A metal oxide containing nitrogen may be referred to as a metal oxynitride.

<Classification of Crystal Structures>

First, the classification of crystal structures of an oxide semiconductor is described with reference to FIG. 11A. FIG. 11A is a diagram showing the classification of crystal structures of an oxide semiconductor, typically IGZO (a metal oxide containing In, Ga, and Zn).

As shown in FIG. 11A, an oxide semiconductor is roughly classified into "Amorphous", "Crystalline", and "Crystal". "Amorphous" includes completely amorphous. "Crystalline" includes CAAC (c-axis-aligned crystalline), nc (nanocrystalline), and CAC (cloud-aligned composite). Note that "Crystalline" excludes single crystal, poly crystal, and completely amorphous. "Crystal" includes single crystal and poly crystal.

Note that the structures in the thick frame in FIG. 11A are in an intermediate state between "Amorphous" and "Crystal", and belong to a new crystalline phase. That is, these structures are completely different from "Amorphous", which is energetically unstable, and "Crystal".

A crystal structure of a film or a substrate can be evaluated with an X-ray diffraction (XRD) spectrum. FIG. 11B shows an XRD spectrum, which is obtained by GIXD (Grazing-Incidence XRD) measurement, of a CAAC-IGZO film classified into "Crystalline". Note that a GIXD method is also referred to as a thin film method or a Seemann-Bohlin method. The XRD spectrum that is shown in FIG. 11B and obtained by GIXD measurement is hereinafter simply referred to as an XRD spectrum in some cases. The CAAC-IGZO film shown in FIG. 11B has a composition in the neighborhood of In:Ga:Zn=4:2:3 [atomic ratio]. The CAAC-IGZO film shown in FIG. 11B has a thickness of 500 nm.

In FIG. 11B, the horizontal axis represents 2θ [deg.], and the vertical axis represents intensity [a.u.]. As shown in FIG. 11B, a clear peak indicating crystallinity is detected in the XRD spectrum of the CAAC-IGZO film. Specifically, a peak indicating c-axis alignment is detected at 2θ of around 31° in the XRD spectrum of the CAAC-IGZO film. As shown in FIG. 11n, the peak at 2θ of around 31° is asymmetric with respect to the axis of the angle at which the peak intensity is detected.

A crystal structure of a film or a substrate can also be evaluated with a diffraction pattern obtained by a nanobeam electron diffraction (NBED) method (such a pattern is also referred to as a nanobeam electron diffraction pattern). FIG. 11C shows a diffraction pattern of the CAAC-IGZO film. FIG. 11C shows a diffraction pattern obtained by the NBED in which an electron beam is incident in the direction parallel to the substrate. The CAAC-IGZO film shown in FIG. 11C has a composition in the neighborhood of In:Ga:Zn=4:2:3 [atomic ratio]. In the nanobeam electron diffraction method, electron diffraction is performed with a probe diameter of 1 nm.

As shown in FIG. 11C, a plurality of spots indicating c-axis alignment are observed in the diffraction pattern of the CAAC-IGZO film.

<<Structure of Oxide Semiconductor>>

Oxide semiconductors might be classified in a manner different from that in FIG. 11A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by Out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear crystal grain boundary (grain boundary) cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear crystal grain boundary is observed is what is called polycrystal. It is highly probable that the crystal grain boundary becomes a recombination center and captures carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, reduction in electron mobility due to the crystal grain boundary is less likely to occur. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods. For example, when an nc-OS film is subjected to structural analysis using out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter greater than the diameter of a nanocrystal (e.g., greater than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or less than the diameter of a nanocrystal (e.g., greater than or equal to 1 nm and less than or equal to 30 nm).

[a-Like OS]

The a-like OS is an oxide semiconductor having a structure between those of the nc-OS and the amorphous oxide semiconductor. The a-like OS includes a void or a low-density region. That is, the a-like OS has low crystallinity as compared with the nc-OS and the CAAC-OS. Moreover, the a-like OS has higher hydrogen concentration in the film than the nc-OS and the CAAC-OS.

<<Structure of Oxide Semiconductor>>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Here, the atomic ratios of In, Ga, and Zn to the metal elements contained in the CAC-OS in an In—Ga—Zn oxide are denoted by [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. For example, the first region has higher [In] than the second region and has lower [Ga] than the second region. Moreover, the second region has higher [Ga] than the first region and has lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (On/Off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current (Ion), high field-effect mobility (p), and excellent switching operation can be achieved.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in the oxide semiconductor of one embodiment of the present invention.

<Transistor Including Oxide Semiconductor>

Next, the case where the above oxide semiconductor is used for a transistor is described.

When the above oxide semiconductor is used for a transistor, a transistor with high field-effect mobility can be achieved. In addition, a transistor having high reliability can be achieved.

An oxide semiconductor with a low carrier concentration is preferably used for a channel formation region of the transistor. For example, the carrier concentration in an oxide semiconductor in the channel formation region is lower than or equal to $1 \times 10^{17}$ cm$^{-3}$, preferably lower than or equal to $1 \times 10^{15}$ cm$^{-3}$, further preferably lower than or equal to $1 \times 10^{13}$ cm$^{-3}$, still further preferably lower than or equal to $1 \times 10^{11}$ cm$^{-3}$, yet further preferably lower than $1 \times 10^{10}$ cm$^{-3}$, and higher than or equal to $1 \times 10^{-9}$ cm$^{-3}$. In order to reduce the carrier concentration in an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor with a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Electric charge trapped by the trap states in the oxide semiconductor takes a long time to disappear and might behave like fixed electric charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurity>

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the channel formation region in the oxide semiconductor and the concentration of silicon or carbon in the vicinity of an interface with the channel formation region in the oxide semiconductor (the concentrations obtained by secondary ion mass spectrometry (SIMS)) are each set lower than or equal to $2 \times 10^{18}$ atoms/cm$^3$, preferably lower than or equal to $2 \times 10^{17}$ atoms/cm$^3$.

When the oxide semiconductor contains an alkali metal or an alkaline earth metal, defect states are formed and carriers are generated in some cases. Thus, a transistor including an oxide semiconductor that contains an alkali metal or an alkaline earth metal is likely to have normally-on characteristics. Thus, the concentration of an alkali metal or an alkaline earth metal in the channel formation region in the oxide semiconductor, which is obtained by SIMS, is set lower than or equal to $1 \times 10^{18}$ atoms/cm$^3$, preferably lower than or equal to $2 \times 10^{16}$ atoms/cm$^3$.

Furthermore, when the oxide semiconductor contains nitrogen, the oxide semiconductor easily becomes n-type by generation of electrons serving as carriers and an increase in carrier concentration. As a result, a transistor including an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the channel formation region in the oxide semiconductor, which is obtained by SIMS, is set lower than $5 \times 10^{19}$ atoms/cm$^3$, preferably lower than or equal to $5 \times 10^{18}$ atoms/cm$^3$, further preferably lower than or equal to $1 \times 10^{18}$ atoms/cm$^3$, and still further preferably lower than or equal to $5 \times 10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the channel formation region in the oxide semiconductor is preferably reduced as much as possible. Specifically, the hydrogen concentration in the channel formation region in the oxide semiconductor, which is obtained by SIMS, is set lower than $1 \times 10^{20}$ atoms/cm$^3$, preferably lower than $5 \times 10^{19}$ atoms/cm$^3$, further preferably lower than $1 \times 10^{19}$ atoms/cm$^3$, still further preferably lower than $5 \times 10^{18}$ atoms/cm$^3$, and yet still further preferably lower than $1 \times 10^{18}$ atoms/cm$^3$.

When an oxide semiconductor with sufficiently reduced impurities is used for the channel formation region of the transistor, stable electrical characteristics can be given.

<<Other Semiconductor Materials>>

A semiconductor material that can be used for the oxide 230 is not limited to the above metal oxides. A semiconductor material that has a band gap (a semiconductor material that is not a zero-gap semiconductor) may be used for the oxide 230. For example, a single element semiconductor such as silicon, a compound semiconductor such as gallium arsenide, or a layered material functioning as a semiconductor (also referred to as an atomic layer material or a two-dimensional material) is preferably used as a semiconductor material. In particular, a layered material functioning as a semiconductor is preferably used as a semiconductor material.

Here, in this specification and the like, the layered material refers to any group of materials having a layered crystal structure. In the layered crystal structure, layers formed by covalent bonding or ionic bonding are stacked with bonding such as the Van der Waals force, which is weaker than covalent bonding or ionic bonding. The layered material has high electrical conductivity in a monolayer, that is, high two-dimensional electrical conductivity. When a material that functions as a semiconductor and has high two-dimensional electrical conductivity is used for a channel formation region, a transistor having a high on-state current can be provided.

Examples of the layered material include graphene, silicene, and chalcogenide. Chalcogenide is a compound containing chalcogen. Chalcogen is a general term of elements belonging to Group 16, which includes oxygen, sulfur, selenium, tellurium, polonium, and livermorium. Examples of chalcogenide include transition metal chalcogenide and chalcogenide of Group 13 elements.

For the oxide 230, a transition metal chalcogenide functioning as a semiconductor is preferably used, for example. Specific examples of the transition metal chalcogenide which can be used for the oxide 230 include molybdenum sulfide (typically $MoS_2$), molybdenum selenide (typically $MoSe_2$), molybdenum telluride (typically $MoTe_2$), tungsten sulfide (typically $WS_2$), tungsten selenide (typically $WSe_2$), tungsten telluride (typically $WTe_2$), hafnium sulfide (typically $HfS_2$), hafnium selenide (typically $HfSe_2$), zirconium sulfide (typically $ZrS_2$), and zirconium selenide (typically $ZrSe_2$).

This embodiment can be combined as appropriate with any of the other embodiments and the like described in this specification.

Embodiment 3

In this embodiment, an example of a semiconductor device according to one embodiment of the present invention is described with reference to FIG. 12.

[Structure Example of Semiconductor Device]

Figure 12:
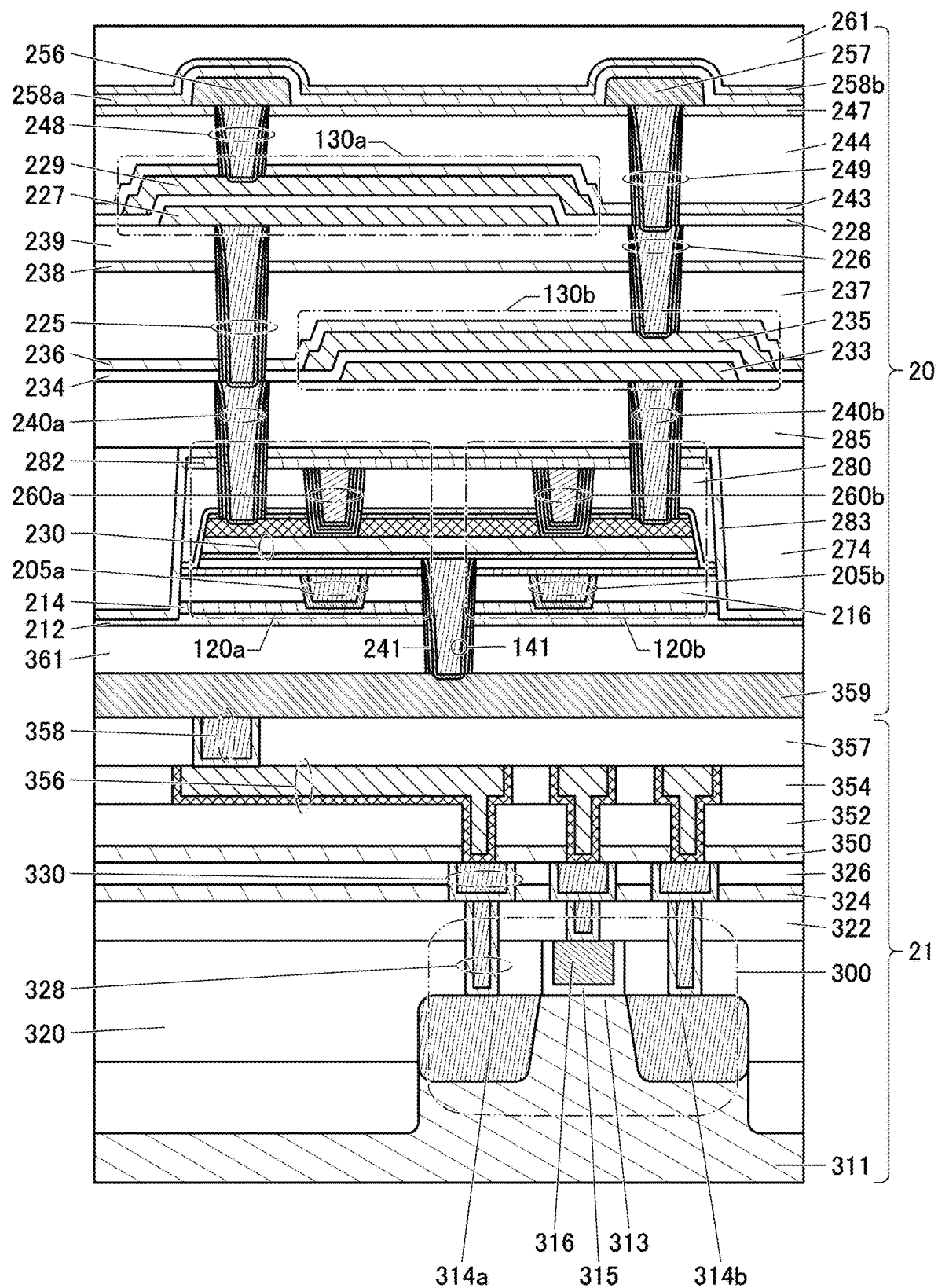
FIG. 12 is a cross-sectional view illustrating a structure example of a semiconductor device.

FIG. 12 illustrates a cross-sectional structure example of a semiconductor device (memory device) according to one embodiment of the present invention. FIG. 12 is a cross-sectional view illustrating part of the semiconductor device 100 that employs Structure example 1 of memory cell in the memory array 20.

In the semiconductor device illustrated in FIG. 12, the transistor 120a and the transistor 120b are provided above a transistor 300 provided in the driver circuit 21. The capacitor 130a and the capacitor 130b are provided above the transistor 120a and the transistor 120b. The transistor 200 described in the above embodiment can be used as the transistor 120a. For example, the transistor 120a illustrated in FIG. 12 has the structure in which the insulator 241b and the insulator 241b are removed from the transistor 200 illustrated in FIG. 9. The transistor 200 described in the above embodiment can be used as the transistor 120b. For example, the transistor 120b illustrated in FIG. 12 has the structure in which the insulator 241a and the insulator 241a are removed from the transistor 200 illustrated in FIG. 9.

In FIG. 12, the transistor 120a and the transistor 120b are provided using one oxide 230. The conductor 240b electrically connected to the transistor 120a is not illustrated in FIG. 12. Also in FIG. 12, the conductor 240a electrically connected to the transistor 120b is not illustrated.

A material that can have ferroelectricity, in which polarization internally occurs when an electric field is supplied from the outside and the polarization remains even when the electric field becomes zero, is used for an insulator 228 and an insulator 234 that function as a dielectric of the capacitor 130a and a dielectric of the capacitor 130b, respectively. Thus, a nonvolatile memory element can be formed using the capacitor. In other words, a one-transistor one-capacitor ferroelectric memory can be formed using the capacitor functioning as a ferroelectric capacitor and the transistor.

The transistor 120a and the transistor 120b are OS transistors. The OS transistors have a feature of high withstand voltage. Accordingly, high voltage can be applied to the transistor 120a and the transistor 120b even when the transistor 120a and the transistor 120b are miniaturized. The miniaturization of the transistor 120a and the transistor 120b can reduce the area occupied by the semiconductor device.

<Transistor 300>

The transistor 300 is provided on a substrate 311 and includes a conductor 316 functioning as a gate, an insulator 315 functioning as a gate insulator, a semiconductor region 313 formed of part of the substrate 311, and a low-resistance region 314a and a low-resistance region 314b functioning as a source region and a drain region. The transistor 300 may be a p-channel transistor or an n-channel transistor.

Here, in the transistor 300 illustrated in FIG. 12, the semiconductor region 313 (part of the substrate 311) where a channel is formed has a protruding shape. In addition, the conductor 316 is provided to cover side surfaces and a top surface of the semiconductor region 313 with the insulator 315 therebetween. Note that a material adjusting the work function may be used for the conductor 316. Such a transistor 300 is also referred to as a FIN-type transistor because it utilizes a protruding portion of a semiconductor substrate. Note that an insulator functioning as a mask for forming the protruding portion may be included in contact with an upper portion of the protruding portion. Although the case where the protruding portion is formed by processing part of the semiconductor substrate is described here, a semiconductor film having a protruding shape may be formed by processing an SOI substrate.

Note that the transistor 300 illustrated in FIG. 12 is an example and the structure is not limited thereto; an appropriate transistor is used in accordance with a circuit structure or a driving method.

<Wiring Layer>

Wiring layers provided with an interlayer film, a wiring, a plug, and the like may be provided between the components. A plurality of wiring layers can be provided in accordance with design. Here, a plurality of conductors functioning as plugs or wirings are collectively denoted by the same reference numeral in some cases. Furthermore, in this specification and the like, a wiring and a plug electrically connected to the wiring may be a single component. That is, there are cases where part of a conductor functions as a wiring and part of a conductor functions as a plug.

For example, an insulator 320, an insulator 322, an insulator 324, and an insulator 326 are sequentially stacked over the transistor 300 as interlayer films. A conductor 328, a conductor 330, and the like that are electrically connected to the transistor 120a and the transistor 120b are embedded in the insulator 320, the insulator 322, the insulator 324, and the insulator 326. Note that the conductor 328 and the conductor 330 function as plugs or wirings.

The insulators functioning as interlayer films may also function as planarization films that cover uneven shapes therebelow. For example, the top surface of the insulator 322 may be planarized by planarization treatment using a chemical mechanical polishing (CMP) method or the like to improve planarity.

A wiring layer may be provided over the insulator 326 and the conductor 330. For example, in FIG. 12, an insulator 350, an insulator 352, and an insulator 354 are stacked sequentially over the insulator 326 and the conductor 330. A conductor 356 is formed in the insulator 350, the insulator 352, and the insulator 354. The conductor 356 functions as a contact plug or a wiring.

An insulator 357 is provided over the insulator 354 and the conductor 356, and a conductor 359 is provided over the insulator 357. The conductor 359 corresponds to the wiring BL described in the above embodiment. A conductor 358 is embedded in the insulator 357. The conductor 358 functions as a contact plug or a wiring. The conductor 359 and the conductor 356 are electrically connected to each other through the conductor 358.

An insulator 361 is provided over the conductor 359, and the transistor 120a and the transistor 120b are provided above the insulator 361. The conductor 260 corresponds to the wiring WL described in the above embodiment. The conductor 359 is electrically connected to the oxide 230 through the conductor 141. The conductor 141 has a function of a contact plug or a wiring. Like the conductor 240 shown in the above embodiment, the insulator 241 is provided in contact with side surfaces of the conductor 141 functioning as a contact plug. A conductor 233 is provided over the insulator 285 and the conductor 240b. The conductor 233 is electrically connected to the transistor 120b through the conductor 240b. The insulator 234 is provided over the conductor 233 and a conductor 235 is provided over the insulator 234. A region where the conductor 233 and the conductor 235 overlap with each other with the insulator 234 therebetween functions as the capacitor 130b.

A material that can have ferroelectricity is preferably used for the insulator 234. The use of the material that can have ferroelectricity for the insulator 234 enables the capacitor 130b to function as a ferroelectric capacitor. An insulator 236, an insulator 237, an insulator 238, and an insulator 239 are provided to cover the conductor 235.

A conductor 225 is provided to be embedded in the insulator 234, the insulator 236, the insulator 237, the insulator 238, and the insulator 239. The conductor 225 has a function of a contact plug or a wiring. The conductor 225 is electrically connected to the conductor 240a. A conductor 226 is provided to be embedded in the insulator 236, the insulator 237, the insulator 238, and the insulator 239. The conductor 226 has a function of a contact plug or a wiring. The conductor 226 is electrically connected to the conductor 235.

A conductor 227 is provided over the insulator 239 and the conductor 225. The conductor 227 is electrically connected to the transistor 120a through the conductor 225 and the conductor 240a. The insulator 228 is provided over the conductor 227 and a conductor 229 is provided over the insulator 228. A region where the conductor 229 and the conductor 227 overlap with each other with the insulator 228 therebetween functions as the capacitor 130a.

A material that can have ferroelectricity is preferably used for the insulator 228. The use of the material that can have ferroelectricity for the insulator 228 enables the capacitor 130b to function as a ferroelectric capacitor. An insulator 243, an insulator 244, and an insulator 247 are provided to cover the conductor 229.

A conductor 249 is provided to be embedded in the insulator 247, the insulator 244, the insulator 243, and the insulator 228. The conductor 249 has a function of a contact plug or a wiring. The conductor 249 is electrically connected to the conductor 235 through the conductor 226. A conductor 248 is provided to be embedded in the insulator 247, the insulator 244, and the insulator 243. The conductor 248 has a function of a contact plug or a wiring. The conductor 248 is electrically connected to the conductor 229.

A conductor 256 is provided over the conductor 248 and the insulator 247. The conductor 256 is electrically connected to the conductor 229 through the conductor 248. A conductor 257 is provided over the conductor 249 and the insulator 247. The conductor 257 is electrically connected to the conductor 235 through the conductor 249 and the conductor 226. The conductor 256 and the conductor 257 function as the wiring PL.

An insulator 258a, an insulator 258b, and an insulator 261 may be provided to cover the conductor 256 and the conductor 257. At least one of the insulator 258a and the insulator 258b is preferably an insulating film having a barrier property against hydrogen. As the insulating film having a barrier property against hydrogen, a barrier insulating film that can be used as the above-described insulator 283 or the like may be used. When such a barrier insulating film is provided, impurities such as hydrogen which are contained in the insulator 261 and the like can be inhibited from diffusing into the transistor 200 through the conductor 256, the conductor 257, and the like.

The insulator 258a can be deposited by a sputtering method. For example, silicon nitride deposited by a sputtering method can be used as the insulator 258a. A deposition gas in a sputtering method need not include molecules containing hydrogen, and therefore the hydrogen concentration of the insulator 258a can be reduced.

The insulator 258b is preferably deposited by an ALD method, particularly a PEALD method. For example, silicon nitride deposited by a PEALD method can be used as the insulator 258b. Thus, the insulator 258b can be deposited with good coverage; therefore, even when a pinhole, disconnection, or the like is generated in the insulator 258a owing to unevenness of the base, the insulator 258b covers it, whereby hydrogen can be inhibited from diffusing into the transistor 200.

Note that the methods for depositing the insulator 258a and the insulator 258b are not limited only to a sputtering method and an ALD method; a CVD method, an MBE method, a PLD method, or the like can also be used as appropriate. Although the two-layer structure of the insulator 258a and the insulator 258b is described above, the present invention is not limited thereto; a single-layer structure or a stacked-layer structure of three or more layers may be used.

Examples of an insulator that can be used as an interlayer film include an insulating oxide, an insulating nitride, an insulating oxynitride, an insulating nitride oxide, an insulating metal oxide, an insulating metal oxynitride, and an insulating metal nitride oxide.

For example, when a material having a low relative dielectric constant is used for the insulator functioning as an interlayer film, parasitic capacitance generated between wirings can be reduced. Thus, a material is preferably selected depending on the function of an insulator.

For example, the insulator 361, the insulator 352, the insulator 354, and the like preferably include an insulator having a low relative dielectric constant. For example, the insulator preferably includes silicon oxide to which fluorine is added, silicon oxide to which carbon is added, silicon oxide to which carbon and nitrogen are added, porous silicon oxide, a resin, or the like. Alternatively, the insulator preferably has a stacked-layer structure of a resin and silicon oxide, silicon oxynitride, silicon nitride oxide, silicon nitride, silicon oxide to which fluorine is added, silicon oxide to which carbon is added, silicon oxide to which carbon and nitrogen are added, or porous silicon oxide. When silicon oxide or silicon oxynitride, which is thermally stable, is combined with a resin, the stacked-layer structure can have thermal stability and a low relative dielectric constant. Examples of the resin include polyester, polyolefin, polyamide (e.g., nylon and aramid), polyimide, polycarbonate, and acrylic.

When a transistor including an oxide semiconductor is surrounded by an insulator having a function of inhibiting passage of oxygen and impurities such as hydrogen, the electrical characteristics of the transistor can be stable. Thus, the insulator having a function of inhibiting passage of oxygen and impurities such as hydrogen can be used for the insulator 214, the insulator 212, the insulator 350, and the like.

As the insulator having a function of inhibiting passage of oxygen and impurities such as hydrogen, a single layer or stacked layers of an insulator containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum may be used. Specifically, as the insulator having a function of inhibiting passage of oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide; silicon nitride oxide; silicon nitride; or the like can be used.

As the conductor that can be used for a wiring or a plug, a material containing one or more kinds of metal elements selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, and the like can be used. A semiconductor having high electrical conductivity, typified by polycrystalline silicon containing an impurity element such as phosphorus, or silicide such as nickel silicide may be used.

For example, the conductor 328, the conductor 330, the conductor 356, the conductor 141, the conductor 256, the conductor 257, and the like can have a single-layer or stacked-layer structure using any of conductive materials such as a metal material, an alloy material, a metal nitride material, and a metal oxide material, which contain the above materials. It is preferable to use a high-melting-point material that has both heat resistance and conductivity, such as tungsten or molybdenum, and it is preferable to use tungsten. Alternatively, it is preferable to use a low-resistance conductive material such as aluminum or copper. The use of a low-resistance conductive material can reduce wiring resistance. Furthermore, the conductor 229 and the conductor 235 in the capacitor 130 functioning as a ferroelectric capacitor are deposited by a method with substrate heating, such as a thermal ALD method, whereby the remanent polarization can be enhanced even without performing high-temperature baking after the formation. Therefore, since the semiconductor device can be manufactured without performing high-temperature baking, it is possible to use a low-resistance conductive material with a low melting point, such as copper.

<Capacitor>

The conductor 229 functions as an upper electrode of the capacitor 130a, the conductor 227 functions as a lower electrode of the capacitor 130a, and the insulator 228 functions as a dielectric of the capacitor 130a. The conductor 235 functions as an upper electrode of the capacitor 130b, the conductor 233 functions as a lower electrode of the capacitor 130b, and the insulator 234 functions as a dielectric of the capacitor 130b.

For the insulator 228 and the insulator 234, any of the materials that can have ferroelectricity and are described in the above embodiment is used. Each of the insulator 228 and the insulator 234 may be a stack of a plurality of materials that can have ferroelectricity.

Among the materials that can have ferroelectricity, hafnium oxide and a material containing hafnium oxide and zirconium oxide are preferable because they can have ferroelectricity even when processed into a thin film of several nanometers. Here, the thickness of each of the insulator 228 and the insulator 234 can be less than or equal to 100 nm, preferably less than or equal to 50 nm, further preferably less than or equal to 20 nm, and still further preferably less than or equal to 10 nm. When the ferroelectric layer that can be reduced in thickness is used, the capacitor 130 can be combined with the miniaturized transistor 120 to form a semiconductor device.

Each of the insulator 228 and the insulator 234 can have a stacked-layer structure of the above-described material that can have ferroelectricity and a material having high dielectric strength, in some cases. Examples of the material having high dielectric strength include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin. The use of a stack of such insulators having high dielectric strength can increase the dielectric strength and inhibit a leakage current of the capacitor 130 in some cases.

The conductor 227 and the conductor 233 functioning as lower electrodes and the conductor 229 and the conductor 235 functioning as upper electrodes can be deposited by an ALD method, a CVD method, a sputtering method, or the like. For example, titanium nitride may be deposited as a lower electrode by a thermal ALD method.

The conductor functioning as an upper electrode and the conductor functioning as a lower electrode may be each a stack of a plurality of conductors. For example, as an upper electrode, tungsten may be deposited by a sputtering method after titanium nitride is deposited by an ALD method.

After the formation of the upper electrode, heat treatment may be performed at approximately 400° C. to 500° C. For example, heat treatment at 500° C. for 60 seconds may be performed by an RTA method after the formation of the upper electrode.

<Wiring or Plug in Layer Provided with Oxide Semiconductor>

In the case where an oxide semiconductor is used in the transistor 120, an insulator including an excess-oxygen region is provided in the vicinity of the oxide semiconductor in some cases. In that case, an insulator having a barrier property is preferably provided between the insulator including the excess-oxygen region and a conductor provided in the insulator including the excess-oxygen region.

For example, the insulator 241 is preferably provided between the insulator 280 containing excess oxygen and the conductor 240 (see Embodiment 2). Since the insulator 241 is provided in contact with the insulator 282 and the insulator 283, the transistor 120 can be sealed with the insulators having a barrier property.

That is, with the insulator 241, excess oxygen contained in the insulator 280 is unlikely to be absorbed by the conductor 240. In addition, providing the insulator 241 can inhibit diffusion of hydrogen, which is an impurity, into the transistor 200 through the conductor 240.

The insulator 241 is preferably formed using an insulating material having a function of inhibiting diffusion of oxygen and impurities such as water and hydrogen. For example, silicon nitride, silicon nitride oxide, aluminum oxide, hafnium oxide, or the like is preferably used. In particular, silicon nitride is preferable because of its high blocking property against hydrogen. Other than that, a metal oxide such as magnesium oxide, gallium oxide, germanium oxide, yttrium oxide, zirconium oxide, lanthanum oxide, neodymium oxide, or tantalum oxide can be used, for example.

As described in the above embodiment, the transistor 120 may be sealed with the insulator 212, the insulator 214, the insulator 282, and the insulator 283. Such a structure can inhibit entry of hydrogen contained in the insulator 274, the insulator 285, or the like into the insulator 280 or the like. At this time, the insulator 212, the insulator 214, the insulator 282, and the insulator 283 function as sealing films.

Here, the conductor 240 penetrates the insulator 283 and the insulator 282, and the conductor 141 penetrates the insulator 214 and the insulator 212; as described above, the insulator 241 is provided in contact with the conductor 240 and the conductor 141. This can reduce the amount of hydrogen entering the inside of the insulator 212, the insulator 214, the insulator 282, and the insulator 283 through the conductor 240 and the conductor 141. In this manner, the transistor 120 is sealed, so that impurities such as hydrogen contained in the insulator 274 or the like can be inhibited from entering the transistor 120. Although two transistors 120 are illustrated in the region sealed with the insulator 212, the insulator 283, and the like in FIG. 12, the structure is not limited thereto; one or three or more transistors 120 can be provided in the sealed region.

<Dicing Line>

A dicing line (sometimes referred to as a scribe line, a dividing line, or a cutting line) which is provided when a large-sized substrate is divided into semiconductor elements so that a plurality of semiconductor devices are each taken as a chip is described below. Examples of a dividing method include the case where a groove (a dicing line) for dividing the semiconductor elements is formed on the substrate, and then the substrate is cut along the dicing line to divide (split) it into a plurality of semiconductor devices.

Here, for example, a region in which the insulator 283 and the insulator 212 are in contact with each other is preferably designed to overlap with the dicing line. That is, an opening is provided in the insulator 282, the insulator 280, the insulator 275, the insulator 224, the insulator 222, the insulator 216, and the insulator 214 in the vicinity of a region to be the dicing line that is provided on an outer edge of the memory cell including the plurality of transistors 200.

That is, in the opening provided in the insulator 282, the insulator 280, the insulator 275, the insulator 224, the insulator 222, the insulator 216, and the insulator 214, the insulator 283 is in contact with the insulator 212. Note that the insulator 212 and the insulator 283 may be formed using the same material and the same method. When the insulator 212 and the insulator 283 are formed using the same material and the same method, the adhesion therebetween can be increased. For example, silicon nitride may be used.

For example, an opening may be provided in the insulator 282, the insulator 280, the insulator 275, the insulator 224, the insulator 222, and the insulator 216. With such a structure, in the opening provided in the insulator 282, the insulator 280, the insulator 275, the insulator 224, the insulator 222, and the insulator 216, the insulator 283 is in contact with the insulator 214.

With the structure, the transistors 120 can be surrounded by the insulator 212, the insulator 214, the insulator 282, and the insulator 283. At least one of the insulator 214, the insulator 282, and the insulator 283 has a function of inhibiting diffusion of oxygen, hydrogen, and water. When the substrate is divided into circuit regions each of which is provided with the semiconductor elements according to this embodiment, impurities such as hydrogen and water can be prevented from diffusing from the divided portion into the transistor 120.

With the structure, excess oxygen in the insulator 280 and the insulator 224 can be prevented from diffusing to the outside. Accordingly, excess oxygen in the insulator 280 and the insulator 224 is efficiently supplied to the oxide where the channel is formed in the transistor 120. The oxygen can reduce oxygen vacancies in the oxide where the channel is formed in the transistor 120. Thus, the oxide where the channel is formed in the transistor 120 can be an oxide semiconductor with a low density of defect states and stable characteristics. That is, the transistor 120 can have a small variation in the electrical characteristics and higher reliability.

Modification Example 1 of Memory Device

Figure 13:
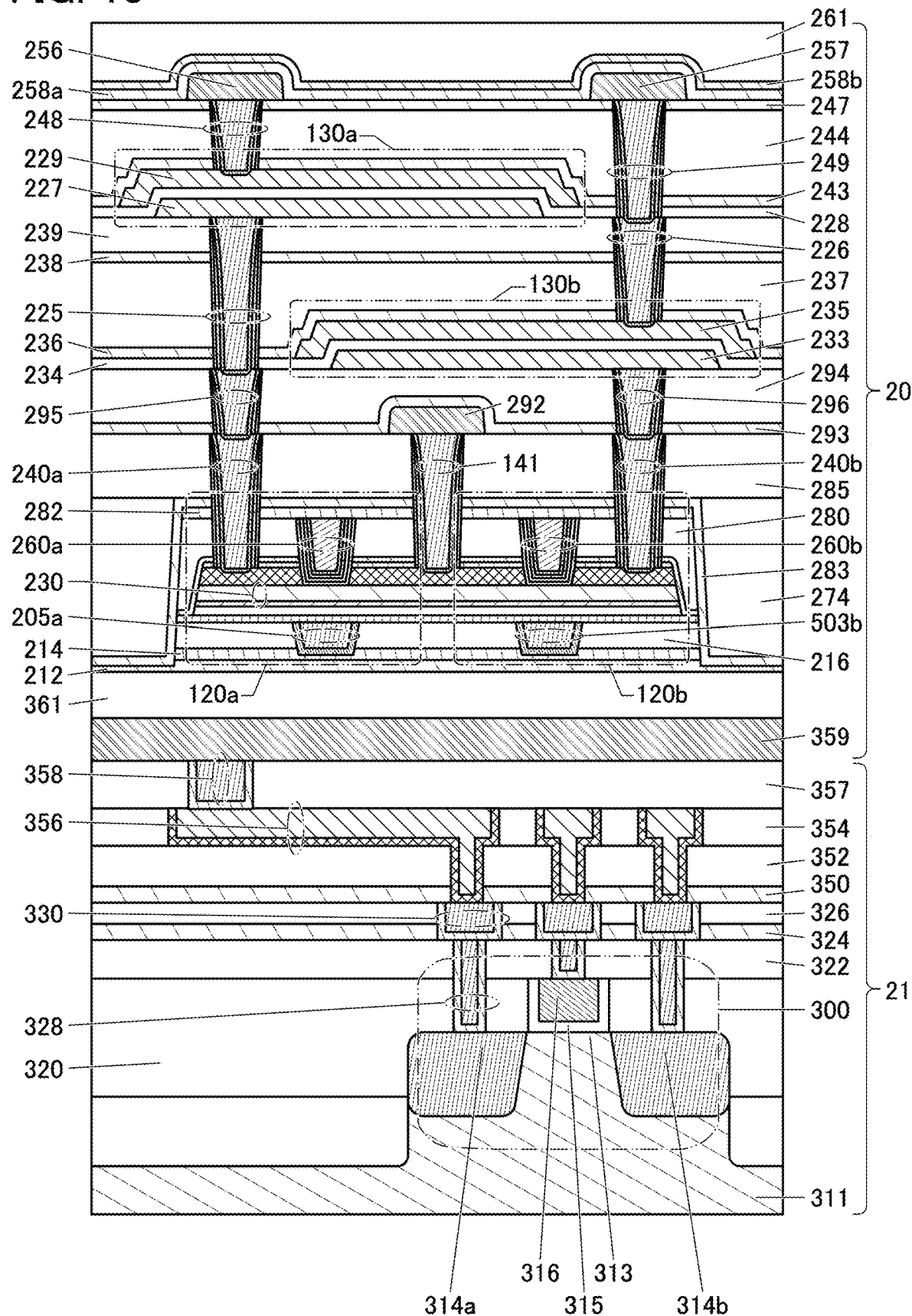
FIG. 13 is a cross-sectional view illustrating a structure example of a semiconductor device.

FIG. 13 illustrates a modification example of the memory device illustrated in FIG. 12. The conductor 141, which is provided to be embedded in the insulator 224, the insulator 222, the insulator 216, the insulator 214, the insulator 212, and the insulator 361 in FIG. 12, may be provided to be embedded in the insulator 285, the insulator 283, the insulator 282, the insulator 280, the insulator 271, and the insulator 275.

In FIG. 13, a conductor 292 is provided over the conductor 141 and the insulator 285, and an insulator 293 and an insulator 294 are provided over the conductor 292 and the insulator 285. A conductor 295 and a conductor 296 are provided to be embedded in the insulator 293 and the insulator 294.

The conductor 233 and the insulator 234 are provided above the insulator 294. The conductor 225 and the conductor 240a are electrically connected to each other through the conductor 295. The conductor 233 is electrically connected to the conductor 240b through the conductor 296. The conductor 292 is electrically connected to the conductor 359. Although the conductor 359 is provided below the transistor 120 in FIG. 13, the conductor 359 may be provided above the transistor 120.

Modification Example 2 of Memory Device

Figure 14:
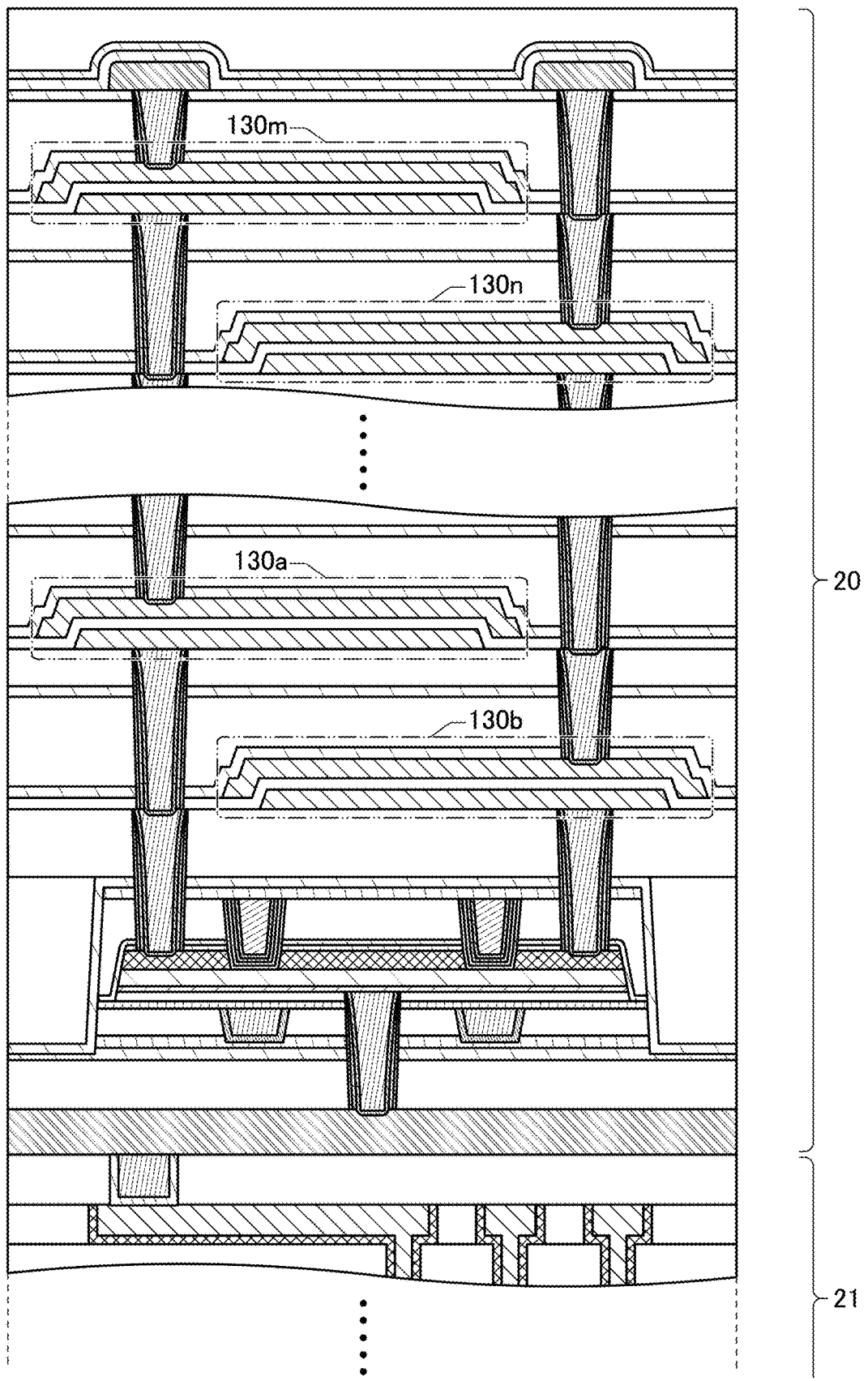
FIG. 14 is a cross-sectional view illustrating a structure example of a semiconductor device.

As shown in the above embodiment, the number of overlapping capacitors 130 is not limited to two. Three or more capacitors 130 may be provided to overlap with each other. FIG. 14 illustrates a structure example in which capacitors including not only the capacitor 130a and the capacitor 130b but also capacitors up to a capacitor 130m and a capacitor 130n are provided to overlap with each other.

This embodiment can be combined as appropriate with any of the other embodiments and the like described in this specification.

Embodiment 4

Described in this embodiment are examples of a semiconductor wafer where the semiconductor device or the like according to one embodiment of the present invention is formed and electronic components incorporating the semiconductor device.

<Semiconductor Wafer>

Figure 15A:
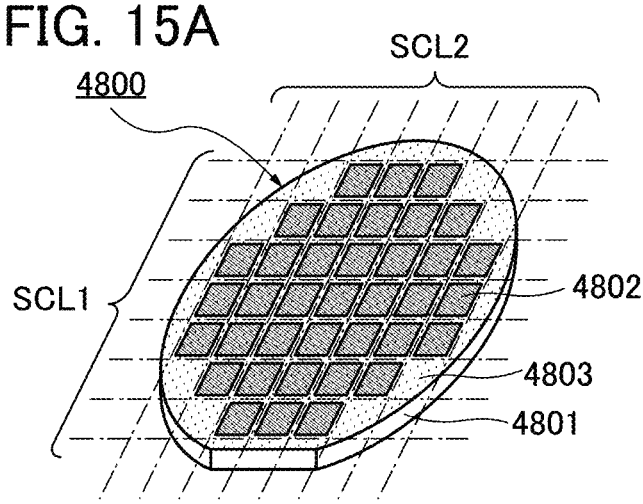
FIG. 15A is a perspective view illustrating an example of a semiconductor wafer.

First, an example of a semiconductor wafer where a semiconductor device or the like is formed is described using FIG. 15A.

A semiconductor wafer 4800 illustrated in FIG. 15A includes a wafer 4801 and a plurality of circuit portions 4802 provided on atop surface of the wafer 4801. Note that a portion without the circuit portion 4802 on the top surface of the wafer 4801 is a spacing 4803 that is a region for dicing.

The semiconductor wafer 4800 can be manufactured by forming the plurality of circuit portions 4802 on the surface of the wafer 4801 by a pre-process. After that, a surface of the wafer 4801 opposite to the surface provided with the plurality of circuit portions 4802 may be ground to thin the wafer 4801. Through this step, warpage or the like of the wafer 4801 is reduced and the size of the component can be reduced.

A dicing step is performed as a next step. Dicing is performed along scribe lines SCL1 and scribe lines SCL2 (referred to as dicing lines or cutting lines in some cases) indicated by dashed-dotted lines. Note that to perform the dicing step easily, it is preferable that the spacing 4803 be provided so that the plurality of scribe lines SCL1 are parallel to each other, the plurality of scribe lines SCL2 are parallel to each other, and the scribe lines SCL1 are perpendicular to the scribe lines SCL2.

Figure 15B:
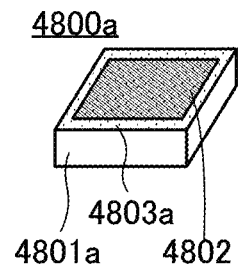
FIG. 15B is a perspective view illustrating an example of a chip.

With the dicing step, a chip 4800a as illustrated in FIG. 15B can be cut out from the semiconductor wafer 4800. The chip 4800a includes a wafer 4801a, the circuit portion 4802, and a spacing 4803a. Note that it is preferable to make the spacing 4803a small as much as possible. In this case, the width of the spacing 4803 between adjacent circuit portions 4802 is substantially the same as a cutting allowance of the scribe line SCL1 or a cutting allowance of the scribe line SCL2.

Note that the shape of the element substrate of one embodiment of the present invention is not limited to the shape of the semiconductor wafer 4800 illustrated in FIG. 15A. The element substrate may be a rectangular semiconductor wafer, for example. The shape of the element substrate can be changed as appropriate, depending on a manufacturing process of an element and an apparatus for manufacturing the element.

<Electronic Component>

Figure 15C:
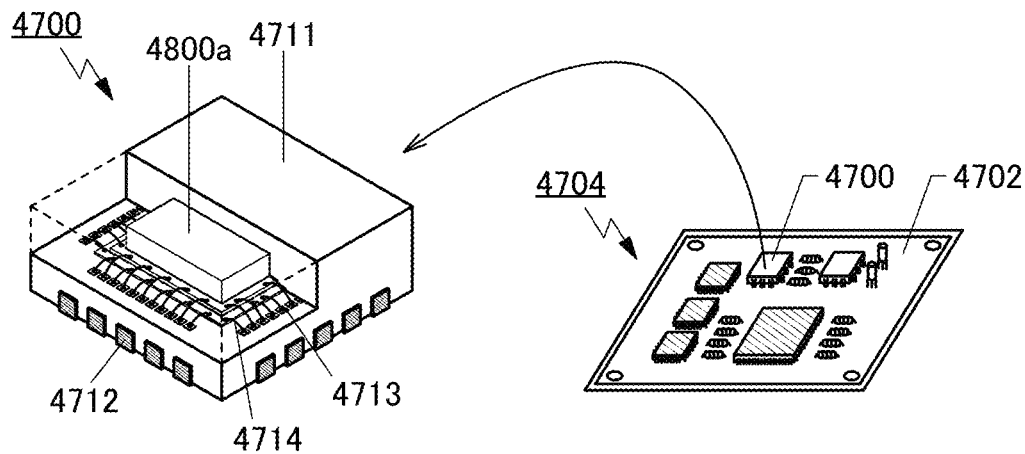
FIG. 15C and FIG. 15D are perspective views illustrating examples of electronic components.

FIG. 15C illustrates a perspective view of an electronic component 4700 and a substrate (a mounting board 4704) on which the electronic component 4700 is mounted. The electronic component 4700 illustrated in FIG. 15C includes a chip 4800a in a mold 4711. As the chip 4800a, the semiconductor device or the like according to one embodiment of the present invention can be used.

To illustrate the inside of the electronic component 4700, some portions are omitted in FIG. 15C. The electronic component 4700 includes a land 4712 outside the mold 4711. The land 4712 is electrically connected to an electrode pad 4713, and the electrode pad 4713 is electrically connected to the chip 4800a through a wire 4714. The electronic component 4700 is mounted on a printed circuit board 4702, for example. A plurality of such electronic components are combined and electrically connected to each other on the printed circuit board 4702, so that the mounting board 4704 is completed.

Figure 15D:
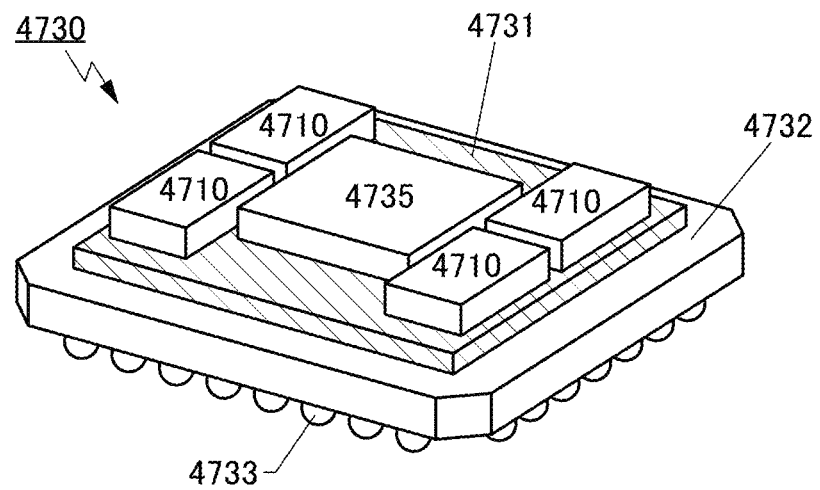

FIG. 15D illustrates a perspective view of an electronic component 4730. The electronic component 4730 is an example of a SiP (System in package) or an MCM (Multi Chip Module). In the electronic component 4730, an interposer 4731 is provided on a package substrate 4732 (a printed circuit board), and a semiconductor device 4735 and a plurality of semiconductor devices 4710 are provided on the interposer 4731.

Examples of the semiconductor device 4710 include the chip 4800a, the semiconductor device described in the above embodiment, and a high bandwidth memory (HBM). In addition, an integrated circuit (a semiconductor device) such as a CPU, a GPU, an FPGA, or a memory device can be used as the semiconductor device 4735.

As the package substrate 4732, a ceramic substrate, a plastic substrate, a glass epoxy substrate, or the like can be used. As the interposer 4731, a silicon interposer, a resin interposer, or the like can be used.

The interposer 4731 includes a plurality of wirings and has a function of electrically connecting a plurality of integrated circuits with different terminal pitches. The plurality of wirings are provided in a single layer or multiple layers. In addition, the interposer 4731 has a function of electrically connecting an integrated circuit provided on the interposer 4731 to an electrode provided on the package substrate 4732. Accordingly, the interposer is referred to as a "redistribution substrate" or an "intermediate substrate" in some cases. Furthermore, a through electrode is provided in the interposer 4731 and the through electrode is used to electrically connect an integrated circuit and the package substrate 4732 in some cases. Moreover, in the case of using a silicon interposer, a TSV (Through Silicon Via) can also be used as the through electrode.

A silicon interposer is preferably used as the interposer 4731. The silicon interposer can be manufactured at lower cost than an integrated circuit because it is not necessary to provide an active element. Moreover, since wirings of the silicon interposer can be formed through a semiconductor process, the formation of minute wirings, which is difficult for a resin interposer, is easily achieved.

An HBM needs to be connected to many wirings to achieve a wide memory bandwidth. Therefore, an interposer on which an HBM is mounted requires minute and densely formed wirings. For this reason, a silicon interposer is preferably used as the interposer on which an HBM is mounted.

In a SiP, an MCM, or the like using a silicon interposer, a decrease in reliability due to a difference in the coefficient of expansion between an integrated circuit and the interposer is less likely to occur. Furthermore, a surface of a silicon interposer has high planarity; thus, poor connection between the silicon interposer and an integrated circuit provided on the silicon interposer is less likely to occur. It is particularly preferable to use a silicon interposer for a 2.5D package (2.5-dimensional mounting) in which a plurality of integrated circuits are arranged side by side on the interposer.

In addition, a heat sink (a radiator plate) may be provided to overlap with the electronic component 4730. In the case of providing a heat sink, the heights of integrated circuits provided on the interposer 4731 are preferably equal to each other. For example, in the electronic component 4730 described in this embodiment, the heights of the semiconductor devices 4710 and the semiconductor device 4735 are preferably equal to each other.

To mount the electronic component 4730 on another substrate, an electrode 4733 may be provided on a bottom portion of the package substrate 4732. FIG. 15D illustrates an example in which the electrode 4733 is formed of a solder ball. Solder balls are provided in a matrix on the bottom portion of the package substrate 4732, so that BGA (Ball Grid Array) mounting can be achieved. Alternatively, the electrode 4733 may be formed of a conductive pin. When conductive pins are provided in a matrix on the bottom portion of the package substrate 4732, PGA (Pin Grid Array) mounting can be achieved.

The electronic component 4730 can be mounted on another substrate by various mounting methods other than BGA and PGA. For example, a mounting method such as SPGA (Staggered Pin Grid Array), LGA (Land Grid Array), QFP (Quad Flat Package), QFJ (Quad Flat J-leaded package), or QFN (Quad Flat Non-leaded package) can be employed.

This embodiment can be combined as appropriate with any of the other embodiments and the like described in this specification.

Embodiment 5

In this embodiment, application examples of the semiconductor device according to one embodiment of the present invention are described.

The semiconductor device according to one embodiment of the present invention can be employed for, for example, a variety of electronic devices (e.g., information terminals, computers, smartphones, e-book readers, digital still cameras, video cameras, video recording/reproducing devices, navigation systems, game machines, and the like). In addition, the semiconductor device can also be used for image sensors, IoT (Internet of Things), healthcare-related devices, and the like. Note that here, the computers refer not only to tablet computers, laptop computers, and desktop computers, but also to large computers such as server systems.

The use of the semiconductor device according to one embodiment of the present invention can achieve an electronic device with large storage capacity per unit area. The use of the semiconductor device according to one embodiment of the present invention can achieve a reduction in the size of an electronic device.

An example of an electronic device including a semiconductor device according to one embodiment of the present invention is described. Note that FIG. 16A to FIG. 16J and FIG. 17A to FIG. 17E each illustrate a state where the electronic component 4700 including the semiconductor device is included in an electronic device.

[Cellular Phone]

Figure 16A:
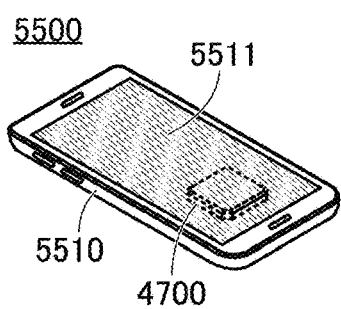
FIG. 16A to FIG. 16J are each a perspective view or a schematic view illustrating an example of an electronic device.

An information terminal 5500 illustrated in FIG. 16A is a cellular phone (smartphone), which is a type of information terminal. The information terminal 5500 includes a housing 5510 and a display portion 5511, and as input interfaces, a touch panel is provided in the display portion 5511 and a button is provided in the housing 5510.

By using the semiconductor device according to one embodiment of the present invention, the information terminal 5500 can retain a temporary file generated at the time of executing an application (e.g., a web browser's cache or the like).

[Wearable Terminal]

Figure 16B:
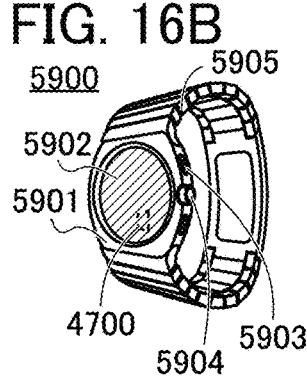

In addition, FIG. 16B illustrates an information terminal 5900 that is an example of a wearable terminal. The information terminal 5900 includes a housing 5901, a display portion 5902, an operation switch 5903, an operation switch 5904, a band 5905, and the like.

Like the information terminal 5500 described above, the wearable terminal can retain a temporary file generated at the time of executing an application by using the semiconductor device according to one embodiment of the present invention.

[Information Terminal]

Figure 16C:
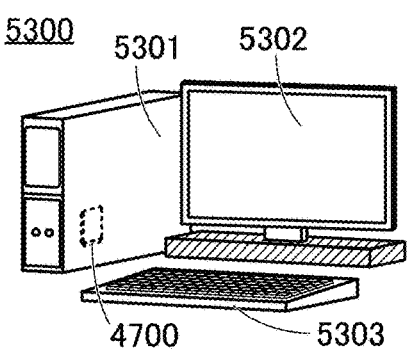

FIG. 16C illustrates a desktop information terminal 5300. The desktop information terminal 5300 includes a main body 5301 of the information terminal, a display portion 5302, and a keyboard 5303.

Like the information terminal 5500 described above, the desktop information terminal 5300 can retain a temporary file generated at the time of executing an application by using the semiconductor device according to one embodiment of the present invention.

Although the smartphone, the wearable terminal, and the desktop information terminal are respectively illustrated in FIG. 16A to FIG. 16C as examples of the electronic device, one embodiment of the present invention can be employed for an information terminal other than a smartphone, a wearable terminal, and a desktop information terminal. Examples of information terminals other than a smartphone, a wearable terminal, and a desktop information terminal include a PDA (Personal Digital Assistant), a laptop information terminal, and a workstation.

[Household Appliance]

Figure 16D:
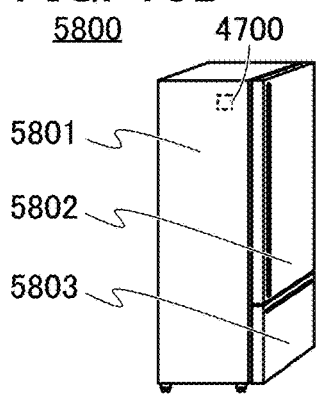

FIG. 16D illustrates an electric refrigerator-freezer 5800 as an example of a household appliance. The electric refrigerator-freezer 5800 includes a housing 5801, a refrigerator door 5802, a freezer door 5803, and the like. For example, the electric refrigerator-freezer 5800 is an electric refrigerator-freezer that is compatible with IoT (Internet of Things).

The semiconductor device according to one embodiment of the present invention can be employed for the electric refrigerator-freezer 5800. The electric refrigerator-freezer 5800 can transmit and receive information on food stored in the electric refrigerator-freezer 5800 and food expiration dates, for example, to and from an information terminal or the like via the Internet or the like. In the electric refrigerator-freezer 5800, the semiconductor device can retain a temporary file generated at the time of transmitting the information.

Although the electric refrigerator-freezer is described in this example as a household appliance, examples of other household appliances include a vacuum cleaner, a microwave oven, an electric oven, a rice cooker, a water heater, an IH cooker, a water server, a heating-cooling combination appliance such as an air conditioner, a washing machine, a drying machine, and an audiovisual appliance.

[Game Machine]

Figure 16E:
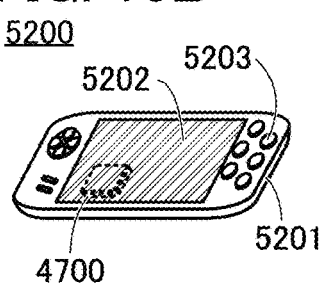

FIG. 16E illustrates a portable game machine 5200 as an example of a game machine. The portable game machine 5200 includes a housing 5201, a display portion 5202, a button 5203, and the like.

Figure 16F:
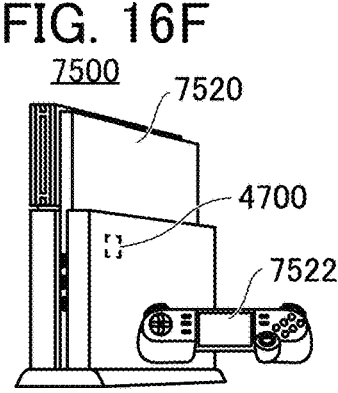

In addition, FIG. 16F illustrates a stationary game machine 7500 as another example of a game machine. The stationary game machine 7500 includes a main body 7520 and a controller 7522. Note that the controller 7522 can be connected to the main body 7520 with or without a wire. Although not illustrated in FIG. 16F, the controller 7522 can include a display portion that displays a game image, and an input interface besides a button, such as a touch panel, a stick, a rotating knob, or a sliding knob, for example. The shape of the controller 7522 is not limited to that illustrated in FIG. 16F, and the shape of the controller 7522 may be changed in various ways in accordance with the genres of games. For example, for a shooting game such as an FPS (First Person Shooter) game, a gun-shaped controller having a trigger button can be used. As another example, for a music game or the like, a controller having a shape of a musical instrument, audio equipment, or the like can be used. Furthermore, the stationary game machine may include a camera, a depth sensor, a microphone, and the like so that the game player can play a game using a gesture and/or a voice instead of a controller.

Videos on the aforementioned game machine can be output with a display device such as a television device, a personal computer display, a game display, or a head-mounted display.

By employing the semiconductor device described in the above embodiment, the portable game machine 5200 or the stationary game machine 7500 can achieve large storage capacity without increasing the occupied area. In addition, the portable game machine 5200 or the stationary game machine 7500 which consume low power can be achieved. Moreover, heat generation from a circuit can be reduced owing to low power consumption; thus, the influence of heat generation on the circuit itself, a peripheral circuit, and a module can be reduced.

Moreover, by using the semiconductor device described in the above embodiment, the portable game machine 5200 or the stationary game machine 7500 can retain a temporary file necessary for arithmetic operation that occurs during game play.

As an example of a game machine, FIG. 16E illustrates a portable game machine. In addition, FIG. 16F illustrates a home-use stationary game machine. Note that an electronic device according to one embodiment of the present invention is not limited thereto. Examples of the electronic device of one embodiment of the present invention include an arcade game machine installed in entertainment facilities (a game center, an amusement park, and the like), and a throwing machine for batting practice installed in sports facilities.

[Moving Vehicle]

The semiconductor device described in the above embodiment can be employed for a motor vehicle, which is a moving vehicle, and around the driver's seat in a motor vehicle.

Figure 16G:
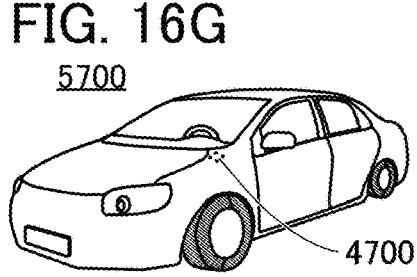

FIG. 16G illustrates a motor vehicle 5700 as an example of a moving vehicle.

An instrument panel that provides various kinds of information by displaying a speedometer, a tachometer, a mileage, a fuel meter, a gearshift state, air-conditioning settings, and the like is provided around the driver's seat in the motor vehicle 5700. In addition, a display device showing the above information may be provided around the driver's seat.

In particular, the display device can compensate for the view obstructed by a pillar or the like, blind areas for the driver's seat, and the like by displaying a video from an imaging device (not illustrated) provided for the motor vehicle 5700, which can increase safety. That is, display of an image from an imaging device provided on the outside of the motor vehicle 5700 can fill in blind areas and increase safety.

The semiconductor device described in the above embodiment can temporarily retain information; thus, the semiconductor device can be used to retain temporary information necessary in an automatic driving system for the motor vehicle 5700 and a system for navigation and risk prediction, for example. The display device may be configured to display temporary information regarding navigation, risk prediction, or the like. Moreover, the semiconductor device may be configured to retain a video of a driving recorder provided in the motor vehicle 5700.

Although a motor vehicle is described above as an example of a moving vehicle, the moving vehicle is not limited to a motor vehicle. Examples of moving vehicles include a train, a monorail train, a ship, and a flying object (a helicopter, an unmanned aircraft (a drone), an airplane, and a rocket).

[Camera]

The semiconductor device described in the above embodiment can be employed for a camera.

Figure 16H:
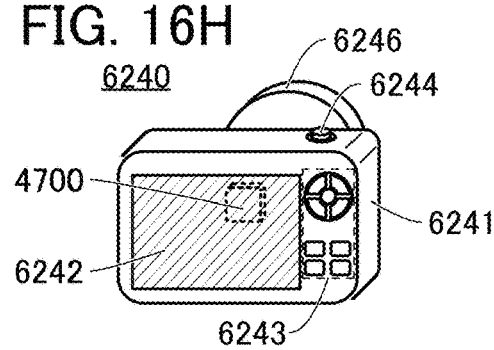

FIG. 16H illustrates a digital camera 6240 as an example of an imaging device. The digital camera 6240 includes a housing 6241, a display portion 6242, operation switches 6243, a shutter button 6244, and the like, and a detachable lens 6246 is attached to the digital camera 6240. Although the digital camera 6240 is configured here such that the lens 6246 is detachable from the housing 6241 for replacement, the lens 6246 may be integrated with the housing 6241. In addition, the digital camera 6240 may be configured to be additionally equipped with a stroboscope, a viewfinder, or the like.

When the semiconductor device described in the above embodiment is employed for the digital camera 6240, the digital camera 6240 with low power consumption can be achieved. Moreover, heat generation from a circuit can be reduced owing to low power consumption; thus, the influence of heat generation on the circuit itself, a peripheral circuit, and a module can be reduced.

[Video Camera]

The semiconductor device described in the above embodiment can be employed for a video camera.

Figure 16I:
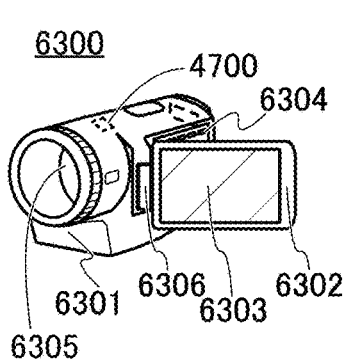

FIG. 16I illustrates a video camera 6300 as an example of an imaging device. The video camera 6300 includes a first housing 6301, a second housing 6302, a display portion 6303, operation switches 6304, a lens 6305, a joint 6306, and the like. The operation switches 6304 and the lens 6305 are provided in the first housing 6301, and the display portion 6303 is provided in the second housing 6302. The first housing 6301 and the second housing 6302 are connected to each other with the joint 6306, and an angle between the first housing 6301 and the second housing 6302 can be changed with the joint 6306. Images displayed on the display portion 6303 may be changed in accordance with the angle at the joint 6306 between the first housing 6301 and the second housing 6302.

When images taken by the video camera 6300 are recorded, the images need to be encoded in accordance with a data recording format. By using the above semiconductor device, the video camera 6300 can retain a temporary file generated in encoding.

[ICD]

The semiconductor device described in the above embodiment can be employed for an implantable cardioverter-defibrillator (ICD).

Figure 16J:
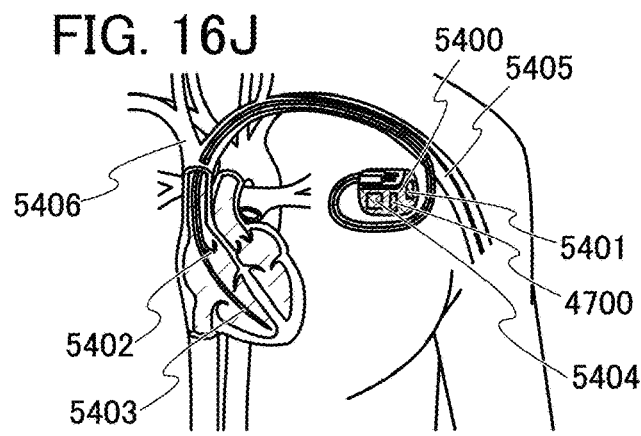

FIG. 16J is a schematic cross-sectional view showing an example of an ICD. An ICD main unit 5400 includes at least a battery 5401, the electronic component 4700, a regulator, a control circuit, an antenna 5404, a wire 5402 reaching a right atrium, and a wire 5403 reaching a right ventricle.

The ICD main unit 5400 is implanted in the body by surgery, and the two wires pass through a subclavian vein 5405 and a superior vena cava 5406 of the human body, with an end of one of the wires placed in the right ventricle and an end of the other wire placed in the right atrium.

The ICD main unit 5400 functions as a pacemaker and paces the heart when the heart rate is not within a predetermined range. In addition, when the heart rate is not recovered by pacing (e.g., when ventricular tachycardia or ventricular fibrillation occurs), treatment with an electrical shock is performed.

The ICD main unit 5400 needs to monitor the heart rate all the time in order to perform pacing and deliver electrical shocks as appropriate. For that reason, the ICD main unit 5400 includes a sensor for measuring the heart rate. In the ICD main unit 5400, data on the heart rate obtained by the sensor or the like, the number of times the treatment with pacing is performed, and the time taken for the treatment, for example, can be stored in the electronic component 4700.

The antenna 5404 can receive power, and the battery 5401 is charged with the power. Furthermore, when the ICD main unit 5400 includes a plurality of batteries, safety can be increased. Specifically, even when some of the batteries in the ICD main unit 5400 are dead, the other batteries can function properly; thus, the batteries also function as an auxiliary power source.

In addition to the antenna 5404 capable of receiving power, an antenna that can transmit physiological signals may be included to construct, for example, a system that monitors cardiac activity by checking physiological signals such as a pulse, a respiratory rate, a heart rate, and body temperature with an external monitoring device.

[Expansion Device for PC]

The semiconductor device described in the above embodiment can be employed for a calculator such as a PC (Personal Computer) and an expansion device for an information terminal.

Figure 17A:
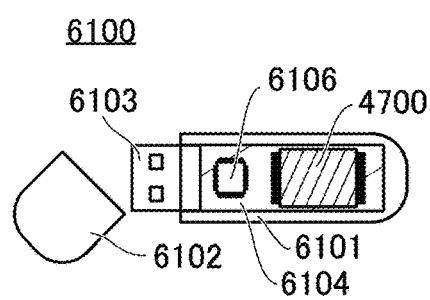
FIG. 17A to FIG. 17E are each a perspective view or a schematic view illustrating an example of an electronic device.

FIG. 17A illustrates, as an example of the expansion device, a portable expansion device 6100 that includes a chip capable of retaining information and is externally provided on a PC. The expansion device 6100 can store information using the chip when connected to a PC with a USB (Universal Serial Bus) or the like, for example. Note that FIG. 17A illustrates the portable expansion device 6100; however, the expansion device according to one embodiment of the present invention is not limited thereto and may be a comparatively large expansion device including a cooling fan or the like, for example.

The expansion device 6100 includes a housing 6101, a cap 6102, a USB connector 6103, and a substrate 6104. The substrate 6104 is held in the housing 6101. The substrate 6104 is provided with a circuit for driving the semiconductor device or the like described in the above embodiment. For example, the substrate 6104 is provided with the electronic component 4700 and a controller chip 6106. The USB connector 6103 functions as an interface for connection to an external device.

[SD Card]

The semiconductor device described in the above embodiment can be employed for an SD card that can be attached to an electronic device such as an information terminal or a digital camera.

Figure 17B:
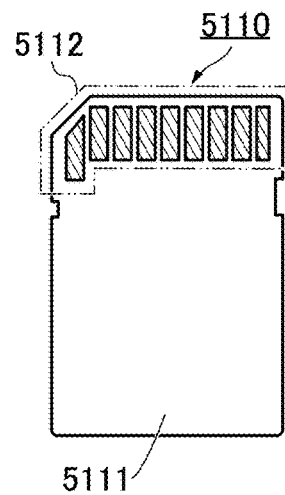
Figure 17C:
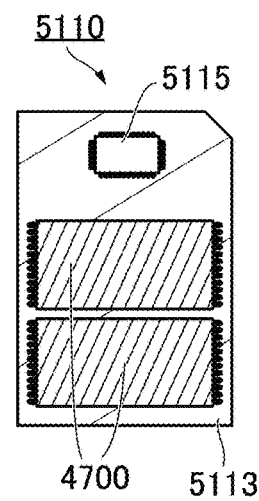

FIG. 17B is a schematic external diagram of an SD card, and FIG. 17C is a schematic diagram of the internal structure of the SD card. An SD card 5110 includes a housing 5111, a connector 5112, and a substrate 5113. The connector 5112 functions as an interface for connection to an external device. The substrate 5113 is held in the housing 5111. The substrate 5113 is provided with a semiconductor device and a circuit for driving the semiconductor device. For example, electronic components 4700 and a controller chip 5115 are attached to the substrate 5113. Note that the circuit structures of the electronic components 4700 and the controller chip 5115 are not limited to those described above, and can be changed as appropriate according to circumstances. For example, a write circuit, a row driver, a read circuit, and the like that are provided in an electronic component may be incorporated into the controller chip 5115 instead of the electronic component 4700.

When the electronic components 4700 are provided also on a rear surface side of the substrate 5113, the capacitance of the SD card 5110 can be increased. In addition, a wireless chip with a wireless communication function may be provided on the substrate 5113. This allows wireless communication between an external device and the SD card 5110 and enables data reading and writing from and to the electronic components 4700.

[SSD]

The semiconductor device described in the above embodiment can be used in an SSD (Solid State Drive) that can be attached to an electronic device such as an information terminal.

Figure 17D:
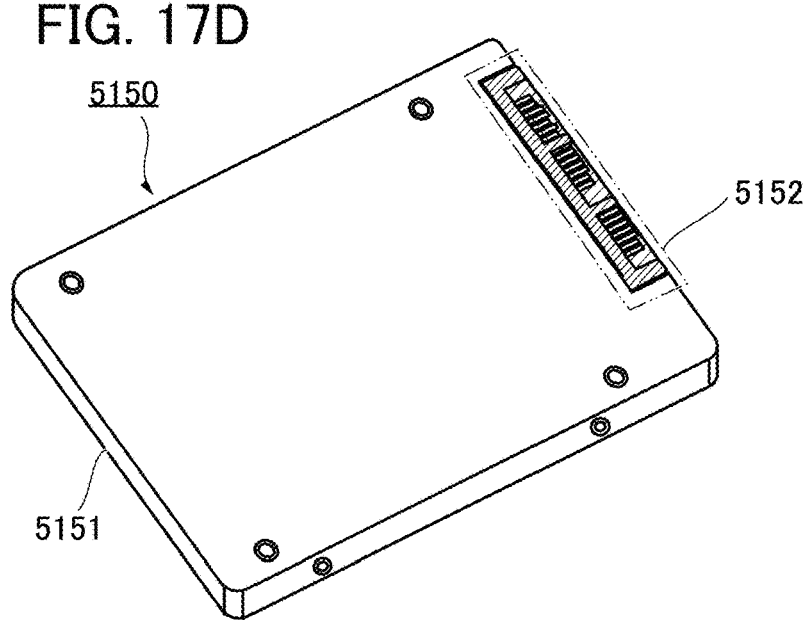
Figure 17E:
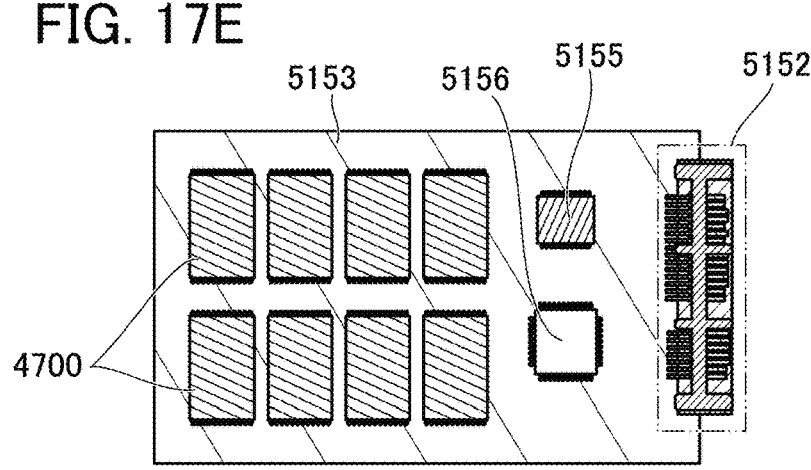

FIG. 17D is a schematic external diagram of an SSD, and FIG. 17E is a schematic diagram of the internal structure of the SSD. An SSD 5150 includes a housing 5151, a connector 5152, and a substrate 5153. The connector 5152 functions as an interface for connection to an external device. The substrate 5153 is held in the housing 5151. The substrate 5153 is provided with a memory device and a circuit for driving the memory device. For example, the electronic components 4700, a memory chip 5155, and a controller chip 5156 are attached to the substrate 5153. When the electronic components 4700 are also provided on a rear surface side of the substrate 5153, the capacity of the SSD 5150 can be increased. A work memory is incorporated in the memory chip 5155. For example, a DRAM chip is used as the memory chip 5155. A processor, an ECC circuit, and the like are incorporated in the controller chip 5156. Note that the circuit structures of the electronic components 4700, the memory chip 5155, and the controller chip 5156 are not limited to those described above, and the circuit structures can be changed as appropriate according to circumstances. For example, a memory functioning as a work memory may also be provided in the controller chip 5156.

[Computer]

Figure 18A:
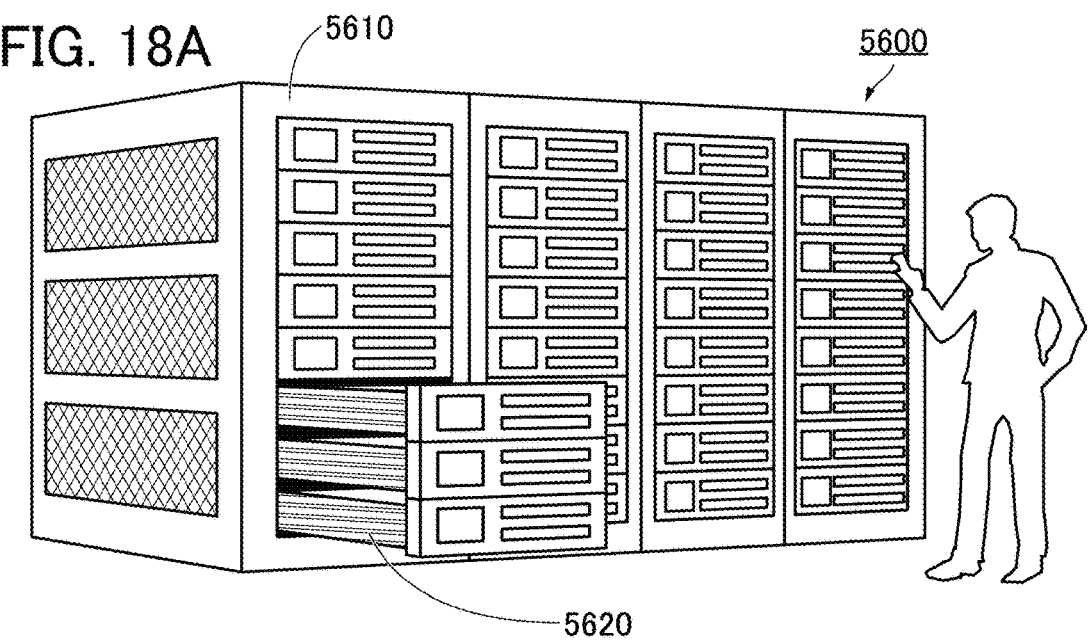
FIG. 18A to FIG. 18C are each a diagram illustrating an example of an electronic device.

A computer 5600 illustrated in FIG. 18A is an example of a large computer. In the computer 5600, a plurality of rack mount computers 5620 are stored in a rack 5610.

Figure 18B:
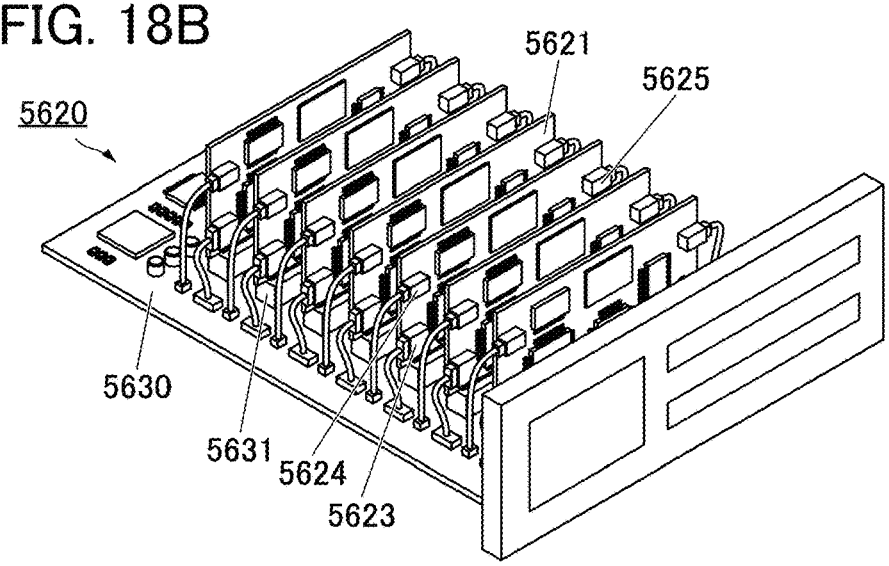

The computer 5620 can have a structure in a perspective view illustrated in FIG. 18B, for example. In FIG. 18B, the computer 5620 includes a motherboard 5630, and the motherboard 5630 includes a plurality of slots 5631 and a plurality of connection terminals. A PC card 5621 is inserted in the slot 5631. In addition, the PC card 5621 includes a connection terminal 5623, a connection terminal 5624, and a connection terminal 5625, each of which is connected to the motherboard 5630.

Figure 18C:
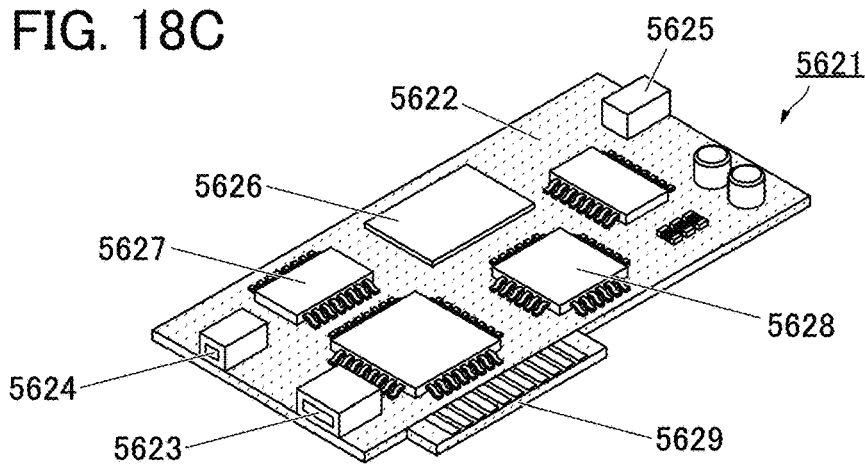

The PC card 5621 illustrated in FIG. 18C is an example of a processing board provided with a CPU, a GPU, a memory device, and the like. The PC card 5621 includes a board 5622. The board 5622 includes a connection terminal 5623, a connection terminal 5624, a connection terminal 5625, a semiconductor device 5626, a semiconductor device 5627, a semiconductor device 5628, and a connection terminal 5629. Note that FIG. 18C also illustrates semiconductor devices other than the semiconductor device 5626, the semiconductor device 5627, and the semiconductor device 5628, the following description of the semiconductor device 5626, the semiconductor device 5627, and the semiconductor device 5628 is referred to for these semiconductor devices.

The connection terminal 5629 has a shape with which the connection terminal 5629 can be inserted in the slot 5631 of the motherboard 5630, and the connection terminal 5629 functions as an interface for connecting the PC card 5621 and the motherboard 5630. An example of the standard for the connection terminal 5629 is PCIe.

The connection terminal 5623, the connection terminal 5624, and the connection terminal 5625 can serve as, for example, an interface for performing power supply, signal input, or the like to the PC card 5621. As another example, they can serve as an interface for outputting a signal calculated by the PC card 5621. Examples of the standard for each of the connection terminal 5623, the connection terminal 5624, and the connection terminal 5625 include USB (Universal Serial Bus), SATA (Serial ATA), and SCSI (Small Computer System Interface). In the case where video signals are output from the connection terminal 5623, the connection terminal 5624, and the connection terminal 5625, an example of the standard therefor is HDMI (registered trademark).

The semiconductor device 5626 includes a terminal (not illustrated) for inputting and outputting signals, and when the terminal is inserted in a socket (not illustrated) of the board 5622, the semiconductor device 5626 and the board 5622 can be electrically connected to each other.

The semiconductor device 5627 includes a plurality of terminals, and when the terminals are reflow-soldered, for example, to wirings of the board 5622, the semiconductor device 5627 and the board 5622 can be electrically connected to each other. Examples of the semiconductor device 5627 include an FPGA (Field Programmable Gate Array), a GPU, and a CPU. As the semiconductor device 5627, the electronic component 4730 can be used, for example.

The semiconductor device 5628 includes a plurality of terminals, and when the terminals are reflow-soldered, for example, to wirings of the board 5622, the semiconductor device 5628 and the board 5622 can be electrically connected to each other. An example of the semiconductor device 5628 is a memory device or the like. As the semiconductor device 5628, the electronic component 4700 can be used, for example.

The computer 5600 can also function as a parallel computer. When the computer 5600 is used as a parallel computer, large-scale computation necessary for artificial intelligence learning and inference can be performed, for example.

The semiconductor device of one embodiment of the present invention is used in a variety of electronic devices or the like described above, so that a reduction in size and/or a reduction in power consumption of the electronic device can be achieved. In addition, since the semiconductor device of one embodiment of the present invention has low power consumption, heat generation from a circuit can be reduced. Accordingly, it is possible to reduce adverse effects of the heat generation on the circuit itself, a peripheral circuit, and a module. Furthermore, the use of the semiconductor device of one embodiment of the present invention can achieve an electronic device that operates stably even in a high temperature environment. Thus, the reliability of the electronic devices can be increased.

This embodiment can be combined as appropriate with any of the other embodiments and the like described in this specification.

REFERENCE NUMERALS

100: semiconductor device, 120: transistor, 130: capacitor, 141: conductor, 142: conductor, 143: conductor, 151: transistor layer, 152: capacitor layer, 153: capacitor layer, 154: capacitor layer, 155: capacitor layer

The invention claimed is:

1. A semiconductor device comprising:
first to fourth transistors; and
first to fourth capacitors,
wherein each of the first to fourth transistors comprises an oxide semiconductor in a semiconductor layer where a channel is formed,
wherein the oxide semiconductor comprises at least one of indium and zinc,
wherein the first transistor is electrically connected to the first capacitor,
wherein the second transistor is electrically connected to the second capacitor,
wherein the third transistor is electrically connected to the third capacitor,
wherein the fourth transistor is electrically connected to the fourth capacitor,
wherein the first to fourth capacitors are provided above the first to fourth transistors,
wherein each of the first to fourth capacitors comprises a ferroelectric,
wherein the third capacitor and the fourth capacitor are provided over the same layer, and
wherein the first to third capacitors comprise a region where they overlap with each other.

2. A semiconductor device comprising:
first to fourth transistors;
first to fourth capacitors; and
first to fourth wirings,
wherein a gate of each of the first and third transistors is electrically connected to the first wiring,
wherein a gate of each of the second and fourth transistors is electrically connected to the second wiring,
wherein one of a source and a drain of the first transistor is electrically connected to the first capacitor,
wherein one of a source and a drain of the second transistor is electrically connected to the second capacitor,
wherein one of a source and a drain of the third transistor is electrically connected to the third capacitor,
wherein one of a source and a drain of the fourth transistor is electrically connected to the fourth capacitor,
wherein the other of the source and the drain of each of the first and second transistors is electrically connected to the third wiring,
wherein the other of the source and the drain of each of the third and fourth transistors is electrically connected to the fourth wiring,
wherein the third capacitor and the fourth capacitor are provided over the same layer, and
wherein the first to third capacitors comprise a region where they overlap with each other.

3. A semiconductor device comprising:
first to fourth transistors;
first to fourth capacitors; and
first to fourth wirings, wherein a gate of each of the first and third transistors is electrically connected to the first wiring, wherein a gate of each of the second and fourth transistors is electrically connected to the second wiring, wherein one of a source and a drain of the first transistor is electrically connected to the first capacitor, wherein one of a source and a drain of the second transistor is electrically connected to the second capacitor, wherein one of a source and a drain of the third transistor is electrically connected to the third capacitor, wherein one of a source and a drain of the fourth transistor is electrically connected to the fourth capacitor, wherein the other of the source and the drain of each of the first and second transistors is electrically connected to the third wiring, wherein the other of the source and the drain of each of the third and fourth transistors is electrically connected to the fourth wiring, wherein each of the first to fourth capacitors comprises a ferroelectric, and wherein the first to fourth capacitors comprise a region where they overlap with each other.

4. The semiconductor device according to claim 1, wherein the first to fourth transistors are provided over the same layer.

5. The semiconductor device according to claim 1, wherein the ferroelectric comprises at least one of hafnium and zirconium.

6. The semiconductor device according to claim 1, wherein the ferroelectric comprises at least one element selected from Group III-V elements.

7. The semiconductor device according to claim 2, wherein the first to fourth transistors are provided over the same layer.

8. The semiconductor device according to claim 2, wherein each of the first to fourth transistors comprises an oxide semiconductor in a semiconductor layer where a channel is formed.

9. The semiconductor device according to claim 8, wherein the oxide semiconductor comprises at least one of indium and zinc.

10. The semiconductor device according to claim 2, wherein the ferroelectric comprises at least one of hafnium and zirconium.

11. The semiconductor device according to claim 2, wherein the ferroelectric comprises at least one element selected from Group III-V elements.

12. The semiconductor device according to claim 3, wherein the first to fourth transistors are provided over the same layer.

13. The semiconductor device according to claim 3, wherein each of the first to fourth transistors comprises an oxide semiconductor in a semiconductor layer where a channel is formed.

14. The semiconductor device according to claim 13, wherein the oxide semiconductor comprises at least one of indium and zinc.

15. The semiconductor device according to claim 3, wherein the ferroelectric comprises at least one of hafnium and zirconium.

16. The semiconductor device according to claim 3, wherein the ferroelectric comprises at least one element selected from Group III-V elements.

* * * * *